US006868068B1

(12) United States Patent
Jain et al.

(10) Patent No.: US 6,868,068 B1
(45) Date of Patent: Mar. 15, 2005

(54) METHOD AND APPARATUS FOR ESTIMATING DELAY AND JITTER BETWEEN NETWORK ROUTERS

(75) Inventors: Bijendra N. Jain, Santa Clara, CA (US); Keith McCloghrie, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 626 days.

(21) Appl. No.: 09/746,233

(22) Filed: Dec. 21, 2000

Related U.S. Application Data

(63) Continuation of application No. 09/609,302, filed on Jun. 30, 2000.

(51) Int. Cl.[7] .............................................. H04L 12/56
(52) U.S. Cl. ....................................... 370/252; 370/389
(58) Field of Search ................................ 370/516, 517, 370/519, 503, 252

(56) References Cited

U.S. PATENT DOCUMENTS

| | | | |
|---|---|---|---|
| 5,408,231 A | 4/1995 | Bowdon | 340/826 |
| 5,561,790 A | 10/1996 | Fusaro | 395/500 |
| 5,598,532 A | 1/1997 | Liron | 395/200.01 |
| 5,754,543 A | 5/1998 | Seid | 370/351 |
| 5,886,643 A | 3/1999 | Diebboll et al. | 340/825.08 |
| 6,058,103 A | 5/2000 | Henderson et al. | 370/241 |
| 6,115,393 A | 9/2000 | Engel et al. | 370/469 |
| 6,151,324 A | 11/2000 | Belser et al. | 370/397 |
| 6,178,459 B1 | 1/2001 | Sugiyama | 709/238 |
| 6,195,553 B1 | 2/2001 | Claffery et al. | 455/445 |
| 6,256,295 B1 | 7/2001 | Callon | 370/254 |
| 6,272,131 B1 * | 8/2001 | Ofek | 370/389 |
| 6,360,271 B1 * | 3/2002 | Schuster et al. | 709/231 |
| 6,363,056 B1 | 3/2002 | Beigi et al. | 370/252 |
| 6,542,469 B1 | 4/2003 | Kelley et al. | 370/238 |

\* cited by examiner

*Primary Examiner*—Kenneth Vanderpuye
(74) *Attorney, Agent, or Firm*—Campbell Stephenson Ascolese LLP; Justin M. Dillon

(57) ABSTRACT

A delay measurement technique according to an embodiment according to the present invention is based on the precept, ascertained by the inventors, that a link between network nodes will often contribute to the delay encountered between several different pairs of network nodes. Such a technique identifies the path between each pair of nodes by a list of links that form the path. Paths that are orthogonal are treated as being necessary for describing the delays encountered between nodes, and, once the requisite set of orthogonal paths has been derived, all other paths can be described in terms of one or more of these orthogonal paths. Such a technique also lends itself to matrix representation of the paths, and the use of matrix manipulation techniques in deriving delay and jitter.

108 Claims, 20 Drawing Sheets

METHOD AND APPARATUS FOR ESTIMATING DELAY AND JITTER BETWEEN NETWORK ROUTERS

CROSS-REFERENCE TO RELATED APPLICATIONS

The present patent application is a continuation of U.S. patent application Ser. No. 09/609,302, filed on Jun. 30, 2000, entitled "Method and Apparatus for Estimating Delay and Jitter Between Network Routers" and is incorporated by reference herein in its entirety and for all purposes.

BACKGROUND OF THE INVENTION

1. Field of the Invention

The present invention relates to computer networks, and, more particularly, to a method and apparatus for estimating a network performance metric, such as delay and jitter, between pairs of routers in a network.

2. Description of the Related Art

As computer networks grow, in terms of the number of routers contained therein, the measurement of network performance metrics becomes of increasing importance. By measuring such metrics, network parameters can be tuned in order to provide optimal performance. Moreover, the network's architecture can be adjusted and growth planned to allow the network to grow in a controllable fashion. One such metric is the delay experienced by data packets flowing between certain of these routers (i.e., travel time between the routers). Another is the jitter, or deviation in delay, experienced by such data packets. Thus, there is a growing need to continuously monitor network delay and jitter between multiple pairs of routers in a network such as an enterprise or service-provider network. In service-provider networks, particularly, such performance monitoring is needed in order to verify service-level agreements.

Unfortunately, current methods of monitoring are not as useful as might be desired. For example, one current method for monitoring network delay and jitter requires the measurement of delay and jitter between every specified pair of routers by exchanging probe packets between routers. As will be apparent to one of skill in the art, the number of pairs of routers that need to be monitored in such a scenario grows as a quadratic of N, where N is the number of network routers making up the network. Thus, such a measurement technique involves calculations on the order of $N^2(O(N^2))$.

Once generated, the measurement data is collected and processed. The measurement data can then be made available to other applications, such as for the tuning of network parameters and the like. As can be seen from the technique's computational order $(O(N^2))$, this measurement scheme does not scale well in large networks as the number of specified pairs of routers to be monitored increases dramatically. In such cases, the resulting network traffic due to probe packets can be large and, therefore, unsustainable as a result of the bandwidth consumed thereby.

This problem of scalability may be further compounded by the fact that networks that will be deployed in the future will likely be diff-serv (DS) enabled. In such cases, delay and jitter characteristics must be monitored for every DS-codepoint in use in the network. Diff-serv enabled networks offer a range of data transfer services that are differentiated on the basis of performance experienced by packets belonging to a particular aggregated set of applications or flows. An application requests a specific level of performance on a packet-by-packet basis, by marking the type-of-service (ToS) field in each IP packet with a specific value, also called DS-codepoint. This value effectively specifies how an enterprise network or a service provider network processes and forwards each packet along each hop in the network.

What is therefore needed is a method and apparatus for the measurement of delays encountered by network traffic in traversing a network, the complexity of which preferably grows at a rate less than $O(N^2)$. More preferably, the complexity of the measurement scheme should grow at a rate that increases at most linearly with the number of network routers (designated herein as N) and the number of network links (designated herein as M).

SUMMARY OF THE INVENTION

The present invention, in various embodiments, addresses the aforementioned problems by providing techniques for measuring network performance metrics, such as delay encountered between nodes in a network. Advantageously, embodiments of the present invention allow such measurements to be made without generating excessive network traffic, and are capable of accounting for delays both between nodes (the delay over inter-node links) and within nodes. Also advantageously, embodiments of the present invention are less demanding from a measurement perspective, being on the order of $N+M(O(N+M))$.

A delay measurement technique according to an embodiment of the present invention is based on the precept, ascertained by the inventors, that a link between network nodes will often contribute to the delay encountered between several different pairs of network nodes. Such a technique identifies the path between each pair of nodes by a list of links that form the path. Paths that are orthogonal are treated as being necessary for describing the delays encountered between nodes. Once delay and jitter over the requisite set of orthogonal paths have been measured, delay over all other paths can be described in terms of the delay and jitter encountered over one or more of these orthogonal paths. Such a technique also lends itself to a vector/matrix representation of delay and jitter over the paths, and the use of matrix manipulation techniques in deriving delay and jitter.

The present invention allows such measurements to be made in several situations. Certain embodiments of the present invention allow delays to be measured using a minimal set of paths. This technique can be extended to the case where the number of paths used to represent the network being analyzed approaches the number of paths in the network. Moreover, the techniques presented herein can be extended to the case where only a portion of the network's topology is known, for both the case of a minimal set of paths and a large number of paths.

The techniques described herein provide several advantages. These techniques address the fundamental concern of a measurement scheme's scalability in monitoring delay and jitter in increasingly large networks, with known or partly known topology and routing. The techniques result in a significant reduction in traffic overhead due to exchange of probe packets when compared to existing techniques. The savings can be especially significant in networks having a large requirements set. Further, in a network employing TCP/IP protocols, the methods described herein separately accounts for IP-level transfer delay over a link and the delay in processing probe packets within a router (i.e., the delay experienced in generating and/or receiving such packets), thereby helping to isolate and identify links that are over or under provisioned. Simplicity and ease of implementation are also attractive features of a technique according to the present invention.

In one embodiment of the present invention, a method of determining a network performance metric in a network is described. The network includes a number of network elements and a number of links. Each of the network elements is coupled to at least one other of the network elements by at least one of the links. The method includes measuring a measured network performance metric between a first network element and a second network element of a network element pair in a first set of network element pairs. The first network element and the second network element of the network element pair in the first set of network element pairs is included in the network elements. The measured network performance metric is such that a computed network performance metric between a first network element and a second network element of the network elements can be computed using the measured network performance metric.

In one aspect of this embodiment, the computed network performance metric is computed. In this aspect, the computed network performance metric is computed between a first network element and a second network element of a network element pair in a second set of network element pairs, using the measured network performance metric (as noted above). The first network element and the second network element of the network element pair in the second set of network element pairs can, for example, be included in the network elements. Moreover, the first set of network element pairs can, for example, be included in a second set of network element pairs.

In another embodiment of the present invention, a method of determining a network performance metric in a network is described. The network includes a number of network elements. Each one of the network elements is coupled to at least one other network element by at least one of a number of links. The method begins by identifying pairs of the network elements as being in a first set of network element pairs. Next, a first matrix is generated from the first set of network element pairs. Each row in the first matrix corresponds to a corresponding network element pair in the first set of network element pairs. The first matrix includes independent rows and non-independent rows. A second set of network element pairs is then formed. The second set of network element pairs contains independent network element pairs in the first set of network element pairs. Each one of the independent pairs of network element corresponds to one of the independent rows of the first matrix. Next, a measured network performance metric is measured between a first network element and a second network element of each network element pair in the second set of network element pairs. Finally, a computed network performance metric between a first network element and a second network element of a remaining network element pair in the first set of network element pairs is computed using at least one of the measured network performance metrics. The remaining network element pair corresponds to a non-independent row of the first matrix.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1A:
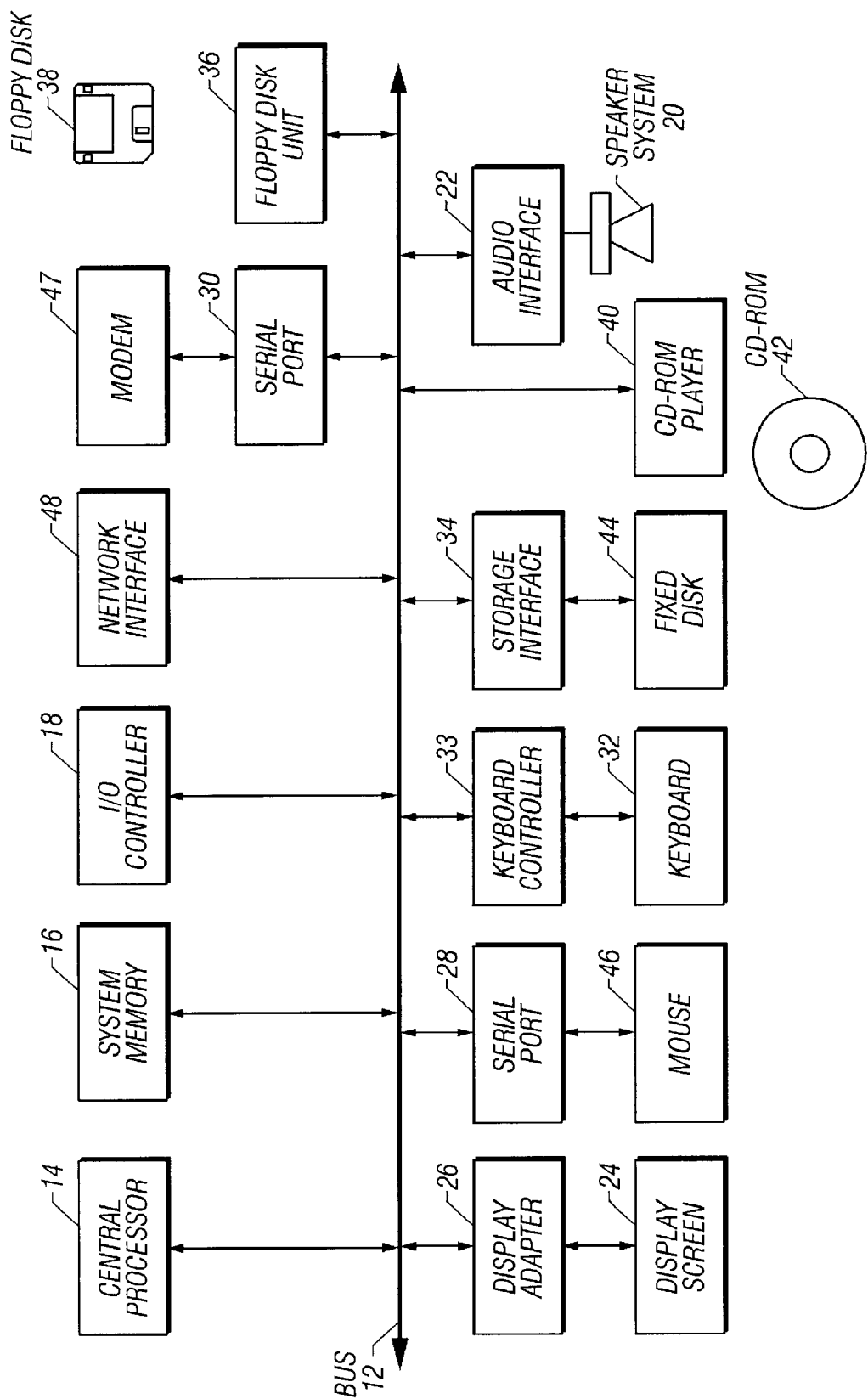
FIG. 1A is a block diagram illustrating a computer system.

The following is intended to provide a detailed description of an example of the invention and should not be taken to be limiting of the invention itself. Rather, any number of variations may fall within the scope of the invention which is defined in the claims following the description.

Introduction

Embodiments of the measurement techniques described herein address the central issue of scalability. These methods allow (a)network performance metrics, such as delay and jitter, to be measured between a significantly smaller subset of pairs of routers, and (b) the corresponding metrics for the remaining specified pairs of routers to be computed based on these measurements. These methods include (a) the identification of network paths for which measurements must be undertaken, and (b) the computation of the metrics for the remaining specified pairs of routers for which measurements are not taken.

A definition of the following terms is helpful to the subsequent discussion regarding embodiments of the present invention:
1. The "requirements set" is defined herein as the specified collection of pairs of routers for which delay and jitter metrics are to be obtained.
2. The "measurements set" is defined herein as the set of router pairs for which delay/jitter measurements are to be taken. A fundamental property of the measurements set is that, based on measurements thus obtained, one can accurately estimate delay/jitter metrics for all pairs of routers specified in the requirements set.

The methods described herein are based on a technique that divides the end-router-to-end-router path in terms of processing delay within the source and destination routers and the IP-level transfer delay over intermediate link(s) (and router(s), if any) in the network path between the end-routers. Moreover, techniques according to embodiments of the present invention can also be used in scenarios in which the internal topology of the network being analyzed is unknown. Central to these concepts is (a) the identification of a minimal measurements set from a given requirements set and (b) the estimation of delay and jitter for pairs of routers in the requirements set.

The methods described herein are such that only a minimal set of pairs of routers need be identified. This minimal set can be constructed such that the set's size is no more than N+M (the sum of the number of network routers and links). Even though the exact size of the measurements set depends upon the topology, routing, and the specified requirements set, a method according to the present invention results in a considerable savings in network traffic caused by the measurement process. To illustrate, in a network having 300 routers and 900 links, if the requirements set includes 5000 pairs of routers, the method identifies a "measurement set" consisting of at most 1200 pairs of routers (a saving of at least 76%). As another example, in a network having 200 access-routers connected using a 10-node fully connected mesh backbone, the savings can be significantly higher depending upon the specified requirements set. A more complete comparison is presented subsequently.

The methods described herein can be extended to handle a requirements set that includes a significant fraction of all pairs of routers. To cope with such cases, the method can be made to directly identify the measurements set and the estimation scheme, without having to process each pair of routers specified in the requirements set. It will be noted that, although the techniques disclosed herein are generally applicable to various network protocols and topologies, these techniques are discussed herein in terms of TCP/IP protocols.

Other than resulting in considerably reduced network traffic due to probe packets, a monitoring scheme based on this method enables one to estimate the IP-level transfer delay over each router-to-router link in the network. Such an estimate factors out the delay in processing (generating/receiving) probe packets within a router. This is desirable because the delay in processing probe packets can be significant as a result of probes being generated and received within the application layer. It will be apparent to one skilled in the art that an assessment of IP-level transfer delay over each link assists a network administrator in identifying congested links in a functioning network.

The methods described above are applicable to networks for which (a) topology and routing information is available, and (b) changes in topology and routing are infrequent. These methods may also be extended to apply to networks that are built around a network backbone, the topology and routing of which are unknown. Such a method directly provides a measurements set and a scheme for estimating delay and jitter between the routers on such a network. As a result, one is also able to apportion the delay-components between the enterprise network and the backbone network.

The techniques described herein provide several advantages. These techniques address the fundamental concern of a measurement scheme's scalability in monitoring delay and jitter in increasingly large networks, with known or partly known topology and routing. The techniques result in a significant reduction in network traffic overhead due to exchange of probe packets when compared to existing techniques. The savings can be especially significant in networks having a large requirements set. Further, the methods described herein separately account for IP-level transfer delay over a link and the delay in processing probe packets within a router (i.e., the delay experienced in generating and/or receiving such packets), thereby helping to isolate and identify links that are over or under provisioned. Simplicity and ease of implementation are also attractive feature of these techniques.

The following discussion of measurement schemes according to various embodiments of the present invention is divided into four primary sections. First is a description of measurement technique that uses a minimal number of router pairs to measure delay and jitter in an enterprise network having a known topology. Next, a scheme for taking measurements using a large number of router pairs to measure delay and jitter in an enterprise network having a known topology is discussed. The estimation of delay and jitter in an enterprise network coupled to a backbone having an unknown topology is then discussed. In effect, this situation deals with a portion of the network being unknown (e.g., a service provider backbone) and making the requisite estimation using a minimal measurements set. This discussion includes making such estimations with regard to virtual links between routers within the backbone. Finally, estimation of delay and jitter in an enterprise network coupled to a backbone having an unknown topology and using a large number of router pairs is examined.

I. Measurements Using a Minimal Number of Router Pairs in a Network Having a Known Topology An active network monitoring tool (referred to generically herein as an ANMT) can be used to measure round-trip delay, delay variation (jitter) and packet loss between a specified set of pairs of routers (or a network switch with a router switch module or an attached one-arm router) in a large diff-serv enabled enterprise network. By design, ANMT software running as an application on a router (e.g., a source router), sends a sequence of user datagram protocol (UDP) packets (also known as probe packets) to a specified port on a remote device (e.g., a destination router). Based on information contained in UDP responses received from the destination, the ANMT software run on the source computes various statistics, such as average round-trip delay, standard deviation of delay jitter, and average fraction of packets dropped. An ANMT may also be used to test TCP-level connectivity or to estimate one-way packet loss and delay-variation. Additionally, an ANMT allows monitoring of performance between devices in a network which offers differentiated services.

A method according to one embodiment of the present invention permits the use of a network measurement tool (e.g., an ANMT) to measure round-trip delay and jitter between a much smaller subset of pairs of routers (represented herein by the notation $\Omega$), in order to estimate delay and jitter between pairs of routers in a specified set (represented herein by the notation $\Phi$). This subset $\Omega$ includes at most (N+M) pairs of routers, where N is the number of enterprise routers, and M is the number of links. This is a significant improvement over the complexity of measuring delay between every pair of routers in the set $\Phi$ using a tool such as an ANMT. It will be noted that the number of pairs of routers in $\Phi$ may be as large as N(N+1)/2, or $O(N^2)$. Second, the techniques discussed herein recognize that delay encountered in generating, receiving and processing probe packets within the transport and application layers in a router may be significant.

FIG. 1A depicts a block diagram of a computer system 10 suitable for implementing the present invention, and exemplary of one or more of client terminals 112(1)–(N). Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and a CD-ROM drive 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., CD-ROM drive 40), floppy disk unit 36 or other storage medium. Additionally, applications may be in the form of electronic signals modulated in accordance with the application and data communication technology when accessed via network modem 47 or interface 48.

Storage interface 34, as with the other storage intefaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence).

Many other devices or subsystems (not shown) may be connected in a similar manner. Conversely, it is not necessary for all of the devices shown in Fig. to be present to practice the present invention. The devices and subsystems may be interconnected in different ways from that shown in FIG. 1A. The operation of a computer system such as that shown in FIG. 1A is readily known in the art and is not discussed in detail in this application. Code to implement the present invention may be operably disposed or stored in computer-readable storage media such as one or more of system memory 16, fixed disk 44, CD-ROM 42, or floppy disk 38.

It will be noted that the variable identifier "N" is used in several instances in FIG. 1A to more simply designate the final element (e.g., servers 110(1)–(N) and client terminals 112(1)–(N)) of a series of related or similar elements (e.g., servers and client terminals). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified)

between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 10). It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Figure 1B:
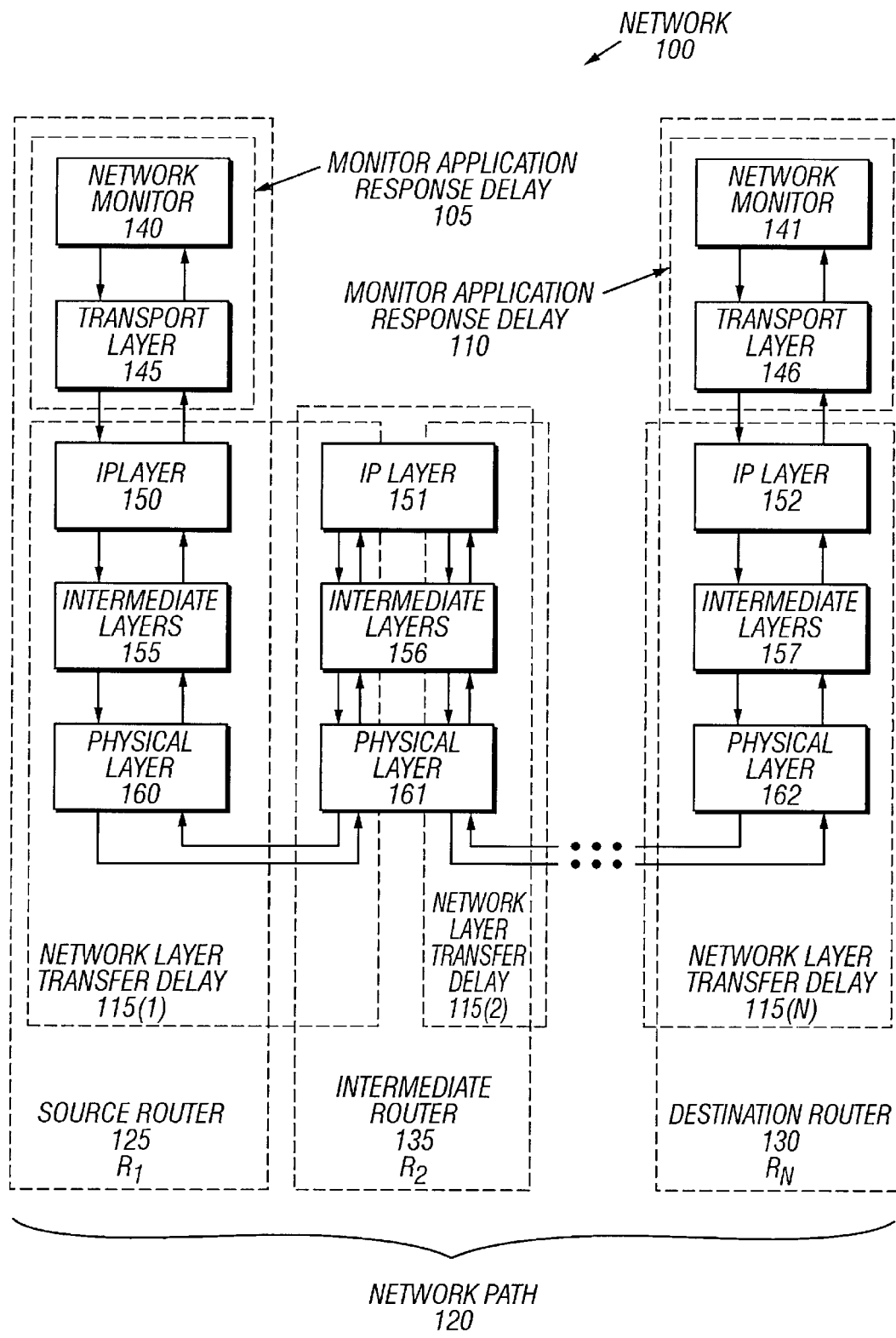
FIG. 1B is a block diagram illustrating the various sources of delay encountered by network traffic transiting a network.

FIG. 1B depicts a block diagram illustrating the various sources of delay encountered by network traffic transiting a network 100. While a method according to an embodiment of the present invention may be practiced using any one of a number of protocols, FIG. 1B is illustrated in terms of a TCP/IP network protocol. Delay can be apportioned into monitor application response delay (exemplified in FIG. 1B by monitor application response delays 105 and 110) and network layer transfer delays (exemplified in FIG. 1B by network layer transfer delays 115(1)–(N)) over an (end-to-end) network path 120 between a source router 125 and a destination router 130. In transiting network 100, network path 120 may also transit one or more intermediate routers (exemplified in FIG. 1B by an intermediate router 135). Source router 125, intermediate router 135 and destination router 130 are also designated as $R_1$, $R_2$, and $R_N$, indicating the progression of network traffic transiting network 100. In a TCP/IP environment such as that of network 100, monitor application delays 105 and 110 include, respectively, delays attributable to a network monitor 140, and transport layer 145, a transport layer 146 and a network monitor 141. In a similar fashion, network layer transfer delays 115(1)–(N) include delays attributable to moving IP packets through and between IP layers 150, 151 and 152, intermediate layers 155, 156 and 157, and physical layers 160, 161 and 162, in the manner shown in FIG. 1B. As can be seen in FIG. 1B, the two principle types of delay components contributing to the round-trip delay between a pair of routers such as source router 125 and destination router 130 when measured using an ANMT can be defined as:

$d_j$, j=1, 2, ..., M, the round-trip IP-level delay in transferring an IP packet over a link, $L_j$, between two adjacent routers; and $s_i$, i=1, 2, ..., N, the time to generate, receive and process a probe packet within transport and application layers in a router, $R_i$.

The symbols used herein in describing techniques according to various embodiments of the present invention for estimating round-trip delay and jitter between a specified set of pairs of routers are now presented.

Figure 2:
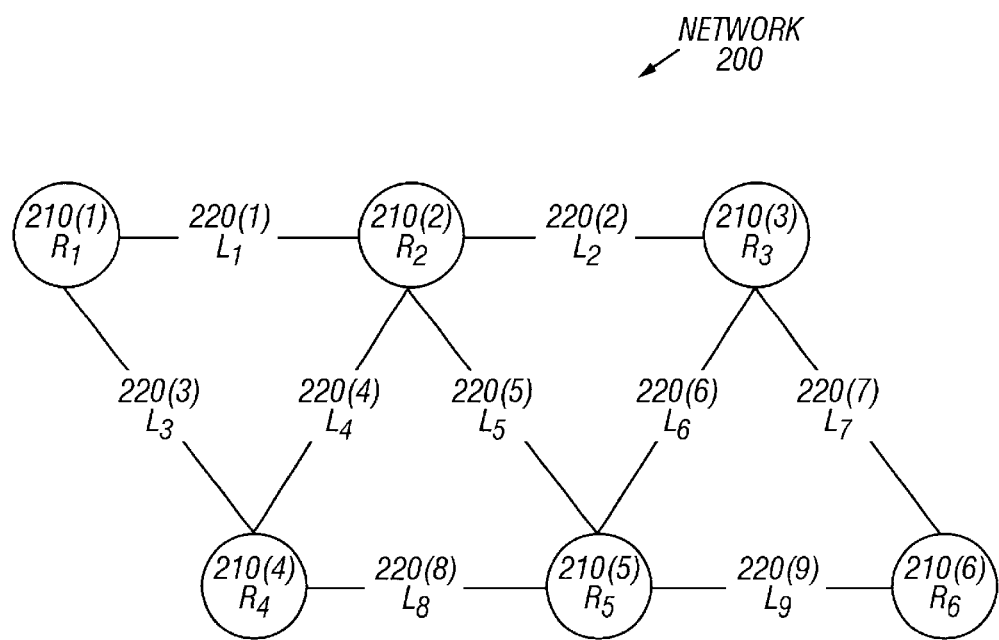
FIG. 2 is a block diagram depicting a network in which a delay measurement technique according to an embodiment of the present invention can be practiced.

FIG. 2 is a block diagram depicting a network 200 that illustrates the components of the delay existing between various pairs of routers that make up network 200. As is illustrated in FIG. 2, network 200 includes a number of routers (exemplified in FIG. 2 by routers 210(1)–(6)) which are coupled to one another by a number of interconnecting links (exemplified in FIG. 2 by links 220(1)–(9)). In order to facilitate the following discussions, routers 210(1)–(6) are also designated $R_1$–$R_6$, respectively. In similar fashion, links 220(1)–(9) are referred to using $L_1$–$L_9$, respectively. In the general sense, network 200 can be described as including N routers, $R_i$, i=1, 2, ..., N, and M interconnecting links, $L_j$, j=1, 2, ..., M. A route between a given pair of routers, $\pi_k=(R_i, R_j)$, is specified as an ordered list of intermediate links that network traffic between $R_i$ and $R_j$ traverses:

$$\text{link\_path}(R_i, R_j) = <L_p, L_q, \ldots, L_r> \quad (1)$$

That is, network traffic moving from source router $R_i$ to destination router $R_j$ traverse the links, $L_p, L_q, \ldots,$ and $L_r$ in that order, and vice-versa, in the other direction.

For a given DS codepoint, the routes between routers, $R_i$ and $R_j$, are given in Table 1. It will be noted that the routes in Table 1 are specified for a given DS codepoint, and in terms of intermediate links.

TABLE 1

Routing table for network given in FIG. 2.

|  | $R_1$ | $R_2$ | $R_3$ | $R_4$ | $R_5$ | $R_6$ |
| --- | --- | --- | --- | --- | --- | --- |
| $R_1$ | — | $L_1$ | $L_1, L_2$ | $L_3$ | $L_3, L_8$ | $L_3, L_8, L_9$ |
| $R_2$ |  | — | $L_2$ | $L_4$ | $L_5$ | $L_2, L_7$ |
| $R_3$ |  |  | — | $L_6, L_8$ | $L_6$ | $L_7$ |
| $R_4$ |  |  |  | — | $L_8$ | $L_8, L_9$ |
| $R_5$ |  |  |  |  | — | $L_9$ |
| $R_6$ |  |  |  |  |  | — |

As noted, the two principal types of delay components that contribute to the round-trip delay between a pair of routers when measured using an ANMT can be defined as $d_j$, j=1, 2, ..., M (the round-trip IP-level delay in transferring an IP packet over a link, $L_j$), and $s_i$, i=1, 2, ..., N (the time to generate, receive and process a probe packet within transport and application layers in a router, $R_i$).

As a result, the round-trip delay between any given pair of routers, $R_i$ and $R_j$, is given by:

$$\text{Delay}(R_i, R_j) = s_i + d_p + d_q + \ldots + d_r + s_j \quad (2)$$

assuming that the route between $R_i$ and $R_j$ is known and specified in terms of the intermediate links. That is, $$\text{link\_path}(R_i, R_j) = <L_p, L_q, \ldots, L_r> \quad (3)$$

When used between routers, $R_i$ and $R_j$, a delay monitoring tool such as an ANMT measures Delay($R_i$, $R_j$) (which may include measurement error). The requirements set and measurements set can now be defined using the framework set forth above.

The user-specified requirements set of P number of pairs of routers between which round-trip delay is to be measured is given by $$\Phi = \{\pi_k, k=1, 2, \ldots, P\} \quad (4)$$

where $$\pi_k=(R_i, R_j) \quad (5)$$

and so $$\Phi=\{(R_i, R_j), i,j=1, 2, \ldots, P\} \quad (6)$$

Normally, the subset will only be a small fraction of all possible pairs of routers. As noted, because round-trip delay or jitter is monitored, it is immaterial whether the pair of routers is specified as $\pi_k=(R_i, R_j)$ or as $\pi_k=(R_j, R_i)$.

The estimate is based on measurements between a subset of pairs of routers (and indeed what can be a minimal subset of router pairs), which may be referred to by $\Omega$. That is, for every $(R_i, R_j)\in\Phi$, the delay between the pair of routers $(R_i, R_j)$ can be computed (or estimated) in terms of measured delay between one or more pairs of routers $\{(R_p, R_q)\}\in\Omega$. The set, $\Omega$, is also referred to herein as the measurements set. A method according to the present invention identifies the measurements set, $\Omega$, for a given requirements set, $\Phi$.

Determination of the Measurements Set

A method according to an embodiment of the present invention is now described that is capable of identifying the collection of pairs of routers, or $\Omega$, such that the delay between a given pair of routers $(R_i, R_j)\in\Phi$ can be computed from measurements between a subset of pairs of routers $(R_p, R_q)\in\Omega$.

If the number of pairs of routers in $\Phi$ is defined as P (or, $P=|\Phi|$), the round-trip delay between the $k^{th}$ pair of routers, $(R_i, R_j)\in\Phi$ is denoted by $z_k=\text{Delay}(R_i, R_j)$. In view of the definition of delay components, it can be seen that, for every $k=1, 2, \ldots, P$:

$$z_k=\text{Delay}(R_i, R_j)=s_i+d_p+d_q+\ldots+d_r+s_j \quad (7a)$$

assuming that the route between $R_i$ and $R_j$ is known and given by $$\text{link\_path}(R_i, R_j)=<L_p, L_q, \ldots, L_r> \quad (7b)$$

Using a vector notation, $z_k=\text{Delay}(R_i, R_j)$ may be re-written as $$z_k = \text{Delay}(R_i, R_j) \quad (8a)$$
$$= s_i + d_p + d_q + \ldots + d_r + s_j \quad (8b)$$
$$= F_k x \quad (8c)$$

And further, the set of $z_k$ ($k=1, \ldots, P$) can be re-written $$z=[z_1\ z_2\ \ldots\ z_P]^T$$

is a column vector of size P. Further, $$F_k=[0\ \ldots\ 0\ 1\ 0\ \ldots\ 0\ 1\ 0\ \ldots\ 0\ 1\ 0\ \ldots\ 0\ 1\ 0\ \ldots\ 0\ 1\ 0\ \ldots\ 0] \quad (9)$$

is a row vector of size N+M, and the 1's in $F_k$ appear in columns p, q, $\ldots$, r, and in columns M+i and M+j.

The ordered collection of delay components can be re-written in the form of a vector of size N+M (the delay-components vector).

$$x=[d_1, d_2, \ldots, d_M, s_1, s_2, \ldots, s_N]^T \quad (10)$$

or $$x = \begin{bmatrix}[d_1]\\[d_2]\\[\ldots]\\[d_M]\\[s_1]\\[s_2]\\[\ldots]\\[s_N]\end{bmatrix} \quad (11)$$

As noted, the round-trip delay between the specified pairs of routers in $\Phi=\{\pi_k=(R_i, R_j), k=1, 2, \ldots, P\}$, where $z_k=F_k x$ and $k=1, 2, \ldots, P$, can be re-written as a vector equation $$z=Fx \quad (13)$$

where $$z = \begin{bmatrix}[z_1]\\[z_2]\\[\ldots]\\[z_P]\end{bmatrix}, \quad F = \begin{bmatrix}[F_1]\\[F_2]\\[\ldots]\\[F_P]\end{bmatrix} \quad (14)$$

The $P\times(N+M)$ matrix, F, plays an important role in determining the subset of pairs of routers between which delay measurements are necessary.

Consider the row vectors, $F_k$, $k=1, 2, \ldots, P$ and let Q be the maximum number of independent row vectors. As can be seen, Q is equal to the rank of matrix F (i.e., Rank(F)). Without loss of generality, $F_1\ F_2\ \ldots\ F_Q$ be the independent row vectors of matrix F. This is without loss of generality because the row vectors $F_k$ in F (and similarly the corresponding pairs of routers in $\Phi$) can be re-arranged, if necessary. Then, every row vector $F_k$, $k=Q+1, Q+2, \ldots, P$, can be expressed as a linear combination of row vectors, $F_k$, $k=1, 2, \ldots, Q$.

The relationship between the linearly independent and linearly dependent rows of F is now examined. If $F_1, F_2, \ldots, F_Q$ is a maximal set of linearly independent rows of F, then row vectors $F_{Q+1}, F_{Q+2}, \ldots, F_P$ can be expressed as a linear combination of $F_1, F_2, \ldots, F_Q$. In other words, $F_k$ can be expressed in terms of:

$$F_k=\Sigma_{i=1,\ldots,Q}(\alpha_{k,i}F_i), k=Q+1, Q+2, \ldots, P \quad (15)$$

The constants $\alpha_{k,i}$ may be re-organized in the form of a row vector (of size Q) in the following manner:

$$\alpha_k=[\alpha_{k,1}, \alpha_{k,2}, \ldots, \alpha_{k,Q}]\ k=Q+1, Q+2, \ldots, P \quad (16)$$

The values of $\alpha_K$ may be aggregated to form the $P\times Q$ matrix, A, which can be defined as:

$$A = \begin{bmatrix}[I]\\[\alpha_{Q+1}]\\[\alpha_{Q+2}]\\[\ldots]\\[\alpha_P]\end{bmatrix} \quad (17)$$

where the matrix, I, is a $Q\times Q$ matrix. Because delay ($z_k$) is a random variable, delay-jitter between pair of routers ($\pi_k=(R_i, R_j)$) can, be defined as follows:

$$\text{Delay-Jitter}(R_i, R_j)=\sqrt{E\{(z_k-E\{z_k\})^2\}} \quad (18)$$

where $E\{.\}$ is the expectation operation.

In regard to a measurement method according to certain embodiments of the present invention, certain assumptions concerning the network being analyzed are now summarized. The network is assumed to have the following characteristics:

For the embodiments discussed above, it is assumed that the network's topology is known. It will be noted that, because a route between a pair of routers is specified in terms of links, there is no constraint on the existence of parallel links between a pair of enterprise routers.

Further, it is preferable that the topology not change frequently. If the topology of the network changes, then the procedure described herein should be carried out afresh.

For each DS codepoint, the route between every pair of enterprise routers should be known.

The route between every pair of enterprise routers for a given DS codepoint is symmetric.

The delay and jitter characteristics between a pair of routers may be different in the two directions.

In other words, certain of the procedures described herein are preferably used together with techniques that monitor changes in topology and in routing in measuring delay and jitter in the network. Once a change in topology or in routing is detected by these techniques, the method according to an embodiment of the present invention should be performed once again.

As a consequence of the foregoing manipulations, certain results can be deduced. As outlined below, these results include:

1. the fact that, for every $(R_i, R_j) \in \Phi$, $Delay(R_i, R_j)$ can be expressed as a linear combination of one or more $Delay(R_p, R_q)$, $(R_p, R_q) \in \Omega$; and
2. the fact that the number of router-to-router delay measurements required to estimate delay between an arbitrarily specified subset of pairs of routers is at most M+N.

These results are set forth in detail below.

First Result

The first result is determined as follows. Consider the matrix $F=[F_1\ F_2\ \ldots\ F_P]^T$, corresponding to the given set of router pairs in the requirements set, $\Phi$. Then, the minimal subset of pairs of routers, $\Omega$, between which delay must be measured is given by the collection of all pairs of routers, $(R_p, R_q)$, that correspond to the maximal set of independent rows of F, with respect to $\{F_k, k=1, 2, \ldots, Q\}$. In other words, the measurements set can be represented as:

$$\Omega = \{(R_p, R_q), \text{ such that } Delay(R_p, R_q) = F_k x, k=1, 2, \ldots, Q\} \quad (19)$$

As a consequence, for every $(R_i, R_j) \in \Phi$, $Delay(R_i, R_j)$ can be expressed as a linear combination of one or more $Delay(R_p, R_q)$, where $(R_p, R_q) \in \Omega$.

The above result is illustrated by the following example. Consider the network of FIG. 2, where N=6, M=9. If the requirements set, $\Phi = \{(R_3, R_4)\ (R_3, R_5)\ (R_4, R_6)\ (R_5, R_6)\}$, then from routing table given in Table 1 for a given DS codepoint:

$$z_1 = Delay(R_3, R_4) = s_3 + d_6 + d_8 + s_4$$

$$z_2 = Delay(R_3, R_5) = s_3 + d_6 + s_5$$

$$z_3 = Delay(R_4, R_6) = s_4 + d_8 + d_9 + s_6$$

$$z_4 = Delay(R_5, R_6) = s_5 + d_9 + s_6$$

That is, $$z = [z_1\ z_2\ z_3\ z_4]^T = Fx \quad (20)$$

where $$x = [d_1, d_2, \ldots, d_9, s_1, s_2, \ldots, s_6]^T \quad (21)$$

The F matrix is a 4×15 matrix of the form:

|       | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|-------|-------|-------|-------|-------|-------|-------|-------|-------|-------|-------|-------|-------|-------|-------|-------|
| $z_1$ |       |       |       |       |       | 1     |       | 1     |       |       |       | 1     | 1     |       |       |
| $z_2$ |       |       |       |       |       | 1     |       |       |       |       |       | 1     |       | 1     |       |
| $z_3$ |       |       |       |       |       |       |       | 1     | 1     |       |       |       | 1     |       | 1     |
| $z_4$ |       |       |       |       |       |       |       |       | 1     |       |       |       |       | 1     | 1     |

It is verified subsequently herein that Rank(F)=3, and that $z_2$, $z_3$ and $z_4$ are independent row vectors, and that $z_1 = z_2 + z_3 - z_4$. Thus, the measurements set, $\Omega = \{(R_3, R_5),\ (R_4, R_6), (R_5, R_6)\}$.

Using a different requirements set for network 200, if $$\Phi = \{(R_1, R_2), (R_2, R_3), (R_1, R_4), (R_2, R_4), (R_2, R_5), \quad (22)$$

$$(R_3, R_5), (R_3, R_6), (R_4, R_5), (R_5, R_6), (R_1, R_3),$$

$$(R_2, R_6), (R_1, R_5), (R_4, R_6), (R_1, R_6)\}$$

the resulting matrix F is

|       | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|-------|-------|-------|-------|-------|-------|-------|-------|-------|-------|-------|-------|-------|-------|-------|-------|
| $z_1$ | 1     |       |       |       |       |       |       |       |       | 1     | 1     |       |       |       |       |
| $z_2$ |       | 1     |       |       |       |       |       |       |       |       | 1     | 1     |       |       |       |
| $z_3$ |       |       | 1     |       |       |       |       |       |       | 1     |       |       | 1     |       |       |
| $z_4$ |       |       |       | 1     |       |       |       |       |       |       | 1     |       | 1     |       |       |
| $z_5$ |       |       |       |       | 1     |       |       |       |       |       | 1     |       |       | 1     |       |
| $z_6$ |       |       |       |       |       | 1     |       |       |       |       |       | 1     |       |       | 1     |

-continued

| | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|---|---|---|---|---|---|---|---|---|---|---|---|---|---|---|---|
| $z_7$ | | | | | | | 1 | | | | | 1 | | 1 | 1 |
| $z_8$ | | | | | | | | 1 | | | | | 1 | 1 | |
| $z_9$ | | | | | | | | | 1 | | | | | 1 | 1 |
| $z_{10}$ | 1 | 1 | | | | | | | | 1 | | 1 | | | |
| $z_{11}$ | | 1 | | | | | 1 | | | | 1 | | | | 1 |
| $z_{12}$ | | | 1 | | | | | 1 | 1 | | | | 1 | | |
| $z_{13}$ | | | | | | | | 1 | 1 | | | | 1 | | 1 |
| $z_{14}$ | | | 1 | | | | | 1 | 1 | 1 | | | | | 1 |

It can be shown that the matrix F has rank 13, and that the first 13 rows of F are independent. Further, $z_{14}=z_{12}+z_{13}-z_8$. Thus $\Omega=\{(R_1, R_2), (R_2, R_3), (R_1, R_4), (R_2, R_4), (R_2, R_5), (R_3, R_5), (R_3, R_6), (R_4, R_5), (R_5, R_6), (R_1, R_3), (R_2, R_6), (R_1, R_5), R_4, R_6)\}$. It will be noted that $\Omega$ is also the subset of measurements required to estimate the delay between an arbitrary pair of routers. The second result is now examined.

Second Result

The minimal subset of pairs of routers, between which delay should be measured, so that delay between every other pair of routers can be obtained, can also be determined. The number of router-to-router delay measurements required to estimate delay between an arbitrarily specified subset of pairs of routers is at most M+N. In other words:

$$Q=|\Omega|=\text{Rank}(F) \leq \min(|\Phi|, N+M) \quad (23)$$

This is so, because the matrix, F, is a $|\Phi|\times(M+N)$, the rank of which, with respect to Q, is at most $|\Phi|$ or (M+N), whichever is smaller. As is evident from the approximate minimum savings in network traffic set forth in Table 2 below, the advantages provided by the foregoing results can be substantial.

The theoretical underpinnings of the foregoing results are now examined.

Theoretical Underpinnings of the Measurement Scheme

A measurement scheme according to certain embodiments of the present invention, as described herein, makes Q measurements between the collection of Q pairs of routers, specified by $\Omega$. It will be noted that $Q=|\Omega|$, and that $\Omega$ is the collection of pairs of routers, $(R_p, R_q)$, that correspond to the maximal set of independent rows of F, with respect to $\{F_k, k=1, 2, \ldots, Q\}$ (i.e., the measurements set).

Network analysis agents (e.g., ANMTs) can be executed, for example, as transport applications in two routers, $R_i$ and $R_j$, to measure round-trip delay and jitter between $R_i$ and $R_j$. Such a measurement, denoted $y_k$ yields:

$$y_k=\text{Delay}(R_i, R_j)+v_k=s_i+d_p+d_q+\ldots+d_r+s_j+v_k \quad (24)$$

It is assumed that the intermediate links between the two routers are $L_p, L_q, \ldots, L_r$, that the measurement error is $v_k$. As noted, processing delays encountered by probe packets within source and destination routers, $R_i$ and $R_j$, respectively, are defined as $s_i$ and $s_j$, and $d_p, d_q, \ldots, d_r$ are

TABLE 2

Approximate minimum saving in terms probe packet traffic.

| N | N*(N − 1)/2 | M | N + M | % monitored | P | max-Q | % savings |
|---|---|---|---|---|---|---|---|
| 20 | 190 | 60 | 80 | 5 | 9 | 9 | — |
| | | | | 10 | 19 | 19 | — |
| | | | | 20 | 38 | 38 | — |
| | | | | 40 | 76 | 76 | — |
| | | | | 80 | 152 | 80 | 47.37 |
| | | 100 | 120 | 5 | 9 | 9 | — |
| | | | | 10 | 19 | 19 | — |
| | | | | 20 | 38 | 38 | — |
| | | | | 40 | 76 | 76 | — |
| | | | | 80 | 152 | 120 | 21.05 |
| 80 | 3160 | 240 | 320 | 5 | 158 | 158 | — |
| | | | | 10 | 316 | 316 | — |
| | | | | 20 | 632 | 320 | 49.37 |
| | | | | 40 | 1264 | 320 | 74.68 |
| | | | | 80 | 2528 | 320 | 87.34 |
| | | 400 | 480 | 5 | 158 | 158 | — |
| | | | | 10 | 316 | 316 | — |
| | | | | 20 | 632 | 480 | 24.05 |
| | | | | 40 | 1264 | 480 | 62.03 |
| | | | | 80 | 2528 | 480 | 81.01 |
| 320 | 51040 | 960 | 1280 | 5 | 2552 | 1280 | 49.84 |
| | | | | 10 | 5104 | 1280 | 74.92 |
| | | | | 20 | 10208 | 1280 | 87.46 |
| | | | | 40 | 20416 | 1280 | 93.73 |
| | | | | 80 | 40832 | 1280 | 96.87 |
| | | 1600 | 1920 | 5 | 2552 | 1920 | 24.76 |
| | | | | 10 | 5104 | 1920 | 62.38 |
| | | | | 20 | 10208 | 1920 | 81.19 |
| | | | | 40 | 20416 | 1920 | 90.60 |
| | | | | 80 | 40832 | 1920 | 95.30 | round-trip IP-layer transfer delays encountered by probe packets over intermediate links along the route $$\text{link\_route}(R_i, R_j) = <L_p, L_q, \ldots, L_r> \tag{25}$$

The $k^{th}$ measurement, $y_k$, $k=1, 2, \ldots, Q$, of round-trip delay between the $k^{th}$ pair of routers, $R_i$ and $R_j$, in $\Omega$, may be re-written as:

$$y_k = \text{Delay}(R_i, R_j) + v_k = s_i + d_p + d_q + \ldots + d_r + s_j + v_k = F_k x + v_k \tag{26}$$

where the row vector (of size M+N)

$$F_k = [0 \ldots 0\ 1\ 0 \ldots 0\ 1\ 0 \ldots 0\ 1\ 0 \ldots 0\ 1\ 0 \ldots 0\ 1\ 0 \ldots 0] \tag{27}$$

and the 1's in $F_k$ appear in columns p, q, ..., r, and in columns M+i and M+j. The following can be defined:

$$y = [y_1\ y_2\ \ldots\ y_Q]^T \tag{28a}$$

$$x = [d_1, d_2, \ldots, d_M, s_1, s_2, \ldots, s_N]^T \tag{28b}$$

$$v = [v_1\ v_2\ \ldots\ v_Q]^T \tag{28c}$$

where vector y, of size Q, represents the collection of measurements, vector x, of size M+N, is the collection of delay components and vector v, of size Q, is the measurement error in y. The measurements, $y_k$, $k=1, 2, \ldots, Q$, taken together, may now be re-written in the form of a vector equation $$y = Hx + v \tag{29}$$

where the Q×(M+N) matrix $H = [F_1^T\ F_2^T\ \ldots\ F_Q^T]^T$. Because the k measurements correspond to pairs of routers identified by $\Omega$, the row vectors, $F_k$, $k=1, 2, \ldots Q$, are all independent. As a consequence, matrix H has full rank with respect to Q.

Consider, for example, the network given in FIG. 2, where N=6 and M=9. The routes between pairs of routers, $R_i$ and $R_j$, are given in Table 1. Let $\Omega = \{(R_3, R_5)(R_4, R_6)(R_5, R_6)\}$ be the specified subset of pairs between which delay is measured. From Table 1, $$y_1 = \text{Delay}(R_3, R_5) + v_1 = s_3 + d_6 + s_5 + v_1 \tag{30a}$$

$$y_2 = \text{Delay}(R_4, R_6) + v_2 = s_4 + d_8 + d_9 + s_6 + v_2 \tag{30b}$$

$$y_3 = \text{Delay}(R_5, R_6) + v_3 = s_5 + d_9 + s_6 + v_3 \tag{30c}$$

That is, $$y = Hx + v \tag{31}$$

where $$y = [y_1\ y_2\ y_3]^T \tag{32a}$$

$$x = [d_1, d_2, \ldots, d_9, s_1, s_2, \ldots, s_6]^T \tag{32b}$$

$$v = [v_1\ v_2\ v_3]^T \tag{32c}$$

and 3×15 matrix H is:

Calculating Delay within a Requirements Set Using a Measurements Set

In this section, a methodology for computing the round-trip delay between every pair of routers within a given requirements set, $(R_i, R_j) \in \Phi$, based on measurements between pairs of routers identified by the measurements set, $\Omega$ (a subset of the requirements set), is described. This approach is particularly useful when measurement errors are negligible.

As previously noted, the delay vector (z) corresponding to the requirements set is given by $$z = Fx \tag{33}$$

while the measurement vector (y) corresponding to the measurements set is given by $$y = Hx \tag{34}$$

where $$H = [F_1^T\ F_2^T\ \ldots\ F_Q^T]^T \tag{35}$$

Because $\{F_1, F_2, \ldots, F_Q\}$ is the maximal set of independent rows of F, every row vector Fk can be expressed as a linear combination of $F_1, F_2, \ldots F_Q$. As a result $$z = Fx = AHx \tag{36a}$$

where $$A = [I\alpha^T]^T \tag{36b}$$

and the row vectors $\alpha_k$, $k=Q+1, Q+2, \ldots P$ are used to express $F_k$ in terms of $F_1, F_2, \ldots F_Q$ (as discussed above in equation (17)).

A General Procedure for Employing a Measurements Set in Determining Delay for a Requirements Set A procedure to deterministically compute the round-trip delay between pairs of routers, given by $\Omega$, from measured round-trip delay between the Q number of pairs of routers, identified by $\Omega$, can be defined using the preceding results. As can be seen, the computed round-trip delay, $\Delta$, between the P pairs of routers in $\Phi$ is given by $$\Delta = Ay \tag{37}$$

where $y_k$, $k=1, \ldots, Q$, are delay measurements between the Q pairs of routers in $\Omega$, and $\Delta_j$, $j=1, 2, \ldots, P$, are delay between the P pairs of routers in $\Phi$.

Figure 3:
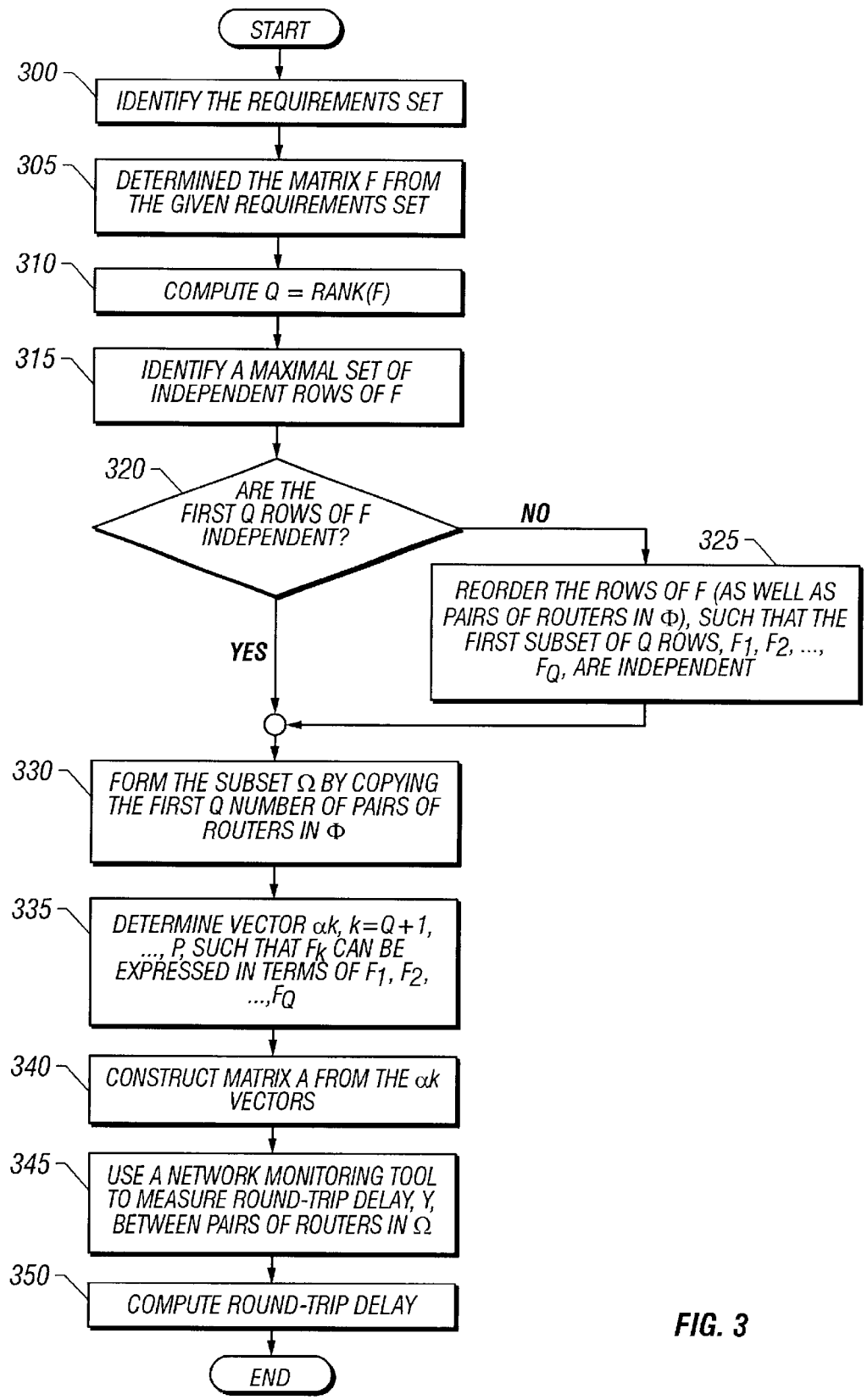
FIG. 3 is a flow diagram illustrating a process for computing the round-trip delay between pairs of routers according to an embodiment of the present invention.

FIG. 3 illustrates a process of deterministically computing the round-trip delay between pairs of routers. The process begins with the identification of the requirement set (step 300). The F matrix is then determined from the given requirements set (step 305). Once the F matrix has been derived, the rank of F is computed (step 310). The rank of F indicates the number of independent rows contained in F. The rank of F may be represented, for example, by Q. Once the rank of F has been computed, a maximal set of independent rows of F is identified (step 315). If the first Q rows

| | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|---|---|---|---|---|---|---|---|---|---|---|---|---|---|---|---|
| $Y_1$ | | | | | | 1 | | | | | | 1 | | 1 | |
| $Y_2$ | | | | | | | | 1 | 1 | | | | 1 | | 1 |
| $Y_3$ | | | | | | | | | 1 | | | | | 1 | 1 | of F are not independent (step 320), the rows of F (as well as router pairs in the requirement set) are reordered such that the first subset of Q row (i.e., $F_1, F_2, \ldots, F_Q$) are independent (step 325).

Once the rows of F (and router pairs in the requirements set) have been reordered, or if such reordering is unnecessary (i.e., the first Q rows of F are independent) (step 320), the first Q pairs of routers in Φ (router pairs in the requirements set) are copied to form the subset of Ω, also referred to herein as the measurements set (step 330). Once the measurement set Ω (or equivalently, the set of independent vectors F1, F2, ..., FQ) have been identified, row vectors of $\alpha_k$, are derived such that $F_k$ can be expressed as $F_k = \alpha_{k1}F_1 + \alpha_{k2}F_2 + \ldots + \alpha_{kQ}F_Q$. This is done for each value of k=Q+1, Q+2, ..., P (step 335). From these vectors, the A matrix is constructed (step 340). A network monitoring tool is then used to measure round-trip delay between pairs of routers identified by Ω, and the measurements are organized in the form of a column vector, y, of size Q (step 345). The round-trip delay can then be computed using the vectors thus derived (step 350). The above procedure may be summarized as follows:

BEGIN
 Input requirements set Φ;
 Determine F matrix from the given requirements set, Φ, and the routing table;
 Q=Rank(F);
 Identify a maximal set of independent rows of F;
 If necessary, reorder the rows of F (as well as pairs of routers in Φ), such that the first subset of Q rows, $F_1$ $F_2 \ldots F_Q$, are independent;
 Copy the first Q number of pairs of routers in Φ to form the subset Ω;
 Determine vector $\alpha_k$, k=Q+1, ..., P, such that $F_k$ can be expressed in terms of $F_1, F_2, \ldots, F_Q$;
 Construct the A matrix;
 Measure round-trip delay between router pairs in Ω, and organize them as y.
 Compute round-trip delay using the equation Δ=Ay.
END It will be noted that a negligible measurement error is preferable. It will also be noted that only a subset of the non-independent rows of F (i.e., $F_k$, where k is one (or more) of Q+1, ..., P) may be of interest, in which case only a subset of the independent rows of F may be needed to describe such $F_k$.

Each of the blocks of the flow diagram of FIG. 3, and those depicted in subsequent figures, may be executed by a module (e.g., a software module) or a portion of a module or a computer system user. The methods described herein, the operations thereof and modules for performing such methods may therefore be executed on a computer system configured to execute the operations of the method and/or may be executed from computer-readable media. The method may be embodied in a machine-readable and/or computer-readable medium for configuring a computer system to execute the method. The software modules may be stored within and/or transmitted to a computer system memory to configure the computer system to perform the functions of the module. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Those skilled in the art will also recognize that the boundaries between modules and operations depicted herein are merely illustrative and alternative embodiments may merge such modules or operations, or impose an alternative decomposition of functionality thereon. For example, the actions discussed herein may be decomposed into sub-operations to be executed as multiple computer processes. Moreover, alternative embodiments may combine multiple instances of a particular operation or sub-operation. Furthermore, those skilled in the art will recognize that the operations described in exemplary embodiment are for illustration only. Operations may be combined or the functionality of the operations may be distributed in additional operations in accordance with the invention. As will also be apparent to those of skill in the art, methods for determining delay and jitter described herein may employ other techniques (similar in effect to those described herein) to make such determinations, and such alternative techniques are intended to be comprehended by the methods and apparati discussed herein.

As an example of the operation of such a process, the network of FIG. 2 can again be considered, where N=6, M=9. The routes between pairs of routers, $R_i$ and $R_j$, are given in Table 1. Let Φ={$(R_3, R_4)$ $(R_3, R_5)$ $(R_4, R_6)$ $(R_5, R_6)$}. As before $$z = Fx \quad (38)$$

where $$z = [z_1\ z_2\ z_3\ z_4]^T \quad (39)$$

$$x = [d_1, d_2, \ldots, d_9, s_1, s_2, \ldots, s_6]^T \quad (40)$$

and the F matrix is a 4×15 matrix of the form:

|   | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|---|---|---|---|---|---|---|---|---|---|---|---|---|---|---|---|
| $z_1$ |  |  |  |  |  | 1 |  | 1 |  |  |  | 1 | 1 |  |  |
| $z_2$ |  |  |  |  |  | 1 |  |  |  |  |  | 1 |  | 1 |  |
| $z_3$ |  |  |  |  |  |  |  | 1 | 1 |  |  |  | 1 |  | 1 |
| $z_4$ |  |  |  |  |  |  |  |  | 1 |  |  |  |  | 1 | 1 |

Because Rank(F)=3, and $z_2$, $z_3$ and $z_4$ are independent row vectors, the row vectors, $F_k$, can be re-ordered as those corresponding to $z_2$, $z_3$, $z_4$, $z_1$. The re-ordered F matrix appears as:

|     | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|-----|-------|-------|-------|-------|-------|-------|-------|-------|-------|-------|-------|-------|-------|-------|-------|
| $z_2$ |       |       |       |       |       | 1     |       |       |       |       | 1     |       | 1     |       |       |
| $z_3$ |       |       |       |       |       |       |       | 1     | 1     |       |       | 1     |       | 1     | 1     |
| $z_4$ |       |       |       |       |       |       |       |       | 1     |       |       |       |       | 1     | 1     |
| $z_1$ |       |       |       |       |       |       | 1     | 1     |       |       |       | 1     | 1     |       |       |

The requirements set $\Phi$ is also reordered as $\{(R_3, R_5)(R_4, R_6)(R_5, R_6)(R_3, R_4)\}$. Further, $\Omega=\{(R_3, R_5), (R_4, R_6), (R_5, R_6)\}$. The resulting H matrix appears as:

|     | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|-----|-------|-------|-------|-------|-------|-------|-------|-------|-------|-------|-------|-------|-------|-------|-------|
| $y_2$ |       |       |       |       |       | 1     |       |       |       |       | 1     |       | 1     |       |       |
| $y_3$ |       |       |       |       |       |       |       | 1     | 1     |       |       | 1     |       | 1     | 1     |
| $y_4$ |       |       |       |       |       |       |       |       | 1     |       |       |       |       | 1     | 1     |

Now, because $z_1 = z_2 + z_3 - z_4$, the matrix $\alpha$ may be computed:

|       | $F_2$ | $F_3$ | $F_4$ |
|-------|-------|-------|-------|
| $F_1$ | 1     | 1     | -1    |

As a consequence, the A matrix appears as:

|       | $F_2$ | $F_3$ | $F_4$ |
|-------|-------|-------|-------|
| $F_2$ | 1     |       |       |
| $F_3$ |       | 1     |       |
| $F_4$ |       |       | 1     |
| $F_1$ | 1     | 1     | -1    |

The computed estimate of delay $z = [z_2 \; z_3 \; z_4 \; z_1]^T$ is given by $[\Delta_2 \; \Delta_3 \; \Delta_4 \; \Delta_1]^T = Ay = A[y_2 \; y_3 \; y_4]^T$.

A Formalized Description of a Method for Calculating Delay and Jitter within a Requirements Set Using a Measurements Set A procedure according to a method of the present invention that computes the round-trip delay and delay-jitter between every pair of routers in the requirements set (using every router pair $\pi_k = (R_i, R_j) \in \Phi$) using measurements between pairs of routers identified by the measurements set, $\Omega$, is now described using a formal syntax. The scheme is particularly useful when the measurement errors are small and no a priori delay measurements are available.

```
BEGIN
    /* The following procedure assumes that the topology and routing table,   */
    /* for a given DS codepoint, is known. Where necessary, this procedure    */
    /* is executed for each DS codepoint under consideration.                 */
    /* If the network topology and/or the routing changes, this procedure     */
    /* should be executed afresh with the new topology or new routing table.  */
    /* Specify the collection of pairs of routers */
    Φ = {π_k = (R_i, R_j), k = 1, 2, . . . , P};
    /* Construct the delay-components vector */
    x = [d_1, d_2, . . . , d_M, s_1, s_2, . . . , s_N]^T;
    For each k = 1, 2, . . . , P, do {
        Identify the pair of routers π_k = (R_i, R_j), π_k ∈ Φ;
        Obtain the route link_path(R_i, R_j) = <L_p, L_q, . . . , L_r>;
        Determine the row vector, F_k, such that z_k = Delay(R_i, R_j) = F_k × x
    };
    Construct the P × (N+M) matrix, F;
    Identify a maximal set of independent rows of F;
    Q = the number of maximal set of independent rows of F;
    If necessary, reorder rows of F and pairs of routers in Φ such that the first Q
        rows, F_1, F_2, . . . , F_Q, are independent;
    For each k = Q+1, Q+2, . . . , P, do {
        Determine α_{k,1}, α_{k,2}, . . . , α_{k,Q}, such that F_k = Σ_{i=1,...,Q}(α_{k,i} F_i);
        Construct the row vector α_k = [α_{k,1}, α_{k,2}, . . . , α_{k,Q}]
    };
    Copy the first Q pairs of routers from Φ to form the subset Ω;
    Identify the start time t_0, and the measurement interval, dt;
```

-continued

```
t₀ = start_time;   /* start_time will most likely be 0 (start at time 0) */
While (!finished) {
    For each k = 1, 2, . . . , Q, do {
        During the time interval, (t₀ = t₀+dt), use a network
            management tool (e.g., ANMT) to measure average
            round-trip delay, yₖ, and delay-jitter, γₖ, between the pair
            of routers, πₖ = (Rᵢ, Rⱼ)
    };
    /* Estimate round-trip delay vector, Δₖ, for each pair of routers in Φ */
    For each router pair in Φ {
        For each k = 1, 2, . . . , Q, do {
            Δₖ = yₖ
        };
        For each k = Q+1, Q+2, . . . , P, do {
            Δₖ = Σᵢ₌₁,...,Q(αₖ,ᵢ yᵢ)
        };
    }
    /* Compute round-trip delay-jitter, σₖ, for each pair of routers in Φ */
    For each router pair in Φ {
        For each k = 1, 2, . . . , Q, do {
            σₖ = γₖ
        };
        For each k = Q+1, Q+2, . . . , P, do {
            σₖ = √ Σᵢ₌₁,...,Q(αₖ,ᵢ²γᵢ²)
        };
    }
    t₀ = t₀+dt
}
END
```

As noted, the above scheme is applicable where no other delay measurements or a priori estimates are available and assumes that the measurement error is negligible.

As an example, network 200 may again be considered (network 200 has N=6, M=9, as noted). The routes between all pairs of routers, $R_i$ and $R_j$, are given in Table 1. Using the technique just described, the network can be analyzed as follows. Let $\Phi = \{\pi_1 = (R_3, R_4), \pi_2 = (R_3, R_5), \pi_3 = (R_4, R_6), \pi_4 = (R_5, R_6)\}$. The delay-component vector, $x = [d_1, d_2, \ldots, d_9, s_1, s_2, \ldots, s_6]^T$. Because $$z_1 = \text{Delay}(R_3, R_4) = s_3 + d_6 + d_8 + s_4 \quad (41a)$$

$$z_2 = \text{Delay}(R_3, R_5) = s_3 + d_6 + s_5 \quad (41b)$$

$$z_3 = \text{Delay}(R_4, R_6) = s_4 + d_8 + d_9 + s_6 \quad (41c)$$

$$z_4 = \text{Delay}(R_5, R_6) = s_5 + d_9 + s_6 \quad (41d)$$

the delay vector, $z = [z_1\ z_2\ z_3\ z_4]^T$, may be written as $z = Fx$, where the 4×15 matrix F is:

|       | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|-------|---|---|---|---|---|---|---|---|---|---|---|---|---|---|---|
| $z_1$ |   |   |   |   |   | 1 |   | 1 |   |   |   | 1 | 1 |   |   |
| $z_2$ |   |   |   |   |   | 1 |   |   |   |   |   | 1 |   | 1 |   |
| $z_3$ |   |   |   |   |   |   |   | 1 | 1 |   |   |   | 1 |   | 1 |
| $z_4$ |   |   |   |   |   |   |   |   | 1 |   |   |   |   | 1 | 1 |

Because $z_2$, $z_3$ and $z_4$ are independent row vectors, Q=3. The row vectors, $F_k$, are re-ordered as those corresponding to $z_2$, $z_3$, $z_4$, $z_1$. The re-ordered F is:

|       | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|-------|---|---|---|---|---|---|---|---|---|---|---|---|---|---|---|
| $z_2$ |   |   |   |   |   | 1 |   |   |   |   |   | 1 |   | 1 |   |
| $z_3$ |   |   |   |   |   |   |   | 1 | 1 |   |   |   | 1 |   | 1 |
| $z_4$ |   |   |   |   |   |   |   |   | 1 |   |   |   |   | 1 | 1 |
| $z_1$ |   |   |   |   |   | 1 |   | 1 |   |   |   | 1 | 1 |   |   |

Because $z_1=z_2+z_3-z_4$, the vector $\alpha_1[1\ 1\ -1]$. As a result, $\Omega=\{\pi_2=(R_3, R_5), \pi_3=(R_4 R_6), \pi_4=(R_5, R_6)\}$, with the corresponding H matrix of the form given in the previous example. Next, $t_0$ is set to 0, and dt is set to 60 (seconds), for example.

During the interval $(t_0, t_0+dt)$, a network probe tool is used to measure round-trip delay and jitter between pairs of routers, $\{\pi_2=(R_3, R_5), \pi_3=(R_4\ R_6), \pi_4=(R_5, R_6)\}$ to yield delay measurements, $y_2$, $y_3$, and $y_4$, and delay-jitter measurements, $\gamma_2$, $\gamma_3$, and $\gamma_4$. An estimate of delay between pairs of routers in $\Phi$ is given by $$\Delta_2=y_2 \qquad (42a)$$

$$\Delta_3=y_3 \qquad (42b)$$

$$\Delta_4=y_4 \qquad (42c)$$

$$\Delta_1=y_2+y_3-y_4 \qquad (42d)$$

An estimate of delay-jitter between pairs of routers in $\Phi$ is given by $$\sigma_2=\gamma_2 \qquad (43a)$$

$$\sigma_3=\gamma_3 \qquad (43b)$$

$$\sigma_4=\gamma_4 \qquad (43c)$$

$$\sigma_1=\sqrt{(\gamma_2^2+\gamma_3^2+\gamma_4^2)} \qquad (43d)$$

Measurement and estimation can then be repeated with $t_0=t_0+dt$.

II. Measurements for a Large Number of Router Pairs in a Network with Known Topology A method for estimating delay, including packet transfer delays and ANMT processing delays, for a requirements set containing a large number of nodes according to certain embodiments of the present invention is now described. Such a method accounts for the delay encountered in transferring information over links in a network, and also accounts for delays within the end-point nodes, and intermediate nodes along the path between the end-point nodes. Estimation of the vector x, includes IP-level transfer delay, $d_j$, over each link, $L_j$, and of processing delay caused by the network monitoring tool(s) employed within each router $R_i$ (defined as $s_i$) may be performed used a method described below. The need to estimate the IP-level delay over each link stems from the fact that a measurement between the pair of routers corresponding to a link, made using a network monitoring tool, generally include the time required to generate, receive and process probe packets within the pair of source and destination routers. To that end, an estimate of delay incurred due to protocol processing (referred to generically herein as IP-level transfer delay) over a link better reflects the delay that a typical packet (referred to generically herein as an IP packet) encounters over each hop.

If an estimate of delay due to processing within each router is additionally available, then one may estimate the delay experienced by probe packets between any pair of routers. In other words, once an estimate of vector x is available, an estimate of Delay($R_p$, $R_q$) may be obtained, because Delay($R_p$, $R_q$)=$F_k x$ for any specified pair of routers, ($R_p$, $R_q$).

The Measurements Set, $\Omega$

To review, the measurements set, $\Omega$, corresponding to all pairs of routers may be defined as the minimal subset of pairs of routers, between which delay should be measured so that delay between every pair of routers in the network can be obtained. The number of router-to-router delay measurements required to estimate delay between an arbitrarily specified subset of pairs of routers is at most M+N. As noted:

$$\Omega=|\Omega|=\text{Rank}(F)\leq \min(|\Phi|, N+M) \qquad (45)$$

This is so, because the matrix, F, is a $|\Phi|\times(M+N)$ matrix, the rank of which, with respect to Q, is at most the lesser of $|\Phi|$ or (M+N).

The approach outlined previously may be used to obtain the subset of pairs of routers, $\Omega$, between which delay and jitter measurements are made, corresponding to the set of all pairs of routers, $$\Phi=\{(R_i, R_j), i=1, 2, \ldots, N, j=1, 2, \ldots, N, i<j\} \qquad (46)$$

Such an approach requires that Delay($R_i$, $R_j$) be expressed as $F_k x$, for each pair of routers, k=1, 2, ..., N*(N-1)/2, and the maximal subset of linearly independent row vectors, $F_k$ be identified by determining the maximal set of independent set of row vectors. As can be seen, this can be a computationally complex procedure because the procedure involves vectors of order $N^2(O(N^2))$.

Alternatively, one may directly identify the subset $\Omega$. A method according to one embodiment of the present invention that identifies a smallest subset of pairs of routers, such that the delay between every other pair of routers can be expressed as a linear combination of delay between the pairs of routers in subset, $\Omega$, is described below. The size of the matrix, Q, is no more than N+M. Further, the corresponding $H=[H_1^T\ H_2^T\ \ldots\ H_Q^T]^T$, is of full rank, Q.

It will be noted that the size of $\Omega$ (i.e., Q) can be in fact smaller than N+M, if for some router, $R_i$, there does not exist a path between two routers, $R_p$ and $R_q$, such that the route between $R_p$, and $R_q$, passes through $R_i$. That is, for some $R_i$, $$\text{router\_path}(R_p, R_q)\neq <R_p, \ldots, R_i, \ldots R_q> \text{ for all } R_p\neq R_i \text{ and } R_q\neq R_i \qquad (47)$$

The immediate consequence of this observation is that it would not be possible to isolate, and thus separately estimate, the delay within router $R_i$ due to processing required by the network monitoring software, except in combination with delays over links connecting $R_i$ to its neighboring routers. The details of such a technique are now discussed.

A Measurement Scheme for Estimating Delay Components

A scheme according to an embodiment of the present invention capable of processing a requirements set having a large number of nodes is now described. The scheme provides an estimate of the delay and jitter between any arbitrarily specified pair of routers based on measurements between a subset of pairs of routers.

Figure 4:
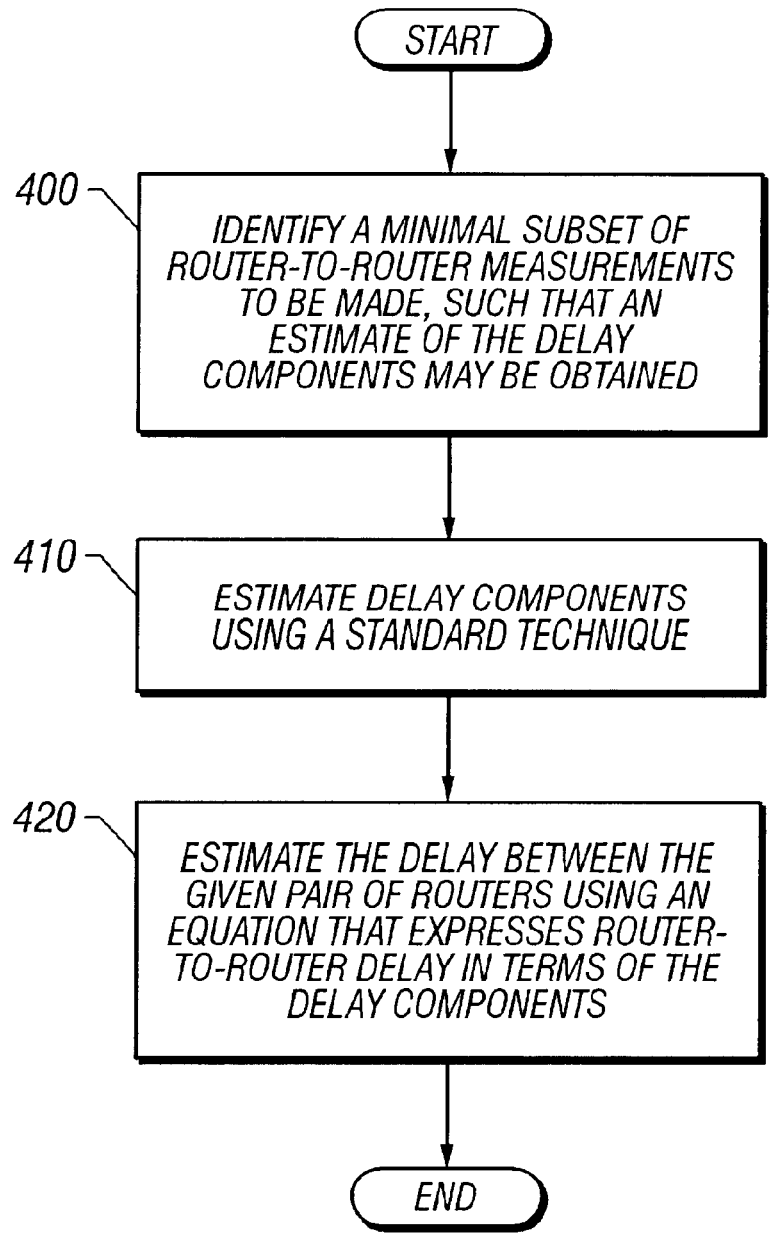
FIG. 4 is a flow diagram illustrating a scheme according to an embodiment of the present invention capable of processing a requirements set having a large number of nodes.

FIG. 4 is a flowchart depicting such a scheme, which includes the three steps illustrated therein.
1. Identification of a minimal subset of router-to-router measurements, $\Omega$, that must be made in order to obtain an estimate of delay components, $x=[d_1, d_2, \ldots, d_M, s_1, s_2, s_N]^T$ (step 400).
2. The use of a standard technique to estimate delay components (step 410).
3. The estimation of the delay between the given pair of routers using an equation that expresses router-to-router delay in terms of the delay components (step 420).

The Identification of Router-to-Router Measurements

Letting $\Omega$ be the minimal subset of Q number of pairs of routers between which measurements are made, the Q measurement, $y_k=z_k+v_k=H_k x+v_k$, k=1, 2, ..., Q, can be re-written as $$y=Hx+v \qquad (48)$$

where $$y = [y_1, y_2, \ldots, y_Q]^T \quad (49a)$$

$$v = [v_1, v_2, \ldots, v_Q]^T \quad (49b)$$

$$H = [H_1^T H_2^T \ldots H_{QT}]^T \quad (49c)$$

Thus, a method according to one embodiment of the present invention identifies the subset $\Omega$ such that the resulting matrix H has the maximum possible rank, $Q=|\Omega|$. In such an embodiment, row vectors are $H_1, H_2, \ldots, H_Q$ are independent. This can be represented, for example, in the following manner.

$H_k$ of the H matrix is determined, such that $Z_k=\text{Delay}(R_i, R_j)=H_k x$ (step 522). Once the elements of the H matrix have been determined, the H matrix is formed from the elements so determined (step 524). Once the H matrix has been formed, the rank Q of the H matrix is determined (step 526). It can be verified that Q must be $N+M-|\Omega|$.

The above method for identifying the subset $\Omega$ such that the resulting matrix H has the maximum possible rank is now outlined using a formal representation.

```
BEGIN
/* proposed set of pairs of routers, between which performance is to be measured */
Ω = {};
/* set of routers, ANMT processing time for which cannot be separately estimated */
Θ = {};
/* first M measurements are between adjacent routers */
For all links L_k, k = 1, 2, . . . , M, do{
    (R_i, R_j) = identify_router_pair(L_k)
    Ω = Ω + {(R_i, R_j)};
    };
/* N - |Θ| measurements are between certain pairs of routers adjacent to an R_i */
For all routers R_k, k = 1, 2, . . . , N, do {
    pair_identified = false;
    φ(R_k) = set_of_all_adjacent_routers(R_k);
    For all (R_i ∈ φ(R_k)) and (R_j ∈ φ(R_k)) and (R_i ≠ R_j), do{
        If (router_path(R_i, R_j) = <R_i, R_k, R_j>) then {
            Ω = Ω+ {(R_i, R_j)};
            pair_identified = true;
            exit              /* from the current loop */
            };
        };
    if pair_identified = false then {
        Θ = Θ + {R_k}
        }
    };
k = 1;
For all pairs of routers (R_i, R_j) ∈ Ω do {
    determine H_k such that Delay(R_i, R_j) = H_k × 
    k = k + 1
    }
Form matrix H;
/* Rank(H) should be N+M-|Θ| */
Q = Rank(H)
END
```

Figure 5A:
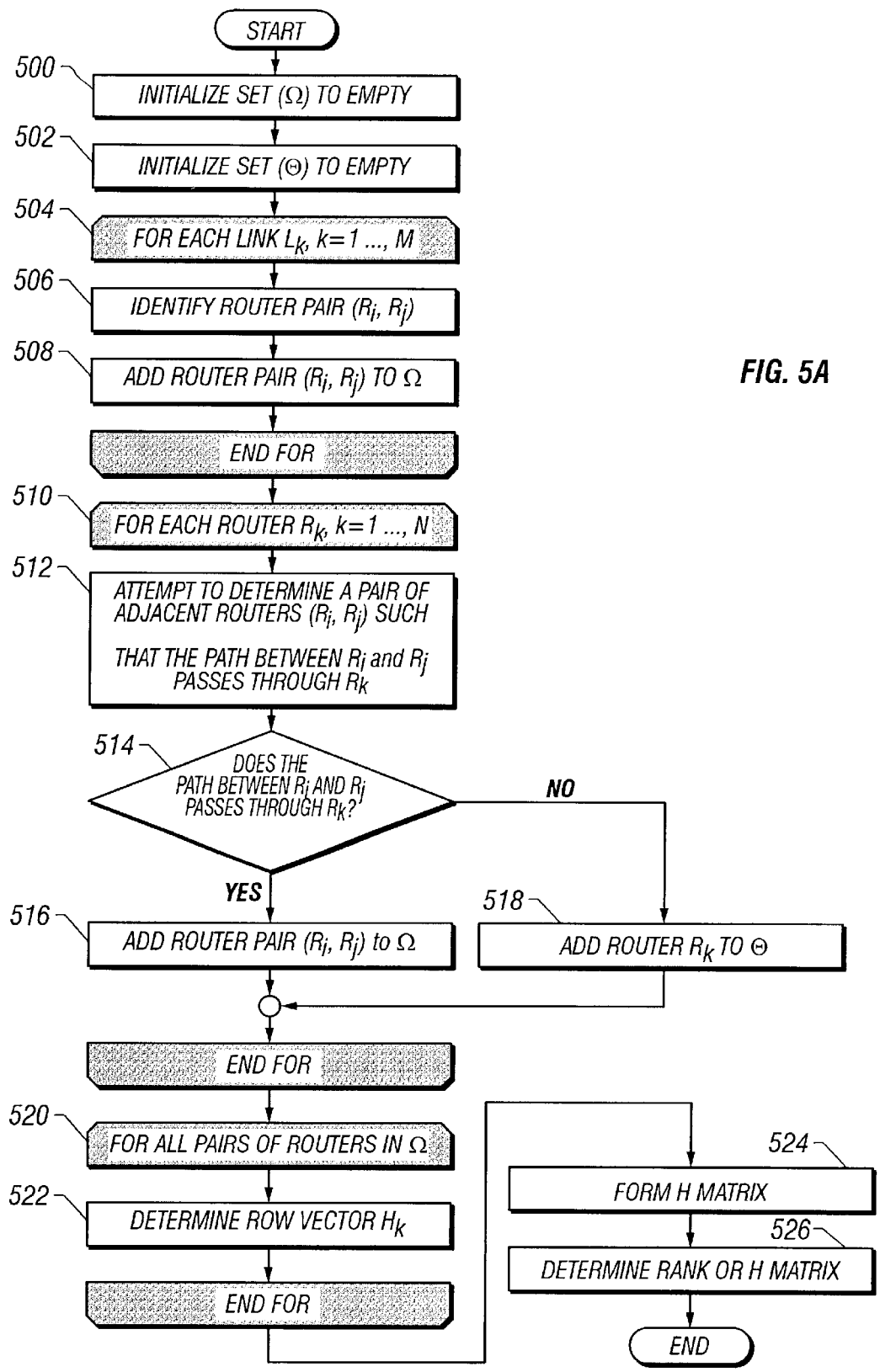
FIG. 5A is a flow diagram illustrating a method according to one embodiment of the present invention for identifying a measurements set such that the resulting matrix has the maximum possible rank.

FIG. 5A is a flow diagram illustrating a method according to one embodiment of the present invention that identifies the subset $\Omega$ such that the resulting matrix H has the maximum possible rank. The process begins by initializing the set $\Omega$ to empty. The set $\Omega$ will contain router pairs between which performance is to be measured (step 500). Next, a set $\Theta$ is initialized to empty (step 502). This set will contain router pairs for which processing time cannot be separately estimated. The first M measurements are between all adjacent routers, one for each link, and proceeds as follows. For each link, $L_k$, k=1, 2, ..., M (step 504), the pair of routers ($R_i$, $R_j$) that are the "end-points" of that link are identified (step 506) and added to the set $\Omega$ (step 508). Then, for each router (1, ..., N), say $R_k$ (step 510), the collection of adjacent router are examined to determine where there is a pair of routers adjacent to $R_k$ such that a path between them passes through $R_k$ (step 512). If such a pair is successfully identified (step 514), then this pair is added to the set $\Omega$ (step 516). Otherwise, it may be concluded that it is not possible to separately assess delay due to processing within the router $R_k$. In this case, $R_k$ is added to the set $\Theta$ (step 518).

Once the sets $\Omega$ and $\Theta$ are thus determined, all the router pairs in $\Omega$ are examined. For each router pair (step 520), row Before establishing the adequacy of the above method, it is noted that using a network performance measurement tool, such as ANMT, allows probe packets to be sent through a given router using "loose source routing". In such cases, it is possible to ensure that the subset $\Theta$ is empty.

Proof that the $(N+M-|\Theta|) \times (N+M)$ matrix, H, resulting from an application of the above method has full rank (i.e., $N+M-|\Theta|$) is now given.

If $\Theta$ is non-empty, the columns of H can be re-arranged by moving columns corresponding to the variables $s_i$ for all i, such that $R_i \in \Theta$, to the end of matrix H. The resulting H matrix then has the following structure:

$$H = \begin{bmatrix} I & H_{12} & H_{13} \\ & H_{21} & H_{22} & H_{23} \end{bmatrix} \quad (50)$$

where I is an M×M identity matrix, and $H_{12}, H_{13}, H_{21}, H_{22}$ and $H_{23}$ are sub-matrices of appropriate dimension (M×N−|Θ|, M×|Θ|, N−|Θ|×M, N−|Θ|×N−|Θ|, and N−|Θ|×|Θ|, respectively). In particular, sub-matrices $H_{13}$ and $H_{23}$ correspond to variables, $s_i$, such that $R_i \in \Theta$. If $\Theta$ is empty, then $H_{13}$ and $H_{23}$ are not present.

The individual rows of the sub-matrix $$[H_{21}\ H_{22}\ H_{23}] \quad (51)$$

are now considered. Each row $h_{M+k}$ represents a measurement of the type $$\text{Delay}(R_p, R_q) = s_p + d_i + d_j + s_q \quad (52)$$

where $R_p$ and $R_q$ are routers that are directly connected to router $R_k$ using links $L_i$ and $L_j$. Consider rows $h_i$ and $h_j$, which correspond to measurements:

$$\text{Delay}(R_p, R_k) = s_p + d_i + s_k \quad (53)$$

$$\text{Delay}(R_k, R_q) = s_k + d_j + s_q \quad (54)$$

respectively. Thus, setting row $h_{M+k} = (h_i + h_j - h_{M+k})$ yields $h_{M+k} = [0\ 0\ \ldots\ 0\ 2\ 0\ \ldots\ 0]$, where the "2" is in the $M+k^{th}$ position.

Repeating this operation for every row $M+k = M+1, M+2, \ldots, M+N-|\Theta|$ results in a matrix H' of the form:

$$H' = \begin{bmatrix} I & H_{12} & H_{13} \\ 0 & 2*I & 0 \end{bmatrix} \quad (55)$$

As is thus made evident, the matrix H' has full rank (i.e., Rank(H')=M+N-|Θ|). Because Rank(H')≦Rank(H)≦M+N-|Θ|, it follows that Rank(H)=M+N-|Θ|.

Delay between any pair of routers, $\text{Delay}(R_p, R_q)$, can be expressed as a linear combination of the collection of $\{\text{Delay}(R_i, R_j), (R_i, R_j) \in \Omega\}$. Equivalently, it can be shown that if $\text{Delay}(R_p, R_q) = F_k x$, for some $F_k$, then $F_k = \alpha_k H$, where the M+N-|Θ|×M+N matrix corresponds to the subset Ω. From Equation 52, matrix H is defined as $$H = \begin{bmatrix} I & H_{12} & H_{13} \\ H_{21} & H_{22} & H_{23} \end{bmatrix} \quad (56)$$

Letting $$C = \begin{bmatrix} I & 0 \\ H_{21} & -I \end{bmatrix} \quad (57a)$$

it may be shown that $$H' = CH = \begin{bmatrix} I & H_{12} & H_{13} \\ 0 & 2*I & 0 \end{bmatrix} \quad (57b)$$

This is so because $H_{21} H_{12} - H_{22} = 2*I$, and $H_{21} H_{13} - H_{23} = 0$. Defining:

$$B = \begin{bmatrix} I & -1/2 H_{12} \\ 0 & 1/2 I \end{bmatrix} \quad (58a)$$

H" can be derived as follows:

$$H'' = BH' = BCH = \begin{bmatrix} I & 0 & H_{13} \\ 0 & I & 0 \end{bmatrix} \quad (58b)$$

As noted, the columns of the sub-matrix, $H_{13}$, correspond to variables, $s_k$, for each router, $R_k$, where $R_k \in \Theta$. Such a router is one through which no route passes, except as a source or destination router.

The delay between any given pair of routers, $R_p$ and $R_q$, can thus be expressed in terms of delay components, assuming that $\text{link\_path}(R_p, R_q) = \langle L_u, L_v, \ldots, L_w \rangle$ is given by:

$$\text{Delay}(R_p, R_q) = s_p + d_u + d_v + \ldots + d_w + s_q \quad (59a)$$

$$= F_k x \quad (59b)$$

where $$F_k = [0 \ldots 0\ 1\ 0 \ldots 0\ 1\ 0 \ldots 0\ 1\ 0 \ldots 0\ 1\ 0 \ldots 0\ 1\ 0 \ldots 0] \quad (59c)$$

and the 1's in $F_k$ appear in columns $u, v, \ldots, w$, and $M+p$ and $M+q$. As is now shown $$F_k x = \phi_k H'' x = \phi_k BCH x, \quad (60)$$

where $\phi_k$ is simply the first M+N-|Θ| components of the row vector $F_k$. To prove that $F_k x = \phi_k H'' x = \phi_k BCH x$, the following cases need to be considered:

1. Case 1: If |Θ|=0, then there are no columns corresponding to sub-matrix $H_{13}$. As a result, H"=BCH=I and $\phi_k = F_k$
2. Case 2: If |Θ|>0, then if $R_p \in \Theta$, the first two terms in the expansion of $\text{Delay}(R_p, R_q)$ can be combined to yield as $\text{Delay}(R_p, R_q) = (s_p + d_u) + d_v + \ldots + d_w + s_q$. The $u^{th}$ row of H"x is exactly $(s_p + d_u)$. Similarly, if $R_q \in \Theta$, the last two terms in its expansion can be combined to yield $\text{Delay}(R_p, R_q) = s_p + d_u + d_v + \ldots + (d_w + s_q)$. The $w^{th}$ row of H"x is exactly $(s_q + d_w)$. As a result, entries in the last |Θ| columns of $F_k$ may be dropped.

As a result, from (60) above, $F_k x = \alpha_k H x$, where $$\alpha_k = \phi_k BC \quad (61)$$

Thus, delay between any pair of routers can be expressed in terms of measured delay between pairs of routers, identified by Ω. An example employing the preceding results is now given.

The example network given in FIG. 2 is now considered. Note once again that N=6, M=9. The routing table is given in Table 1. Using the method described previously, the collection of pairs of routers is identified:

$$\Omega = \{(R_1, R_2), (R_2, R_3), (R_1, R_4), (R_2, R_4), (R_2, R_5), \quad (62)$$

$$(R_3, R_5), (R_3, R_6), (R_4, R_5), (R_5, R_6), (R_1, R_3),$$

$$(R_2, R_6), (R_1, R_5), (R_4, R_6)\}$$

Further, since no path passes through routers $R_1$ or through $R_6$, $$\Theta = \{R_1, R_6\} \quad (63)$$

Because |Θ|=2, the 13×15 matrix H is given by:

|     | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|-----|---|---|---|---|---|---|---|---|---|---|---|---|---|---|---|
| $Y_1$ | 1 | | | | | | | | | 1 | 1 | | | | |
| $Y_2$ | | 1 | | | | | | | | | 1 | 1 | | | |
| $Y_3$ | | | 1 | | | | | | | | 1 | | 1 | | |
| $Y_4$ | | | | 1 | | | | | | | 1 | | 1 | | |
| $Y_5$ | | | | | 1 | | | | | | 1 | | | 1 | |
| $Y_6$ | | | | | | 1 | | | | | 1 | | | 1 | |
| $Y_7$ | | | | | | | 1 | | | | 1 | | | | 1 |
| $Y_8$ | | | | | | | | 1 | | | | | 1 | 1 | |
| $Y_9$ | | | | | | | | | 1 | | | | | 1 | 1 |
| $Y_{10}$ | 1 | 1 | | | | | | | | 1 | | 1 | | | |
| $Y_{11}$ | | 1 | | | 1 | | | | | 1 | | | | 1 | |
| $Y_{12}$ | | 1 | | | | | 1 | | | | | 1 | | | 1 |
| $Y_{13}$ | | | | | | | 1 | 1 | | | | | 1 | | 1 |

Because $\Theta = \{R_1, R_6\}$, the columns are re-arranged such that the columns corresponding to $s_1$, and $s_6$ are listed last. This results in a new H matrix corresponding to a new definition of the vector of delay components, $x = [d_1, d_2, \ldots, d_9, s_2, \ldots, s_5, s_1, s_6]^T$:

close examination of the network reveals that there is no way that one can estimate $d_1$, $d_3$, and $s_1$, independently (or $d_7$, $d_9$, and $s_6$). In every measurement that involves $d_1$, parameters $s_1$ and $d_1$ appear together (and similarly, $d_3$ & $s_1$, $d_7$ & $s_6$, $d_9$ & $s_6$). This is so because there is no path in the network that passes through node $R_1$ (or through $R_6$).

If C =

|     | $D_1$ | $D_2$ | $D_3$ | $D_4$ | $D_5$ | $D_6$ | $D_7$ | $D_8$ | $D_9$ | $S_2$ | $S_3$ | $S_4$ | $S_5$ | $S_1$ | $S_6$ |
|-----|---|---|---|---|---|---|---|---|---|---|---|---|---|---|---|
| $Y_1$ | 1 | | | | | | | | | 1 | | | | 1 | |
| $Y_2$ | | 1 | | | | | | | | 1 | 1 | | | | |
| $Y_3$ | | | 1 | | | | | | | 1 | | 1 | | | |
| $Y_4$ | | | | 1 | | | | | | 1 | | 1 | | | |
| $Y_5$ | | | | | 1 | | | | | 1 | | | 1 | | |
| $Y_6$ | | | | | | 1 | | | | 1 | | | 1 | | |
| $Y_7$ | | | | | | | 1 | | | 1 | | | | | 1 |
| $Y_8$ | | | | | | | | 1 | | | | 1 | 1 | | |
| $Y_9$ | | | | | | | | | 1 | | | | 1 | | 1 |
| $Y_{10}$ | 1 | 1 | | | | | | | | | 1 | 1 | | | −1 |
| $Y_{11}$ | | 1 | | | 1 | | | | | | | 1 | 1 | | −1 |
| $Y_{12}$ | | 1 | | | | | 1 | | | | 1 | | | 1 | −1 |
| $Y_{13}$ | | | | | | | 1 | 1 | | | | 1 | | 1 | −1 | and B =

|     |   |   |   |   |   |   |   |   |   |   |   |   |   |
|-----|---|---|---|---|---|---|---|---|---|---|---|---|---|
| $Y_1$ | 1 | | | | | | | −1/2 | | | | | |
| $Y_2$ | | 1 | | | | | | −1/2 | −1/2 | | | | |
| $Y_3$ | | | 1 | | | | | | −1/2 | | | | |
| $Y_4$ | | | | 1 | | | | −1/2 | −1/2 | | | | |
| $Y_5$ | | | | | 1 | | | −1/2 | | | −1/2 | | |
| $Y_6$ | | | | | | 1 | | | −1/2 | | −1/2 | | |
| $Y_7$ | | | | | | | 1 | | −1/2 | | | | |
| $Y_8$ | | | | | | | | 1 | | −1/2 | −1/2 | | |
| $Y_9$ | | | | | | | | | 1 | | −1/2 | | |
| $Y_{10}$ | | | | | | | | 1/2 | | | | 1 | |
| $Y_{11}$ | | | | | | | | | 1/2 | | | | 1 |
| $Y_{12}$ | | | | | | | | | | 1/2 | | | |
| $Y_{13}$ | | | | | | | | | | | 1/2 | | | then H" = B C H =

|     | $D_1$ | $D_2$ | $D_3$ | $D_4$ | $D_5$ | $D_6$ | $D_7$ | $D_8$ | $D_9$ | $S_2$ | $S_3$ | $S_4$ | $S_5$ | $S_1$ | $S_6$ |
|-----|---|---|---|---|---|---|---|---|---|---|---|---|---|---|---|
| $Y_1$ | 1 | | | | | | | | | | | | | | |
| $Y_2$ | | 1 | | | | | | | | | | | | 1 | |
| $Y_3$ | | | 1 | | | | | | | | | | | | |
| $Y_4$ | | | | 1 | | | | | | | | | | 1 | |
| $Y_5$ | | | | | 1 | | | | | | | | | | |
| $Y_6$ | | | | | | 1 | | | | | | | | | |
| $Y_7$ | | | | | | | 1 | | | | | | | | |
| $Y_8$ | | | | | | | | 1 | | | | | | | 1 |
| $Y_9$ | | | | | | | | | 1 | | | | | | 1 |
| $Y_{10}$ | | | | | | | | | | 1 | | | | | 1 |
| $Y_{11}$ | | | | | | | | | | | 1 | | | | |
| $Y_{12}$ | | | | | | | | | | | | 1 | | | |
| $Y_{13}$ | | | | | | | | | | | | | 1 | | |

Thus, it can be seen that matrix H" has full rank (i.e., $N + M - |\Theta| = 6 + 9 - 2 = 13$), and that $\text{Rank}(H) = 13$.

The fact that $|\Theta| = 2$, or that the rank of matrix H is 13, and not 15, implies that one is not able to estimate all $N + M = 15$ parameters individually. In light of the present invention, a A method according to one embodiment of the present invention, however, does provide a measure of $d_1 + s_1$, $d_3 + s_1$, $d_7 + s_6$, $d_9 + s_6$. This is not a constraint because delay between any pair of routers can be expressed in terms of measured delay between pairs of routers in $\Omega$. In particular, $$Delay(R_1, R_6) = s_1 + d_3 + d_8 + d_9 + s_6 \quad (64a)$$
$$= F_{(1,6)}x \quad (64b)$$
$$= [0\ 0\ 1\ 0\ 0\ 0\ 0\ 1\ 1\ 0\ 0\ 0\ 0\ 1\ 1]x \quad (64c)$$
$$= [0\ 0\ 1\ 0\ 0\ 0\ 0\ 1\ 1\ 0\ 0\ 0\ 0]H''x \quad (64d)$$
$$= \phi_{(1,6)}BCHx \quad (64e)$$
$$= \alpha_{(1,6)}Hx \quad (64f)$$
$$Delay(R_1, R_6) = s_3 + d_6 + d_8 + s_4 \quad (65a)$$
$$= F_{(3,4)}x \quad (65b)$$
$$= [0\ 0\ 0\ 0\ 0\ 1\ 0\ 1\ 0\ 0\ 1\ 1\ 0\ 0\ 0]x \quad (65c)$$
$$= [0\ 0\ 0\ 0\ 0\ 1\ 0\ 1\ 0\ 0\ 1\ 1\ 0]H''x \quad (65d)$$
$$= \phi_{(3,4)}BCHx \quad (65e)$$
$$= \alpha_{(3,4)}Hx \quad (65f)$$

where $x=[d_1, d_2, \ldots, d_9, s_2, \ldots, s_5, s_1, s_6]^T$, and H, C, and B are given by their respective definitions immediately preceding. Thus, $$\alpha_{(1,6)}=[0\ 0\ 1\ 0\ 0\ 0\ 0\ 1\ 1\ 0\ 0\ 0\ 0]B\ C=[0\ 0\ 0\ 0\ 0\ 0\ 0\ -1\ 0\ 0\ 0\ 1\ 1] \quad (66a)$$

$$\alpha_{(3,4)}=[0\ 0\ 0\ 0\ 0\ 1\ 0\ 1\ 0\ 0\ 1\ 1\ 0]B\ C=[0\ 0\ 0\ 0\ 0\ 1\ 0\ 0\ -1\ 0\ 0\ 0\ 1] \quad (66b)$$

In other words, $Delay(R_1, R_6)=-z_8+z_{12}+z_{13}$ and $Delay(R_1, R_6)=z_6-z_9+z_{13}$, where $z_k=H_kx$ corresponds to the $k^{th}$ pair of router in $\Omega$. As a result, the delay between any given pair of routers can be obtained from the set of orthogonal delay components.

A Formalized Description of a Method for Calculating Delay and Jitter between an Arbitrarily Specified Pair of Routers A procedure according to a method of the present invention that computes round-trip delay and delay-jitter between any arbitrarily specified collection of router pairs using measurements between router pairs in the measurements set is now described. The theoretical underpinnings of the method used to construct the measurements set and the method of calculating delay and jitter from the measurements are discussed above, in the description immediately preceding. Such a procedure is particularly useful when the number of pairs of routers in the requirements set is large. Such a procedure is applicable when measurement errors are negligible, and a-priori measurements are not available.

Figure 5B:
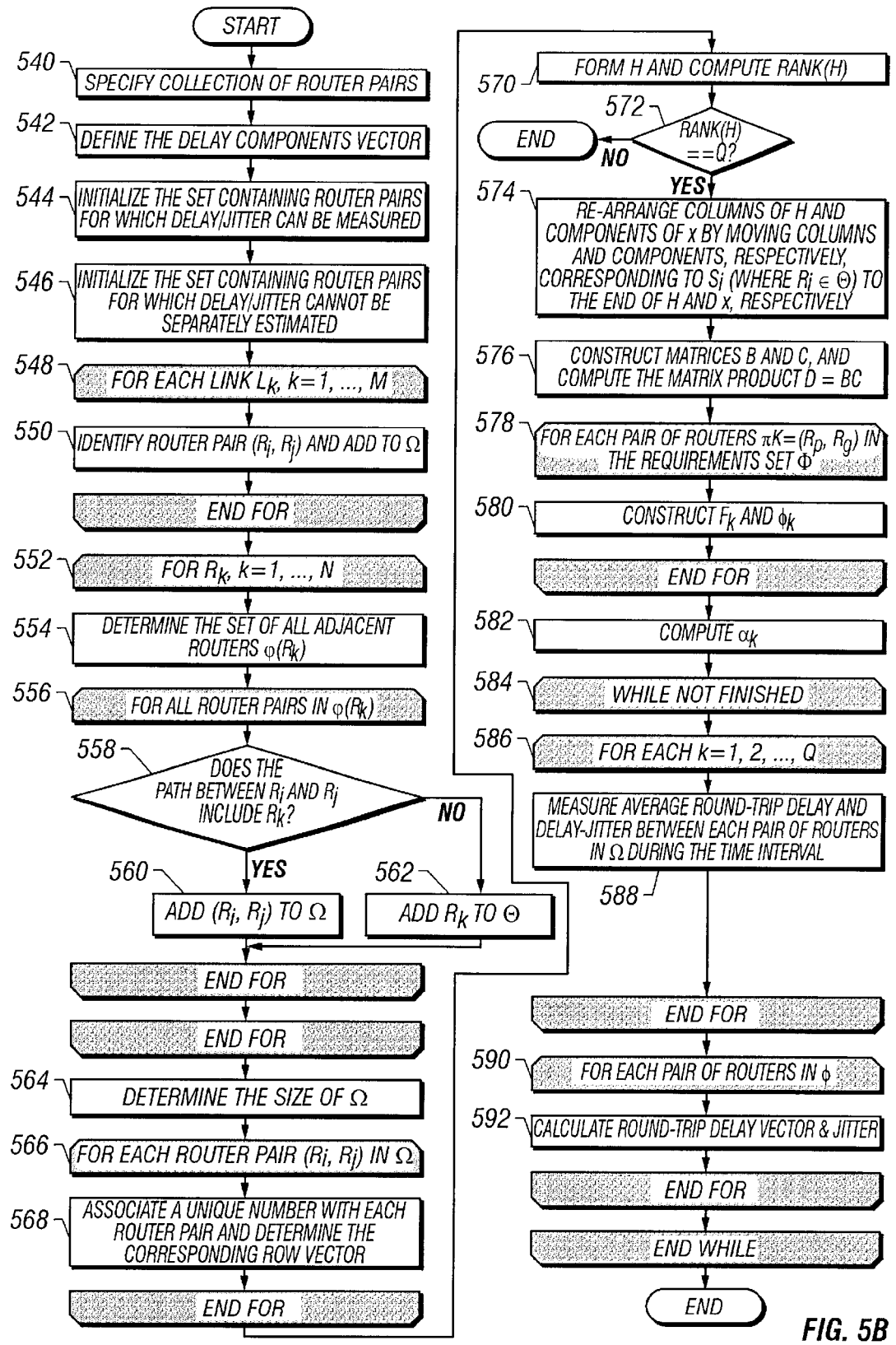
FIG. 5B is a flow diagram illustrating a method according to one embodiment of the present invention for calculating delay and jitter between an arbitrarily specified pair of routers.

FIG. 5B is a flow diagram illustrating such a method. It is assumed that the network topology and routing table, for a given DS codepoint, is known. Where necessary, such a procedure is executed for each DS codepoint under consideration. If the network topology and/or the routing table changes, the procedure described presently should be executed afresh with the new topology or with new routing table. The process begins with the specification of the collection of router pairs (step 540) and the definition of the delay-components vector (step 542). Next, the sets $\Omega$ and $\Theta$ are initialized to empty (steps 544 and 546, respectively). The set $\Omega$ will contain router pairs between which performance is to be measured, while the set $\Theta$ will contain router pairs for which processing time cannot be separately estimated.

The first M measurements are between adjacent routers, one for each link, and proceeds as follows. For each link, $L_k$, k=1, 2, ..., M (step 548), the pair of routers $(R_i, R_j)$ that are the "end-points" of that link are identified and added to the set $\Omega$ (step 550). The next set of up to N measurements are then identified. These measurements are between a pair of routers $(R_i, R_j)$, each of which is adjacent to router $R_k$. Such a pair is included in the measurements set provided there exists at least one path from $R_i$ to $R_j$ which passes through $R_k$. As a result, this may result in N–|$\Theta$| measurements only. For each router $R_k$, k=(1, ..., N) (step 552) the collection of adjacent routers ($\phi(R_k)$) are examined to determine where there is a pair of routers adjacent to $R_k$ such that a path between them passes through $R_k$ (step 554). For each router pair in $\phi(R_k)$ (step 556), the preceding determination is made. If such a pair is successfully identified (step 558), then this pair is added to the set $\Omega$ (step 560). Otherwise, if no such pair is successfully identified (step 561), it may be concluded that it is not possible to separately assess delay due to processing within the router $R_k$, and so $R_k$ is added to the set $\Theta$ (step 562). Construction of the measurements set, $\Omega$, is thus completed. The size of $\Omega$ (represented, e.g., by Q) is given by N+M–|$\Theta$| (step 564).

Once the sets $\Omega$ and $\Theta$ are thus determined, the router pairs in $\Omega$ are examined. For each router pair (step 566), a unique number associated with that router pair and row $H_k$ of the H matrix is determined, such that $Z_k=Delay(R_i, R_j)=H_kx$ (step 568). Once the elements of the H matrix have been determined, the H matrix is formed from the resulting elements and the rank of H determined (step 570). It can be verified that Q must be N+M–|$\Omega$|. If such is not the case (step 572), the procedure is exited.

Next, the columns of H are re-arranged by moving the columns corresponding to $s_i$ (for all i, such that $R_i\epsilon\Theta$) to the end of H (step 574). Also at this time, the components of x are re-arranged by moving the components corresponding to $s_i$ (for all i, such that $R_i\epsilon\Theta$) to the end of x. Matrices B and C are then constructed, and their matrix product D computed (step 576). For each pair of routers $\pi_k=(R_p, R_q)$ in the requirements set, $\Phi$ (step 578), construct the row vector, $F_k$, and the row vector, $\phi_k$ (step 580). Next, $\alpha_k$ is computed, ensuring that $Delay(R_p, R_q)=F_kx=\alpha_kHx$ (step 582).

Now that initialization is complete, measurements can now be taken, and delay and jitter between router pairs contained in the requirements set calculated. While further measurement time intervals remain (i.e., measurements are to continue being taken) (step 584), and for each router pair $\pi_k=(R_i, R_j)$ in the measurements set, $\Omega$ (step 586), measure average round-trip delay ($y_k$) and delay-jitter ($\gamma_k$) between each pair of routers ($\pi_k=(R_i, R_j)$) during the given time interval (step 588). This can be accomplished, for example, using an ANMT. Additionally, for each router pair ($R_p, R_q$) in the requirements set, $\Phi$ (step 590), calculate round-trip delay vector ($\Delta_j$) and jitter ($\sigma_k$) (step 592). This is repeated until no measurement time intervals remain.

The above method for computing round-trip delay and delay-jitter between any arbitrarily specified collection of router pairs using measurements between router pairs in the measurements set is now outlined using a formal representation.

```
BEGIN
/* The following assumes that the network topology and routing    */
/* table, for a given DS codepoint, is known.                      */
/* Where necessary, such a procedure is executed for each DS       */
/* codepoint, under consideration.                                 */
/* If the network topology and/or the routing table changes, this  */
/* procedure is preferably executed afresh with the new topology   */
/* or with new routing table.                                      */
/* Specify the collection of pairs of routers.                     */
    Φ = {π_k = (R_i, R_j), k = 1, 2, . . . , P};
/* Define the delay-components vector.                             */
    x = [d_1, d_2, . . . , d_M, s_1, s_2, . . . , s_N]^T;
/* Initialize the measurements set (consisting of pairs of routers,*/
/* between which delay/jitter is measured) to an empty set.        */
    Ω = { };
```

-continued

```
/* Initialize the set of routers (for which ANMT processing delay  */
/* cannot be separately estimated) to an empty set.                */
    Θ = {};
/* Identify the first M measurements. These are one for each link, */
/* and between adjacent routers. It will be noted that the procedure */
/* identify_router_pair(L_k) identifies the adjacent routers directly */
/* linked using link, L_k.                                          */
For link (L_k) where k = 1, 2, . . . , M, do {
    (R_i, R_j) = identify_router_pair(L_k);
    Ω = Ω + {(R_i, R_j)}
};
/* Identify the next set of up to N measurements. These measure-   */
/* ments are between a pair of routers (R_i, R_j), each of which is adja- */
/* cent to router R_k. Such a pair is included in the measurements set */
/* provided there exists at least one path from R_i to R_j which passes */
/* through R_k. As a result, this may result in N − |Θ| measurements */
/* only. It will be noted that the procedure                        */
/* set_of_all_adjacent_routers(R_k) identifies                      */
/* all routers that are adjacent to the specified router, R_k.     */
For all routers R_k, k = 1, 2, . . . , N, do {
    pair_identified = false;
    φ(R_k) = set_of_all_adjacent_routers(R_k);
    For all R_i ∈ φ(R_k), R_j ∈ φ(R_k), R_i ≠ R_j, do {
        If (router_path(R_i, R_j) = <R_i, R_k, R_j>) {
            Ω = Ω + {(R_i, R_j)};
            pair_identified = true;
            exit
        };
        If (pair_identified = false) {
            Θ = Θ + {R_k}
        }
};
/* Construction of the measurements set, Ω, is now complete.       */
/* The size of the set is N+M−|Θ|.                                 */
Q = |Ω|;
/* For each pair of routers in the measurements set, (R_i, R_j), associate */
/* a unique number, and determine the corresponding row vector,    */
/* H_k such that round-trip delay between the router pair (R_i, R_j) */
/* can be expressed as H_k x.                                      */
k = 1;
For all pairs of routers (R_i, R_j) ∈ Ω, {
    determine H_k such that Delay(R_i, R_j) = H_k x;
    k = k + 1
};
/* Form the matrix, H, and compute its rank.                       */
/* The Rank(H) should be Q = N+M−|Θ|.                              */
H = [H_1^T H_2^T . . . H_Q^T]^T;
If {Rank(H) != Q) {
    exit       /* EXIT remaining procedure                          */
}
/* Re-arrange columns of H as follows: move columns corresponding  */
/* to variables, s_i, for all i, such that R_i ∈ Θ, to the end of matrix H. */
/* Similarly, re-arrange the components of the vector of           */
/* delay components, x.                                            */
H =  [  I       H_12       H_13     ];
     [  H_21    H_22       H_23     ]
/* Construct matrices, B and C, and compute the matrix             */
   product D = BC.
C =  [  I       0          ];
     [  H_21    −I         ]
B =  [  I       −1/2 H_12             ];
     [  0       1/2 I                 ]
D = B C;
/* For each pair of routers π_k = (R_p, R_q) in the requirements set, Φ, */
/* construct the row vector, F_k and the row vector, φ_k.          */
Construct F_k such that Delay(R_p, R_q) = F_k x;
From F_k construct φ_k by retaining the first Q components of F_k;
/* Compute α_k. This ensures that Delay(R_p, R_q) = F_k x = α_k H x. */
α_k = φ_k D;
/* The initialization steps are now complete. Measurements         */
/* repeatedly and calculate delay and jitter between router        */
/* pairs contained in the requirements set.                        */
/* t_0 is the start time and dt is the measurement interval.       */
t_0 = start_time;
while (!finished) {
    For each k = 1, 2, . . . , Q, do {
        During the time interval, (t_0, t_0 +dt), use ANMT to
        measure average round-trip delay, y_k, and delay-jitter, γ_k,
        between each pair of routers,
```

```
        π_k = (R_i, R_j) contained in Ω
    };
/* For each pair of routers, π_k = (R_p, R_q), in the requirements set, Φ, */
/* calculate round-trip delay vector, Δ_k, and jitter, σ_k         */
For each k = 1, 2, . . . , |Φ|, do {
    Δ_k = Σ_{i=1,...,Q}(α_{k,i} y_i);
    σ_k = √Σ_{i=1,...,Q}(α_{k,i}^2 γ_i^2)
};
/* Repeat the above for the next time interval. */
t_0 = t_0 + dt
}
END
```

III. Estimating Delay and Jitter in an Enterprise Network Coupled to a Backbone Having an Unknown Topology The various embodiments of a method according to the present invention described previously provide an efficient measurement scheme to estimate round-trip delay and jitter in an enterprise network whose topology and routing is known. These methods may be extended to monitor delay and jitter in an enterprise network that uses a service-provider (SP) backbone network having topology and routing that are not known. An embodiment of the present invention, such as is now described, illustrates how the preceding method can be used in networks where enterprise routers are connected through a backbone network of a service provider (SP), the topology or routing of which is unknown (and cannot be discovered). In this portion of the discussion, the network is referred to as an enterprise network in order to distinguish the enterprise network from the service provider's backbone. In a similar fashion, elements of the enterprise network are referred to as being a part thereof (e.g., enterprise routers and enterprise links).

More specifically, a method according to one embodiment of the present invention discovers the collection of ingress/egress routers of the backbone or service-provider network used to interconnect the enterprise router. Based on the resulting incomplete knowledge of backbone network topology, a model of the backbone network together with the manner in which enterprise traffic is routed through the service-provider network can be generated. Such a measurement scheme:

1. can be used in the current context to estimate delay and delay-jitter between specified pairs of enterprise routers,
2. can be used to estimate various delay components between a given pair of enterprise routers, and
3. can provide an efficient method estimating delay and jitter between a large number of pairs of enterprise routers.

Thus, a relatively simple method is described that identifies the relevant set of backbone routers and their interconnection to enterprise routers. Such a method allows the modeling of the relevant portion of the backbone network together with its interconnection to enterprise routers. The resulting model of the network is characterized by $N+m$ routers and $N+m*(m-1)/2$ links, where m is the number of backbone routers and N is the number of enterprise routers. It can be shown that, if the requirements set contains P pairs of enterprise routers, then the size of a measurements set is no more than $\min(P, N+m*(m-1)/2)$. Because m is the number of backbone routers, the technique is particular efficient if the extent of "clustering" is significant, or equivalently, m is small.

A Model of the Enterprise Network

The enterprise network is assumed to include N routers, $R_i$, $i=1, 2, \ldots, N$, that are connected to one or more backbone routers using links, $L_j$, $j=1, 2, \ldots, N$. It is assumed that the number of links used to connect an enterprise network to the backbone network is 1, and that the enterprise routers are themselves not connected to each other. While these assumptions are not mandatory (i.e., such topological features can be accounted for), such are assumed for simplicity of the following discussion. It is also assumed that (a) the identity of backbone routers, and (b) the interconnection of enterprise routers to the backbone routers are unknown.

Figure 6:
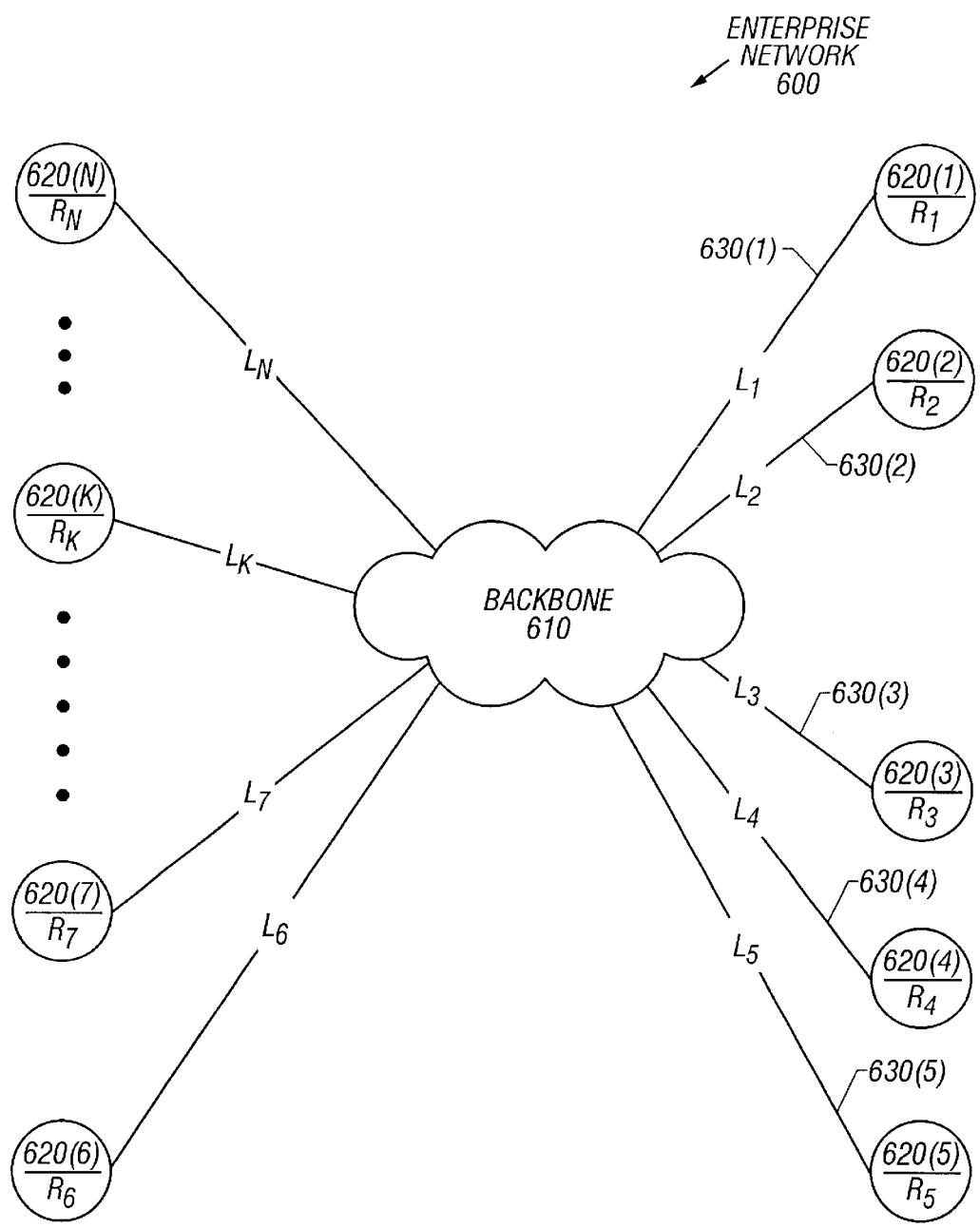
FIG. 6 is a block diagram illustrating an exemplary enterprise network in which a method according to an embodiment of the present invention can be practiced.

FIG. 6 is a block diagram illustrating an exemplary enterprise network 600 in which a method according to an embodiment of the present invention can be practiced. Network 600 includes a backbone 610 and routers 620(1)–(K) and 620(K)–(N). Routers 620(1)–(K) and 620(K)–(N) are coupled to backbone 610 by links 630(1)–(K) and 630(K)–(N), respectively. It will be noted that routers 620(1)–(K) and 620(K)–(N) are also designated $R_i$, i=1, 2, ..., K, ..., N, and that links 630(1)–(K) and 630(K)–(N) are also designated $L_j$, j=1, 2, ..., K, ..., N. This is done to allow the formulation of the equations used to describe various embodiments of methods according to the present invention.

The first step towards identifying the subset of pairs of routers for which measurements should be made involves discovering the identity of backbone routers and their interconnection to enterprise routers. In doing so, a method according to one embodiment of the present invention, such as the one given below, also partitions the collection of enterprise routers, $R_i$, i=1, 2, ..., N, into one or more enterprise "clusters," $C_k$, k=1, 2, ..., m, such that each enterprise router, $R_i$, i=1, 2, ..., N, belongs to one and only one cluster. By definition, each cluster, $C_k$, k=1, 2, ..., m, contains $n_k$ number of enterprise routers, re-labeled as $R_{(k,j)}$, j=1, 2, ..., $n_k$, such that each router $R_{(k,j)}$ in the cluster, $C_k$, is connected to the backbone router, $\rho_k$, using a link $L_{(k,j)}$, j=1, 2, ..., $n_k$, k=1, 2, ..., m. Such clusters may be identified using a process such as that described below.

Figure 7:
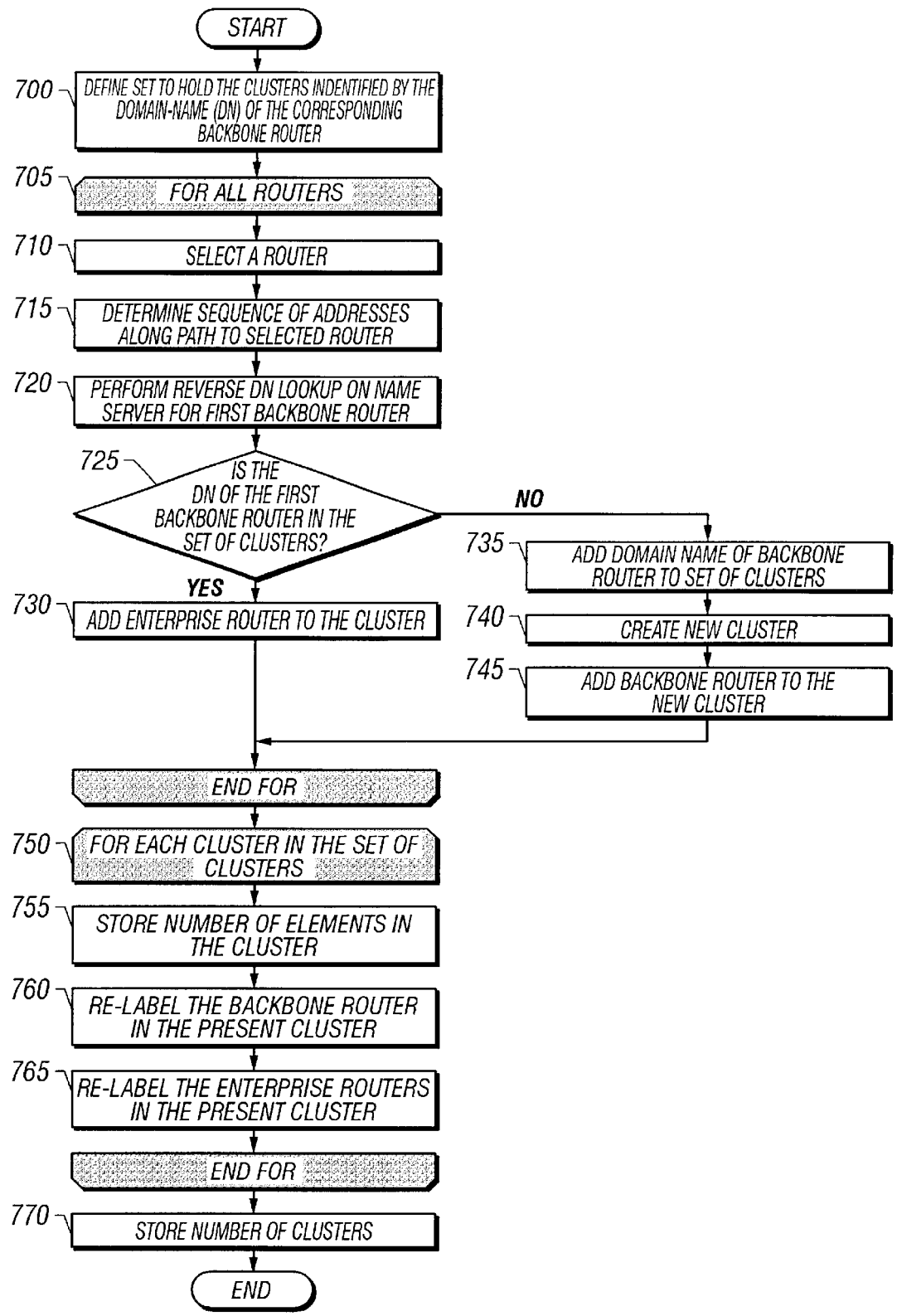
FIG. 7 is a flow diagram illustrating the operations performed in a process of forming "clusters" (aggregations of network elements) according to an embodiment of the present invention.

FIG. 7 is a flow diagram illustrating the operations performed in the process of forming "clusters" (aggregations of network elements), as described above. It is noted that each cluster is identified by the domain-name (DN) of the corresponding backbone router, for simplification, although this need not be the case. Initialization of the set that will contain the collection of clusters is performed (step 700). For each router (step 705), then, a different router is selected (step 710) and the sequence of network addresses along a path to the selected router is determined (step 715). Once the sequence of addresses has been determined, a reverse domain-name look-up is performed on a name server for the first backbone router, as identified by the network address of the router/port (step 720). If the domain-name of the first backbone router is among the domain-names corresponding to the collection of clusters already identified, then the current router is simply added to the given cluster (step 730). If the domain-name of the first backbone router is not in the set of clusters (step 725), the domain name of the new backbone router so discovered is added to the set of backbone routers (step 735). Additionally, a new cluster is created within the set of clusters (step 740) and the current enterprise router added to the new cluster (step 745).

Once all routers have been examined thusly (for each domain-name in the set of clusters or domain-names (step 750)), several actions are then taken. These actions include the storage of a number representing the number of elements in the given cluster (as denoted by the given domain-name) (step 755); the re-labeling of the backbone router in the present cluster (step 760); and the re-labeling of the enterprise routers in the present cluster (step 765). Once all of the domain-names in the set of domain-names have been processed, the number of clusters is determined, and then stored (step 770).

Given a collection of enterprise routers, $\Re = \{R_i, i=1, 2, ..., N\}$, such as that presented as network 600 in FIG. 6, the grouping of routers (e.g., routers 620(1)–(K) and 620(K)–(N)) can be described in a more formal manner. The process referred to herein as form_clusters is one such description.

```
BEGIN "form_clusters"
/* Σ is a collection of clusters.                                          */
/* Each cluster is ID'd by the domain-name of corresponding                */
   backbone routers.
Σ = {};
For i = 1, 2, . . . , N do {
    Select a router, R_j, i ≠ j;        /* R_j may be selected arbitrarily.    */
    /* Determine the sequence of IP addresses (or domain names)           */
    /* of routers/ports along the path to router R_j.                     */
    <s_1, s_2, . . . , s_k> = traceroute(R_i, R_j);
    /* μ = DN of first backbone router, ID'd by IP addr or DN of         */
       router/port, s_1
    μ = reverse_NS_lookup(s_1);
    if μ ∈ Σ {
        then
        /* C_μ is uniquely ID'd by domain-name μ of backbone router   */
        add_to_cluster(R_i, C_μ);
        else {
            add_to_SP_routers(μ, Σ);    /* New backbone router found      */
            C_μ = {};
            add_to_cluster(R_i, C_μ);
        }
    }
}
k = 0
For all μ ∈ Σ do {
    k = k + 1;
    n_k = |C_μ|;              /* |C| denotes the number of elements in set C  */
    Re-label the backbone router μ as ρ_k;
    Re-label routers in cluster C_μ as R_(k,i), i = 1, 2, . . . , n_k;
}
m = k;                         /* m is the number of clusters \              */
END "form_clusters"
```

As a result of forming clusters (and re-labeling of enterprise routers), a acceptably complete description of the interconnection between enterprise routers and SP-provided backbone routers is generated. The resulting topology, corresponding to the enterprise network of FIG. 6, is illustrated in FIGS. 8A and 8B.

Figure 8A:
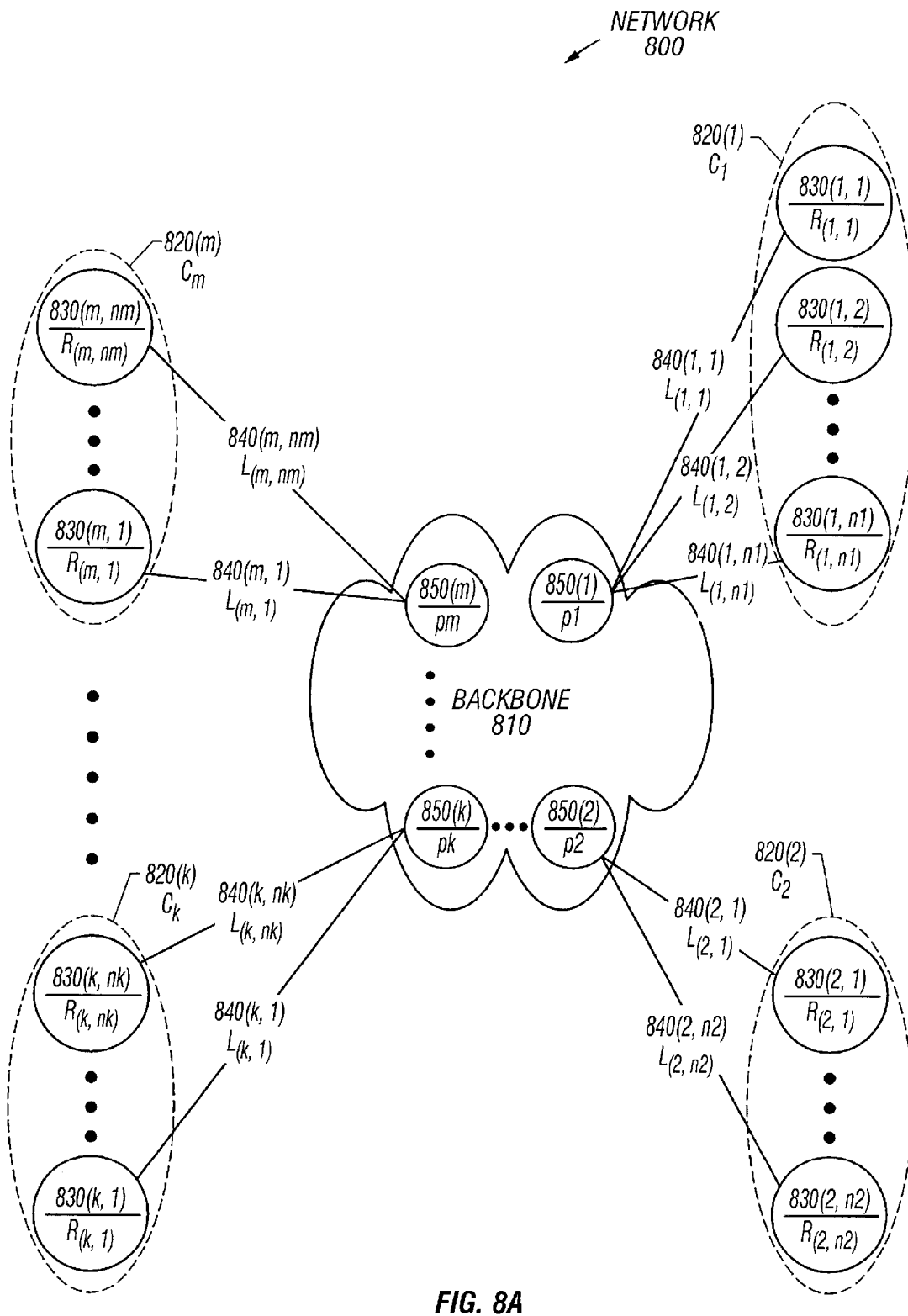
FIG. 8A is a block diagram illustrating the topology of a synthesized network and depicting an inferred backbone topology generated by a method according to an embodiment of the present invention.

FIG. 8A is a block diagram illustrating the topology of a synthesized network 800, depicting an inferred backbone topology generated by a method according to an embodiment of the present invention. Network 800 includes a backbone 810, the topology and routing of which are unknown to the methods described herein, aside from the ability to detect ingress router. In FIG. 8A, routers 620(1)–(K) and 620(K)–(N) are grouped into clusters 820(1)–(m) and appear as routers 830(1,1)–(m,nm). Routers 830(1,1)–(m,nm) are coupled to backbone 810 by links 840(1,1)–(m, nm), respectively. In fact, as depicted in FIG. 8A, links 840(1,1)–(m,nm) couple routers 830(1,1)–(m,nm) to a number of backbone routers 850(1)–(m). Backbone routers provide points of ingress or egress to backbone 810 for the enterprise network connected thereto. As noted, the only information that can be gleaned from backbone 810 is the existence of backbone routers 850(1)–(m)—further information as to the topology and routing of backbone 810 remains unknown to the methods described herein. It will be noted that routers 830(1,1)–(m,nm) are also re-designated $R_{(ij)}$ (i=1, 2, ..., k, ..., m; j=1, 2, ..., ni), and that links 840(1,1)–(m,nm) are also designated $L_{(ij)}$ (i=1, 2, ..., k, ..., m; j=1, 2, ..., ni). Additionally, it will be noted that clusters 820(1)–(m) are also designated $C_i$, i=1, 2, ..., k, ..., m, and that backbone routers 850(1)–(m) are also designated $\rho_i$, i=1, 2, ..., k, ..., m. This is done to allow the description of the parameters in terms of the equations and methods described herein.

Knowledge of topology and routing in the enterprise network may still be incomplete, however, because details concerning topology and routing within the SP backbone network are unavailable. This might be due, for example, to the fact that such a backbone network may not forward probe packets (e.g., traceroute packets) beyond the ingress router. As a consequence, discovery of the routes used within the backbone network may not be feasible. The backbone network may therefore be modeled as a fully-connected backbone network that includes backbone routers and backbone links.

Figure 8B:
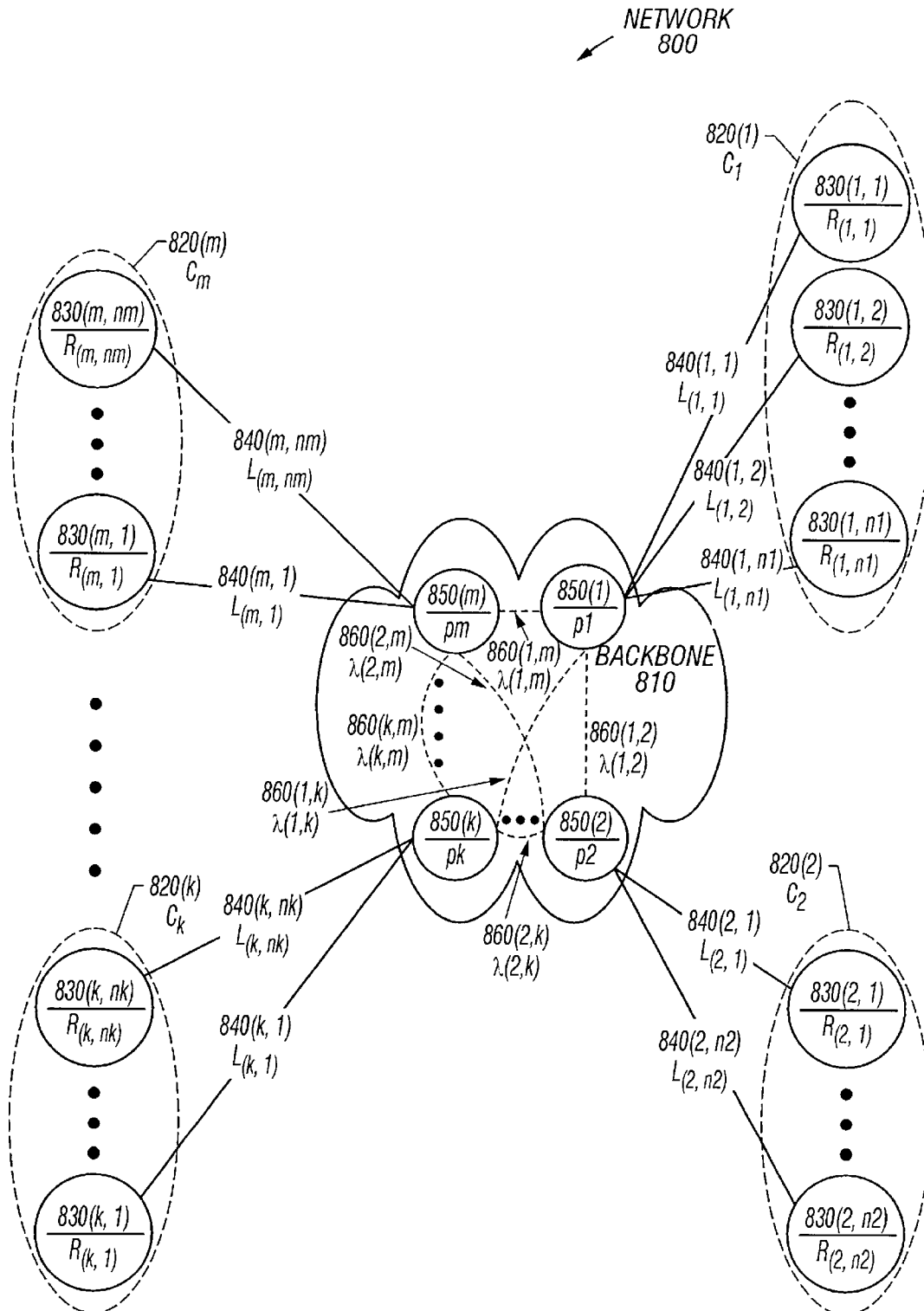
FIG. 8B is a block diagram illustrating a network and depicting an inferred backbone topology generated by a method according to an embodiment of the present invention.

FIG. 8B is a block diagram illustrating network 800, with routers 830(1,1)–(m,nm) coupled to backbone 810 by links 840(1,1)–(m,nm), respectively, as in FIG. 8A. As before, routers 830(1,1)–(m,nm) are coupled to backbone routers 850(1)–(m), which provide points of ingress or egress to backbone 810 for the enterprise network connected thereto. As noted, the only definitive information that can be gleaned from backbone 810 is the existence of backbone routers 850(1)–(m)—further information as to the topology and routing of backbone 810 remains unknown to the methods described herein. However, certain assumptions can be made that allow the topology of backbone 810 and its routers to be modeled. This allows delays due to actual backbone links to be identified, or at least portions of delays to be attributed to either backbone links or enterprise links.

Backbone 810 is depicted as including a number of backbone routers (i.e., backbone routers 850(1)–(m), as before). However, in FIG. 8B, each of the backbone routers is connected to each of the other backbone routers by a backbone link (backbone links 860(1,2)–(m−1,m)). As noted, backbone links 860(1,2)–(m−1,m) are virtual, but are useful in allocating delay throughout network 800. Thus, backbone 810 is represented as having a fully-connected topology generated by a method according to an embodiment of the present invention. As before, backbone routers 850(1)–(m) are also designated $\rho_i$, i=1, 2, ..., k, ..., m. Moreover, backbone links 860(1,2)–(m−1,m) are also designated $\lambda(i,j)$ (i=1, 2, ..., k, ..., (m−1); j=(i+1), ..., m), i≠j. This is done to allow the description of the parameters in terms of the equations and methods described herein. The backbone network may therefore be modeled as a fully-connected network that includes routers, $\rho_k$, k=1, 2, ..., m, and links, $\lambda_{(k1,k2)}$, k1, k2=1, 2, ..., m, k1≠k2.

Definitions

Several of the variables and notations discussed previously are now defined in light of the alternative embodiments now described that estimate the round-trip delay and jitter for a specified set of pairs of routers in the case where the network includes a service-provider network of unknown topology and routing.

First, the user-specified requirements set, $\Phi$, is defined as a collection of P pairs of routers for which delay and delay-jitter metrics are needed, as before. Also as before, the subset is normally a small fraction of all possible pairs of routers. The user-specified requirements set can be defined as:

$$\Phi = \{\pi_\kappa, \kappa=1, 2, \ldots, P\} \quad (67)$$

where $$\pi_\kappa = (R_{(k1,i)}, R_{(k2,j)}) \quad (68)$$

Because round-trip delay or jitter is monitored, it is immaterial whether the pair of routers is specified as $\pi_\kappa = (R_{(k1,i)}, R_{(k2,j)})$ or as $\pi_\kappa = (R_{(k2,j)}, R_{(k1,i)})$. Obviously, if only one direction were measured and asymmetries existed, this would not be the case.

Second, the measurements set, $\Omega$, is a collection of Q number of pairs of routers for which round-trip delay and delay-jitter are actually measured using an ANMT, for example. A fundamental property of the measurements set is that, based on measurements so obtained, one can accurately estimate delay/jitter metrics for all pairs of routers specified in the requirements set, $\Phi$. In particular, the measurements set can be defined as $$\Omega = \{\pi'_\kappa, \kappa=1, 2, \ldots, Q\} \quad (69)$$

where $$\pi'_\kappa = (R_{(k1,i)}, R_{(k2,j)}) \quad (70)$$

As will be apparent to one of skill in the art, $\Omega$ will always be a subset of $\Phi$.

It is assumed that, for a given pair of enterprise routers, $R_{(k1,i)}$ and $R_{(k2,j)}$, the only available route between them is through the backbone routers, $\rho_{k1}$ and $\rho_{k2}$, that physically connect $R_{(k1,i)}$ and $R_{(k2,j)}$ to the SP backbone, respectively. As a result, the route between them is given by $$\text{Link\_path}(R_{(k1,i)}, R_{(k2,j)}) = \langle L_{(k1,i)}, \lambda_{(k1, k2)}, L_{(k2,j)} \rangle \quad (71)$$

Three types of delay components that contribute to the round-trip delay between a pair of enterprise routers may be defined:

1. $d_{(k,i)}$, k=1, 2, ..., m, i=1, 2, ..., $n_k$, the round-trip delay in transferring an IP packet between the pair of routers, $R_{(k,i)}$ and $\rho_k$, over the link, $L_{(k, i)}$;
2. $s_{(k,i)}$, k=1, 2, ..., m, i=1, 2, ..., $n_k$, the time it takes to generate, receive and process a probe packet within transport and application layers in an enterprise router, $R_{(k,i)}$; and
3. $c_{(k1, k2)}$, k1, k2=1, 2, ..., m, k1≠k2, the round-trip delay in transferring an IP packet between the pair of backbone routers, $\rho_{k1}$ and $\rho_{k2}$.

This definition builds on that previously given with regard to protocol transfer delay and processing delay.

The ordered collection of delay components is re-written in the form of a vector of size 2N+m*(m−1)/2:

$$x^T = \begin{bmatrix} d_{(1,1)} & d_{(1,2)} & \ldots & d_{(1,n1)} \\ d_{(2,1)} & d_{(2,2)} & \ldots & d_{(2,n2)} \\ \ldots & & & \\ d_{(m,1)} & d_{(m,2)} & \ldots & d_{(m,nm)} \\ c_{(1,2)} & c_{(1,3)} & \ldots & c_{(1,m)} \\ c_{(2,3)} & c_{(2,4)} & \ldots & c_{(2,m)} \\ \ldots & & & \\ c_{(m-1,m)} & & & \\ s_{(1,1)} & s_{(1,2)} & \ldots & s_{(1,n1)} \\ s_{(2,1)} & s_{(2,2)} & \ldots & s_{(2,n2)} \\ \ldots & & & \\ s_{(m,1)} & s_{(m,2)} & \ldots & s_{(m,nm)} \end{bmatrix} \quad (72)$$

In view of the definition of delay components set out above, the round-trip delay between a given pair of enterprise routers, $R_{(k1,i)}$ and $R_{(k2,j)}$, as seen by network monitoring applications, is given by:

(a) in the case where k1≠k2, and assuming that link_path $(R_{(k1,i)}, R_{(k2,j)}) = <L_{(k1,i)}, \lambda_{(k1,k2)}, L_{(k2,j)}>$, $$z_\kappa = Delay(R_{(k1,i)}, R_{(k2,j)}) \quad (73a)$$

$$= s_{(k1,i)} + d_{(k1,i)} + c_{(k1,k2)} + d_{(k2,j)} + s_{(k2,j)} \quad (73b)$$

$$= F_\kappa x \quad (73c)$$

where $$F_\kappa = [0 \ldots 0\ 1\ 0 \ldots 0\ 1\ 0 \ldots 0\ 1\ 0 \ldots 0\ 1\ 0 \ldots 0\ 1\ 0 \ldots] \quad (73d)$$

is a row vector of size 2N+m*(m−1)/2, and the 1's in $F_\kappa$ appear in columns corresponding to column variables, $c_{(k1, k2)}$, $d_{(k1,i)}$, $s_{(k1,i)}$, $d_{(k2,j)}$, and $s_{(k2,j)}$;

(b) in the case where k1=k2, and assuming that path$(R_{(k1,i)}, R_{(k2,j)}) = <L_{(k1,j)}, L_{(k1,j)}>$, $$z_\kappa = Delay(R_{(k1,i)}, R_{(k1,j)}) \quad (74a)$$

$$= s_{(k1,i)} + d_{(k1,i)} + d_{(k1,j)} + s_{(k1,j)} \quad (74b)$$

$$= F_\kappa x \quad (74c)$$

where $$F_\kappa = [0 \ldots 0\ 1\ 0 \ldots 0\ 1\ 0 \ldots 0\ 1\ 0 \ldots 0\ 1\ 0 \ldots 0] \quad (74d)$$

and the 1's in $F_\kappa$ appear in columns corresponding to column variables, $d_{(k1,i)}$, $s_{(k1,i)}$, $d_{k1,j}$, and $s_{(k1,j)}$.

Because delay, $z_\kappa = Delay(R_{(k1,i)}, R_{(k2,j)})$, varies, one may define delay-jitter between a pair of routers, $R_{(k1,i)}$ and $R_{(k2,j)}$ as follows:

$$\text{Delay-Jitter}(R_{(k1,i)}, R_{(k2,j)}) = \sqrt{E\{(z_\kappa - E\{z_\kappa\})^2\}} \quad (75)$$

where $z_\kappa = Delay(R_{(k1,i)}, R_{(k2,j)})$ and $E\{.\}$ is the expectation operation. The round-trip delay between the specified pairs of routers in $\Phi = \{\pi_\kappa = (R_{(k1,i)}, R_{(k2,j)}), \kappa = 1, 2, \ldots, P\}$, may be re-written as a vector equation:

$$z = Fx \quad (76)$$

where $$z = [z_1] \quad (77)$$
$$[z_2]$$
$$[\ldots]$$
$$[z_P]$$

and $$F = [F_1] \quad (78)$$
$$[F_2]$$
$$[\ldots]$$
$$[F_P]$$

The P×2N+m*(m−1)/2 matrix, F, helps determine the subset of pairs of routers between which delay measurements are necessary. If $F_1, F_2, \ldots, F_Q$ is indeed a maximal set of linearly independent rows of F, then row vectors, $F_{Q+1}, F_{Q+2}, \ldots, F_P$ can be expressed as a linear combination of $F_1, F_2, \ldots, F_Q$ as follows:

$$F_\kappa = \Sigma_{i=1, \ldots, Q}(\alpha_{\kappa,i} F_i), \kappa = Q+1, Q+2, \ldots, P \quad (79)$$

The constants $\alpha_{\kappa,i}$ may be re-organized in the form of a row vector (of size Q) as follows:

$$\alpha_\kappa = [\alpha_{\kappa,1}, \alpha_{\kappa,2}, \ldots, \alpha_{\kappa,Q}], \kappa = Q+1, Q+2, \ldots, P \quad (80)$$

while the P×Q matrix, A, is defined as:

$$A = [I] \quad (81)$$
$$[\alpha_{Q+1}]$$
$$[\alpha_{Q+2}]$$
$$[\ldots]$$
$$[\alpha_P]$$

where the matrix, I, is a Q×Q identity matrix.

A Measurement and Estimation Scheme for a Specified Requirements Set

A procedure according to one embodiment of the present invention is now described that computes round-trip delay and jitter for every pair of routers, $\pi_\kappa = (R_{(k1,i)}, R_{(k2,j)})$ contained in a specified requirements set, $\Phi$, using measurements between pairs of routers in the measurements set, $\Omega$, and identified using a method such as that described below. The scheme is particularly useful when the number of pairs of routers in the requirements set is not large.

Figure 9:
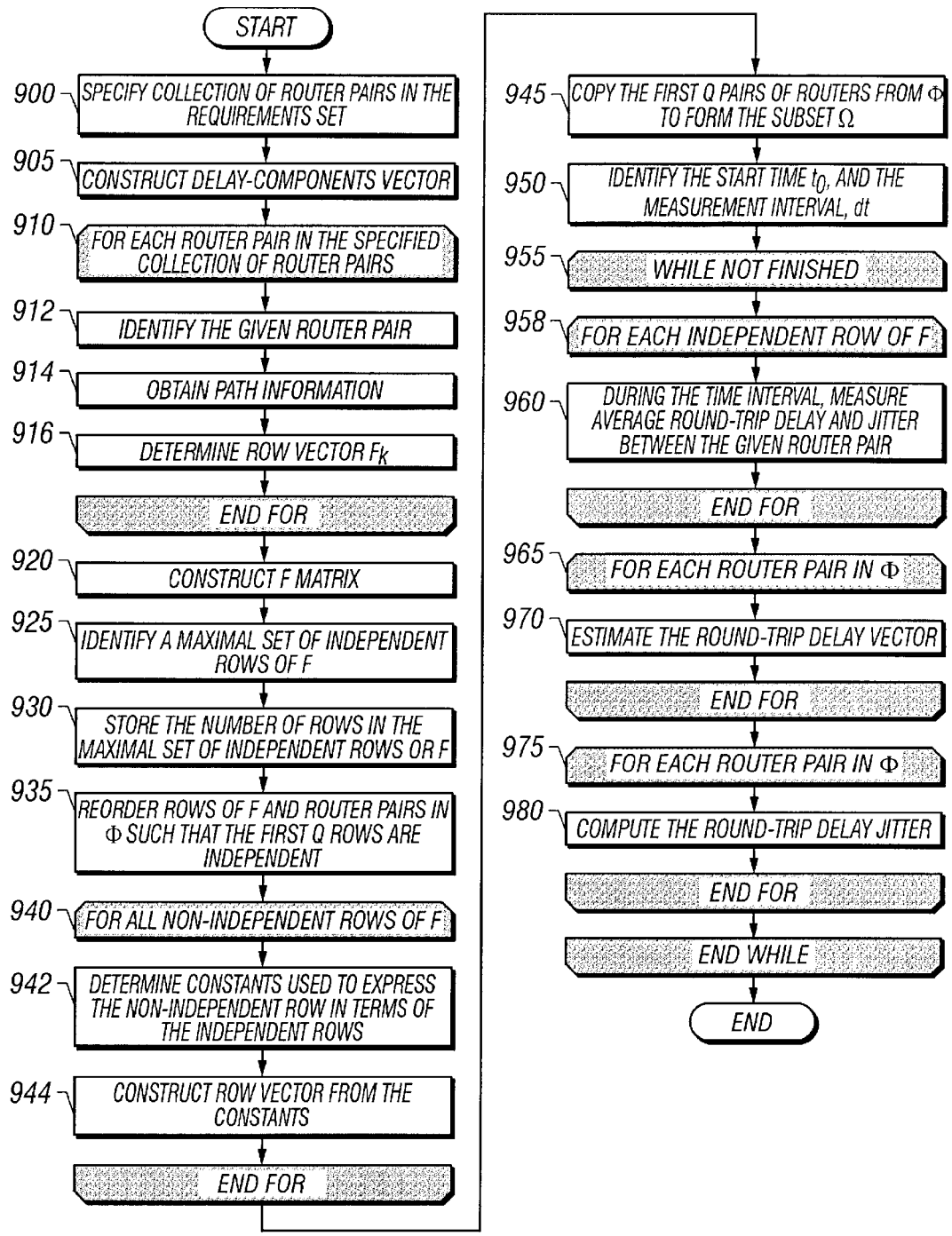
FIG. 9 is a flow diagram illustrating a process according to an embodiment of the present invention that computes round-trip delay and jitter for router pairs contained in a specified requirements set using measurements between router pairs in the measurements set.

FIG. 9 is a flow diagram illustrating a process that computes round-trip delay and jitter for every pair of routers contained in a specified requirements set using measurements between router pairs in the measurements set. The computation of round-trip delay and jitter (also referred to herein as delay-jitter) begins with the specification of the requirements set (step 900). Next, the delay-components vector (x) is constructed per Equation (72) and associated equations (step 905). For each router pair in the specified requirement set (step 910), the following actions are performed. First, the given router pair is identified as being an element of the collection of router pairs (step 912). Next, path information is obtained for the given pair of routers (step 914). Finally, the row vector ($F_k$) is then determined (step 916).

Once these steps have been carried out for each router pair in the specified collection of router pairs, the F matrix is constructed in accordance with Equation (78) and associated equations (step 920). Once the F matrix has been constructed, a maximal set of independent rows of the F matrix are identified (step 925). Once identified, the number of independent rows in the F matrix is stored (Step 930). The rows of the F matrix (as well as the router pairs in $\Phi$) are reordered such that the first Q rows of the F matrix are independent (step 935). For each dependent row of the F matrix (step 940), the constants used to express the dependent row in terms of the independent rows are determined (step 942), and a corresponding row vector is constructed for these constants (step 944). Then the first Q pairs of routers (representing the first Q independent rows of the F matrix) are copied in order to form the subset $\Omega$, representing the measurements set (step 945). As has been noted, the quantity Q represents the number of rows in the maximal set of independent rows of the F matrix.

At this point, the values for the start time and measurement interval are set (step 950). Next, while the measurement process remains unfinished (step 955), the following actions are performed. For each independent row of F (step 958), the average round-trip delay and jitter between pairs of routers in Ω are measured during the time interval (step 960). Next, for each router pair in Φ (step 965), the round-trip delay vector is estimated (step 970). In a similar fashion, for each router pair in Φ (step 975), the round-trip delay-jitter is computed (step 980). This completes the exemplary process of computing round-trip delay and jitter for the routers contained in the specified requirement set.

In using the above method, the measurement error is assumed to be negligible. Moreover, delay estimates are optimal provided no other delay measurements or a priori estimates are available. The process of computing round-trip delay and jitter for every pair of routers contained in a specified requirements set using measurements between router pairs in the measurements set is now outlined using a formal representation.

```
BEGIN
/* Specify collection of router pairs in requirement set.       */
/* Such a pair of router should not be, for example, (R(k1,i), ρk2)  */
Φ = {πκ = R(k1,i), R(k2,j)), κ = 1, 2, . . . , P};
Construct delay-           /* see Eqn (72) and associated equations */
components vector, x;
For each κ = 1, 2, . . . , P, do {
    Identify the pair of routers πκ = (R(k1,i), R(k2,j)) ∈ Φ;
    Obtain link_path(R(k1,i), R(k2,j)) = <L(k1,1), λ(k1,k2), L(k2,j)>;
    Determine the row vector, Fκ, such that zκ =
    Delay(R(k1,i), R(k2,j)) = Fκ c
};
Construct P ×              /* see Eqn (78) and associated equations */
2N+m*(m−1)/2 matrix, F;
Identify a maximal set of independent rows of F;
Q = the number of maximal set of independent rows of F;
Reorder rows of F and router pairs in Φ such that the first Q rows,
F1, F2, . . . , FQ, are independent;
For each κ = Q+1, Q+2, . . . , P, do {
    Determine ακ,1, ακ,2, . . . , ακ,Q such that Fκ = Σi=1,...Q(ακ,i Fi);
    Construct the row vector ακ = [ακ,1, ακ,2, . . . , ακ,Q]
};
Copy the first Q pairs of routers from Φ to form the subset Ω;
Identify the start time t0, and the measurement interval, dt;
While (!finished) {
    For each κ = 1, 2, . . . , Q, do {
        During the time interval (t0, t0 +dt) use a network monitoring
        tool to measure average round-trip delay, yκ, and delay-jitter, γκ,
        between the pair of routers, πκ = (R(k1,i), R(k2,j))
    For each pair of routers in Φ, estimate round-trip delay vector, Δκ
        For each κ = 1, 2, . . . , Q, do {
            Δκ = yκ
        };
        For each κ = Q+1, Q+2, . . . , P, do {
            Δκ = Σi=1,...Q(ακ,i yi)
        };
    For each pair of routers in Φ, compute round-trip delay-jitter, σκ,
        For each κ = 1, 2, . . . , Q, do {
            σκ = γκ
        };
        For each κ = Q+1, Q+2, . . . , P, do {
            σκ = √Σi=1,...Q(ακ,i² γi²)
        };
    }
END
```

The above method may be improved by recognizing that the variables, $s_{(k1,i)}$ and $d_{(k1,i)}$, always appear together as $s_{(k1,i)}+d_{(k1,i)}$. In that case, the variable x may be redefined as follows (see equation also (72) and associated equations):

$$x^T = [d_{(1,1)} + s_{(1,1)} \quad d_{(1,2)} + s_{(1,2)} \quad \ldots \quad d_{(1,nl)} + s_{(1,nl)} \quad (82)$$

-continued
$$d_{(2,1)} + s_{(2,1)} \quad d_{(2,2)} + s_{(2,2)} \quad \ldots \quad d_{(2,n2)} + s_{(2,n2)}$$
$$\ldots$$
$$d_{(m,1)} + s_{(m,1)} \quad d_{(m,2)} + s_{(m,2)} \quad \ldots \quad d_{(m,nm)} + s_{(m,nm)}$$
$$c_{(1,2)} \quad c_{(1,3)} \quad \ldots \quad c_{(1,m)}$$
$$c_{(2,3)} \quad c_{(2,4)} \quad \ldots \quad c_{(2,m)}$$
$$\ldots$$
$$c_{(m-1,m)}]$$

As a result, one may redefine $D_{(i,j)}=d_{(i,j)}+s_{(i,j)}$ for all i and j, and represent delay, Delay($R_{k1,i}$, $R_{k2,j}$), in terms of vector, x, as follows:

(a) in the case where k1≠k2, $$z_k = Delay(R_{(k1,i)}, R_{(k2,j)}) \tag{83a}$$

$$= D_{(k1,i)} + c_{(k1,k2)} + D_{(k2,j)} \tag{83b}$$

$$= F_k x \tag{83c}$$

where $$F_\kappa=[0 \ldots 0 \ 1 \ 0 \ldots 0 \ 1 \ 0 \ldots 0 \ 1 \ 0 \ldots 0] \tag{83d}$$

is a row vector of size N+m*(m−1)/2, and the 1's in $F_\kappa$ appear in columns corresponding to column variables, $D_{(k1,i)}$, $D_{(k2,j)}$ and $c_{(k1, k2)}$, (b) in the case where k1=k2, $$z_k = Delay(R_{(k1,i)}, R_{(k1,j)}) \tag{84a}$$

$$= D_{(k1,i)} + D_{(k1,j)} \tag{84b}$$

$$= F_k x \tag{84c}$$

where $$F_\kappa=[0 \ldots 0 \ 1 \ 0 \ldots 0 \ 1 \ 0 \ldots 0] \tag{84d}$$

is a row vector of size N+m*(m−1)/2, and the ones in $F_\kappa$ appear in columns corresponding to variables $D_{(k1,i)}$ and $D_{(k1,j)}$.

An Exemplary Network

Figure 10A:
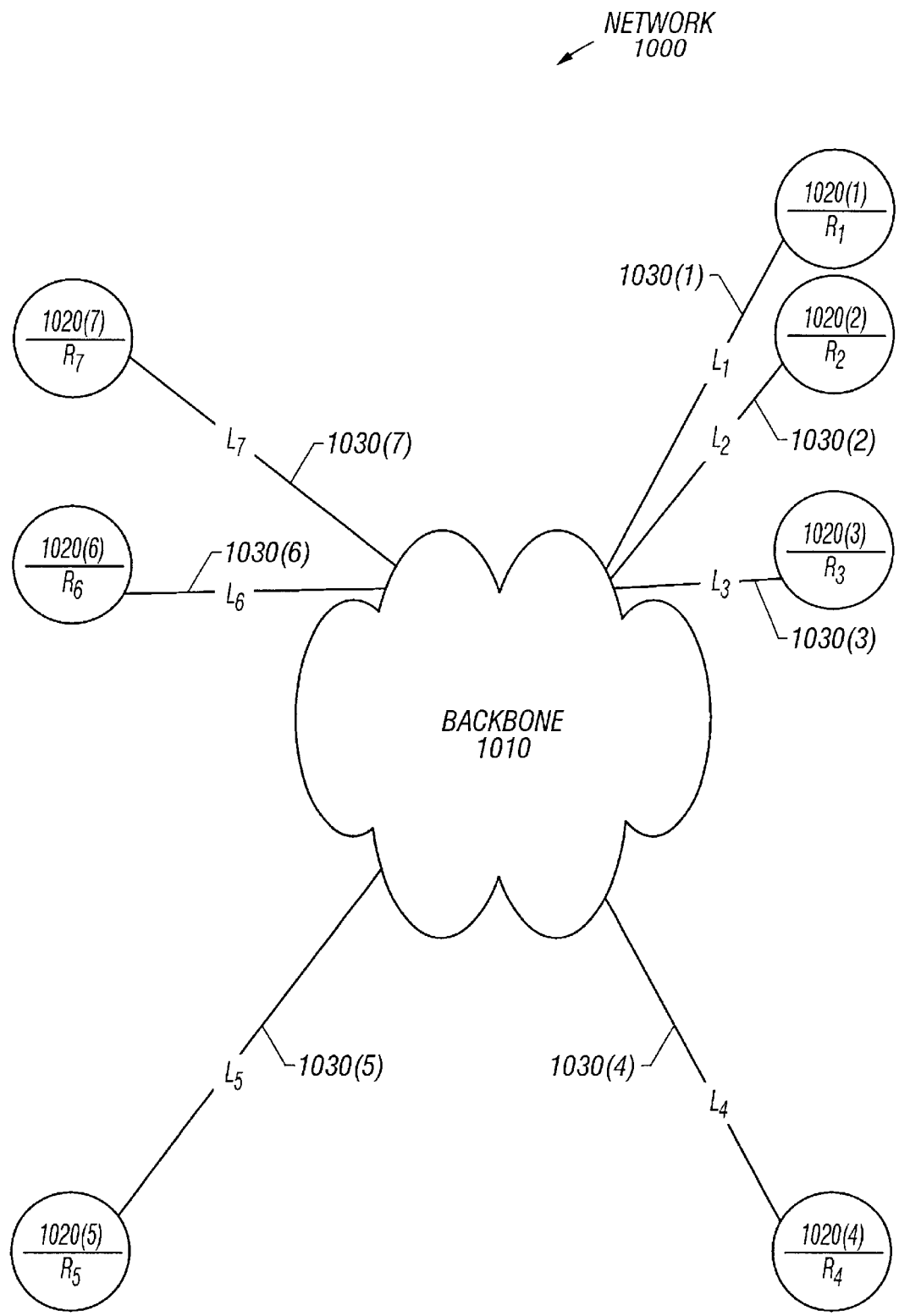
FIG. 10A is a block diagram illustrating an exemplary network in which a measurement technique according to an embodiment of the present invention can be practiced.

FIG. 10A is a block diagram illustrating an exemplary network 1000, where N=7. Network 1000 includes a backbone 1010 and routers 1020(1)–(7). Routers 1020(1)–(7) are coupled to backbone 1010 by links 1030(1)–(7), respectively. It will be noted that routers 1020(1)–(7) are also designated $R_i$, i=1, 2, . . . ,7, and that links 1030(1)–(7) are also designated $L_j$, j=1, 2, . . . ,7, in order to allow network 1000 to be discussed in terms of the parameters discussed herein. The only information that can be gleaned from backbone 1010 is the existence of backbone routers that allow ingress of network traffic into backbone 1010—further information as to the topology and routing of backbone 1010 remains unknown. It is desirable to determine, or at least estimate, the delay experienced by network traffic flowing through the enterprise network, including that transiting backbone 1010. This information may be derived using the techniques just described, and results in the scenario depicted in FIG. 10B.

Figure 10B:
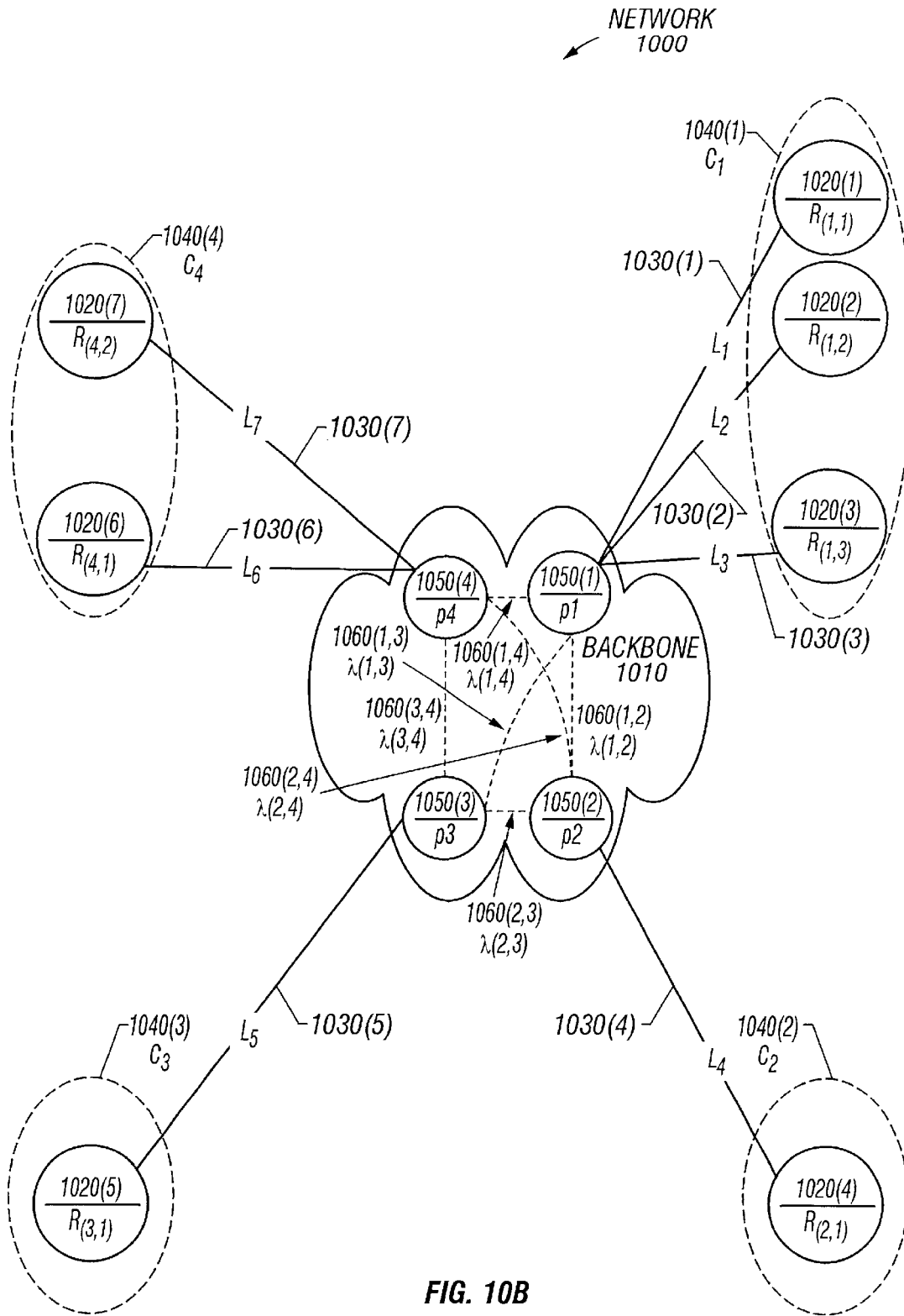
FIG. 10B is a block diagram illustrating an exemplary network after being apportioned into clusters using a method according to an embodiment of the present invention.

FIG. 10B illustrates exemplary network 1000 after being apportioned into clusters using a method according to one embodiment of the present invention. As before, network 1000 includes routers 1020(1)–(7) coupled to backbone 1010 by links 1030(1)–(7), respectively. It is understood that backbone routers provide points of ingress or egress to backbone 1010 for the enterprise network connected thereto. As noted previously, the existence of backbone routers 1050(1)–(4) can be deduced from the interaction of backbone routers 1050(1)–(4) with routers 1020(1)–(7), but further information as to the topology and routing of backbone 1010 remains unknown, as noted.

In order to allow the determination of delay and jitter throughout network 1000, embodiments according to the present invention apportion the enterprise network into clusters using a method of cluster formation such as that described previously. Using such a method, the enterprise network can be modeled as having m=4 clusters. These are depicted in FIG. 10B as clusters 1040(1)–(4), and are also designated as clusters $C_1$, $C_2$, $C_3$, $C_4$, in order to facilitate the discussions herein. Backbone 1010 is depicted as including a number of backbone routers (i.e., backbone routers 1050(1)–(4)), with the routers in each of clusters 1040(1)–(4) coupled to one of the a corresponding backbone routers 1050(1)–(4). Moreover, each of backbone routers 1050(1)–(4) is connected to each of the other ones of backbone routers 1050(1)–(4) by a given backbone link (backbone links 1060(1,2)–(3,4)). As noted, backbone links 1060(1,2)–(3,4) are virtual, but are useful in allocating delay and jitter throughout network 1000. Thus, backbone 1010 is represented as having a fully-connected topology generated by a method according to an embodiment of the present invention. As before, backbone routers 1050(1)–(7) are also designated $\rho_i$, i=1, 2, ..., 4. Moreover, backbone links 1060(1,2)–(3,4) are also designated $\lambda(i,j)$ (i=1, ..., 3; j=i+1, ..., 4). This is done to allow the description of the parameters in terms of the equations and methods described herein. The backbone network may therefore be modeled as a fully-connected network that includes routers, $\rho_k$, k=1, 2, ..., 4, and links, $\lambda_{(k1, k2)}$, k1, k2=1, 2, ..., 4, k1≠k2. It will also be noted that $R_i$, i=1, 2, ..., 7, have been renumbered to reflect their designations in the following calculations and appear as $R_{(1,1)}$, $R_{(1,2)}$, $R_{(1,3)}$, $R_{(2,1)}$, $R_{(3,1)}$, $R_{(4,1)}$ and $R_{(4,2)}$, respectively.

As can be seen, there is a unique route between any given pair of enterprise routers. In particular, the route between $R_{(k1,i)}$ and $R_{(k2,j)}$ is given by:

$$\text{Link\_path}(R_{(k1,i)}, R_{(k2,j)}) = <L_{(k1,i)}, \lambda_{(k1, k2)}, L_{(k2,j)}> \quad (85)$$

The execution of the method to estimate round-trip delay and jitter for the specified requirements set, $\Phi$, is now illustrated. Let $$\Phi = \{ \quad (86)$$

$(R_{(2,1)}, R_{(1,1)}), (R_{(2,1)}, R_{(1,2)}), (R_{(2,1)}, R_{(1,3)}),$ $(R_{(3,1)}, R_{(1,1)}), (R_{(3,1)}, R_{(1,2)}), (R_{(3,1)}, R_{(1,3)}),$ $(R_{(4,1)}, R_{(1,1)}), (R_{(4,1)}, R_{(1,2)}), (R_{(4,1)}, R_{(1,3)}),$ $(R_{(4,2)}, R_{(1,1)}), (R_{(4,2)}, R_{(1,2)}), (R_{(4,2)}, R_{(1,3)})$ $\}$

The delay-component vector, $$x^T = [D_{(1,1)}] \quad (87)$$
$[D_{(1,2)}]$
$[D_{(1,3)}]$
$[D_{(2,1)}]$
$[D_{(3,1)}]$
$[D_{(4,1)}]$
$[D_{(4,2)}]$
$[c_{(1,2)}]$
$[c_{(1,3)}]$
$[c_{(1,4)}]$
$[c_{(2,3)}]$
$[c_{(2,4)}]$
$[c_{(3,4)}]$ Because $z_1 = \text{Delay}(R_{(2,1)}, R_{(1,1)}) = D_{(1,1)} + c_{(1,2)} + D_{(2,1)}$, $$F_1 = [1\ 0\ 0\ 1\ 0\ 0\ 0\ 1\ 0\ 0\ 0\ 0\ 0] \quad (88)$$

Similarly, one may obtain $F_i$, i=2, 3, ..., 12. The resulting 12×13 matrix F is given by:

|  | $D_{(1,1)}$ | $D_{(1,2)}$ | $D_{(1,3)}$ | $D_{(2,1)}$ | $D_{(3,1)}$ | $D_{(4,1)}$ | $D_{(4,2)}$ | $c_{(1,2)}$ | $c_{(1,3)}$ | $c_{(1,4)}$ | $c_{(2,3)}$ | $c_{(2,4)}$ | $c_{(3,4)}$ |
|---|---|---|---|---|---|---|---|---|---|---|---|---|---|
| $Z_1$ | 1 | | | 1 | | | | 1 | | | | | |
| $Z_2$ | | 1 | | 1 | | | | 1 | | | | | |
| $Z_3$ | | | 1 | 1 | | | | 1 | | | | | |
| $Z_4$ | 1 | | | | 1 | | | | 1 | | | | |
| $Z_5$ | | 1 | | | 1 | | | | 1 | | | | |
| $Z_6$ | | | 1 | | 1 | | | | 1 | | | | |
| $Z_7$ | 1 | | | | | 1 | | | | 1 | | | |
| $Z_8$ | | 1 | | | | 1 | | | | 1 | | | |
| $Z_9$ | | | 1 | | | 1 | | | | 1 | | | |
| $Z_{10}$ | 1 | | | | | | 1 | | | | | 1 | |
| $Z_{11}$ | | 1 | | | | | 1 | | | | | 1 | |
| $Z_{12}$ | | | 1 | | | | 1 | | | | | 1 | |

It can be verified that $F_1$, $F_2$, $F_3$, $F_4$, $F_7$, $F_{10}$ are independent row vectors. As a result, Q=6. The row vectors, $F_k$ are re-ordered, as those corresponding to $z_1$, $z_2$, $z_3$, $z_4$, $z_7$, $z_{10}$. The re-ordered version of F is:

| | $D_{(1,1)}$ | $D_{(1,2)}$ | $D_{(1,3)}$ | $D_{(2,1)}$ | $D_{(3,1)}$ | $D_{(4,1)}$ | $D_{(4,2)}$ | $c_{(1,2)}$ | $c_{(1,3)}$ | $c_{(1,4)}$ | $c_{(2,3)}$ | $c_{(2,4)}$ | $c_{(3,4)}$ |
|---|---|---|---|---|---|---|---|---|---|---|---|---|---|
| $Z_1$ | 1 | | | 1 | | | | 1 | | | | | |
| $Z_2$ | | 1 | | | 1 | | | 1 | | | | | |
| $Z_3$ | | | 1 | 1 | | | | 1 | | | | | |
| $Z_4$ | 1 | | | | 1 | | | | 1 | | | | |
| $Z_7$ | 1 | | | | | 1 | | | | 1 | | | |
| $Z_{10}$ | 1 | | | | | | 1 | | | 1 | | | |
| $Z_5$ | | 1 | | 1 | | | | | | | 1 | | |
| $Z_6$ | | | 1 | 1 | | | | | | | 1 | | |
| $Z_8$ | | 1 | | | | 1 | | | | | | 1 | |
| $Z_9$ | | | 1 | | | 1 | | | | | | 1 | |
| $Z_{11}$ | | 1 | | | | | 1 | | | | | | 1 |
| $Z_{12}$ | | | 1 | | | | 1 | | | | | | 1 |

Further, it can be shown that $$F_5 = F_2 + F_4 - F_1 \tag{89a}$$

$$F_6 = F_3 + F_4 - F_1 \tag{89b}$$

$$F_8 = F_2 + F_7 - F_1 \tag{89c}$$

$$F_9 = F_3 + F_7 - F_1 \tag{89d}$$

$$F_{11} = F_2 + F_{10} - F_1 \tag{89e}$$

$$F_{12} = F_3 + F_{10} - F_1 \tag{89f}$$

Consequently, $$\alpha_5 = [-1\ 1\ 0\ 1\ 0\ 0] \tag{90a}$$

$$\alpha_6 = [-1\ 0\ 1\ 1\ 0\ 0] \tag{90b}$$

$$\alpha_8 = [-1\ 1\ 0\ 0\ 1\ 0] \tag{90c}$$

$$\alpha_9 = [-1\ 0\ 1\ 0\ 1\ 0] \tag{90d}$$

$$\alpha_{11} = [-1\ 1\ 0\ 0\ 0\ 1] \tag{90e}$$

$$\alpha_{12} = [-1\ 0\ 1\ 0\ 0\ 1] \tag{90f}$$

As a result $$\Omega = \{ \tag{91}$$

$$(R_{(2,1)}, R_{(1,1)}), (R_{(2,1)}, R_{(1,2)}),$$

$$(R_{(2,1)}, R_{(1,3)}), (R_{(3,1)}, R_{(1,1)}),$$

$$(R_{(4,1)}, R_{(1,1)}), (R_{(4,2)}, R_{(1,1)})$$

$$\}$$

Initially $$t_0 = 0 \text{ (seconds)} \tag{92}$$

and $$dt = 60 \text{ (seconds)} \tag{93}$$

which can then be used to define an interval $(t_0, t_0+dt)$. During the interval $(t_0, t_0+dt)$, a network monitoring tool is used to measure round-trip delay and jitter between pairs of routers identified by $\Omega$, to yield delay measurements, $y_1, y_2, y_3, y_4, y_7, y_{10}$, and delay-jitter measurements, $\gamma_1, \gamma_2, \gamma_3, \gamma_4, \gamma_7, \gamma_{10}$. An estimate of delay between pairs of routers in $\Phi$ is given by $$\Delta_1 = y_1 \tag{94a}$$

$$\Delta_2 = y_2 \tag{94b}$$

$$\Delta_3 = y_3 \tag{94c}$$

$$\Delta_4 = y_4 \tag{94d}$$

$$\Delta_7 = y_7 \tag{94e}$$

$$\Delta_{10} = y_{10} \tag{94f}$$

and $$\Delta_5 = y_2 + y_4 - y_1 \tag{95a}$$

$$\Delta_6 = y_3 + y_4 - y_1 \tag{95b}$$

$$\Delta_8 = y_2 + y_7 - y_1 \tag{95c}$$

$$\Delta_9 = y_3 + y_7 - y_1 \tag{95d}$$

$$\Delta_{11} = y_2 + y_{10} - y_1 \tag{95e}$$

$$\Delta_{12} = y_3 + y_{10} - y_1 \tag{95f}$$

An estimate of delay-jitter between pairs of routers in $\Phi$ is given by $$\sigma_1 = \gamma_1 \tag{96a}$$

$$\sigma_2 = \gamma_2 \tag{96b}$$

$$\sigma_3 = \gamma_3 \tag{96c}$$

$$\sigma_4 = \gamma_4 \tag{96d}$$

$$\sigma_7 = \gamma_7 \tag{96e}$$

$$\sigma_{10} = \gamma_{10} \tag{96f}$$

and $$\sigma_5 = \sqrt{(\gamma_2^2 + \gamma_4^2 + \gamma_1^2)} \tag{97a}$$

$$\sigma_6 = \sqrt{(\gamma_3^2 + \gamma_4^2 + \gamma_1^2)} \tag{97b}$$

$$\sigma_8 = \sqrt{(\gamma_2^2 + \gamma_7^2 + \gamma_1^2)} \tag{97c}$$

$$\sigma_9 = \sqrt{(\gamma_3^2 + \gamma_7^2 + \gamma_1^2)} \tag{97d}$$

$$\sigma_{11} = \sqrt{(\gamma_2^2 + \gamma_{10}^2 + \gamma_1^2)} \tag{97e}$$

$$\sigma_{12} = \sqrt{(\gamma_3^2 + \gamma_{10}^2 + \gamma_1^2)} \tag{97f}$$

Once complete, the steps of delay measurement and estimation can be repeated by incrementing $t_0$ (e.g., $t_0 = t_0 + dt$).

IV. Estimating Delay and Jitter in an Enterprise Network Coupled to a Backbone Having an Unknown Topology and Estimating Delay Components within the Backbone A measurement scheme according to one embodiment of the present invention is now described that allows one to not only estimate the delay between a given pair of enterprise routers but, more importantly, to apportion the same to various links along the route, including the SP-provided backbone. This allows the determination of whether congestion (if any) exists within the backbone or over the local (or remote) links. It is assumed that a model of the enterprise network is available. That is, an enterprise network exists and consists of enterprise routers that are interconnected through a backbone network provided by a service provider (as in FIG. 8A). It is further assumed that a model of the backbone network in terms of backbone routers and virtual links (as in FIG. 8B) has been obtained using methods previously described. As such, such a network is modeled as a collection of m clusters of enterprise routers, with a backbone router corresponding to each.

Figure 11:
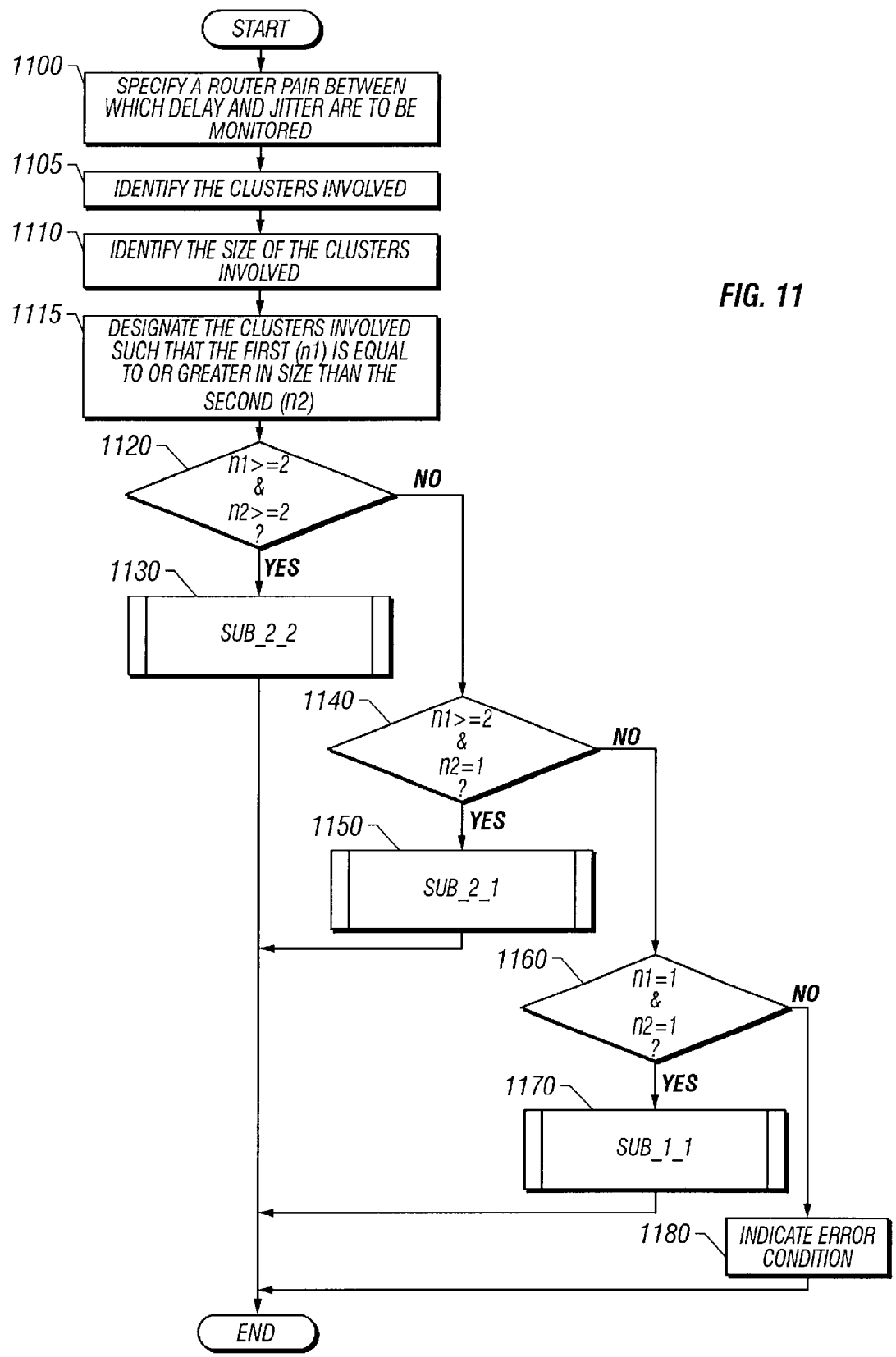
FIG. 11 is a flow diagram illustrating the operations performed in the process of apportioning delay components according to an embodiment of the present invention.

FIG. 11 is a flow diagram illustrating the operations performed in the process of apportioning delay components. The apportioning of delay components begins with the specification of a router pair between which delay and jitter are to be monitored (step 1100). Once the routers of the router pair are specified, the clusters corresponding to these routers are then identified (step 1105) and the size of those clusters is determined (step 1110). The size of the clusters are designated as n1 and n2, corresponding to the cluster designated as the first cluster and the cluster designated as the second cluster, respectively (step 1115). The designation of a cluster as the first or second cluster is arbitrary, and is driven by the need to identify the clusters with one of the following possible scenarios. If the size of both clusters is greater that two (i.e., each cluster contains at least two enterprise routers) (step 1120), the process designated as Sub_2_2 is employed (step 1130). If the size of the first cluster is at least 2, but the size of the second cluster is one (step 1140), the process designated as Sub_2_1 is employed (step 1150). If both clusters have a size of one (step 1160), the process designated as Sub_1_1 is employed (step 1170). It will be noted that the processes just referred to are designated using the minimum sizes for the first and second clusters. If none of the aforementioned cases hold, and error condition exists and is indicated as such (step 1180).

The overall paradigm for apportioning delay components is now outlined using a formal representation. The process referred to herein as Apportion_delay_components is one such description.

---

BEGIN "Apportion_delay_components"
/* Delay and jitter components are monitored between these two    */
    enterprise routers.
Specify a pair of routers, $(R_{(k1,i)}, R_{(k2,j)})$, k1 ≠ k2;
Identify the corresponding clusters, $C_{k1}$ and $C_{k2}$;
Identify the size, n1 and n2, of the corresponding clusters;
/* Note that n1 and n2 can be selected such that n1 ≧ n2 without   */
    loss of generality
/* Three cases can be identified:                                   */
/* The size of both the first and second clusters are greater than or */
    equal to 2
    If n1 ≧ 2, n2 ≧ 2 then {
        Sub_2_2 ( )
    };
/* The size of the first cluster is greater than or equal to 2     */
/* The size of the second clusters is equal to 1                   */
    If n1 ≧ 2, n2 = 1 then {
        Sub_2_1 ( )
    };
/* The size of both the first and second clusters are equal to 1  */
    If n1 = 1, n2 = 1 then {
        Sub_1_1 ( )
    }
END "Apportion_delay_components"

---

Figure 12:
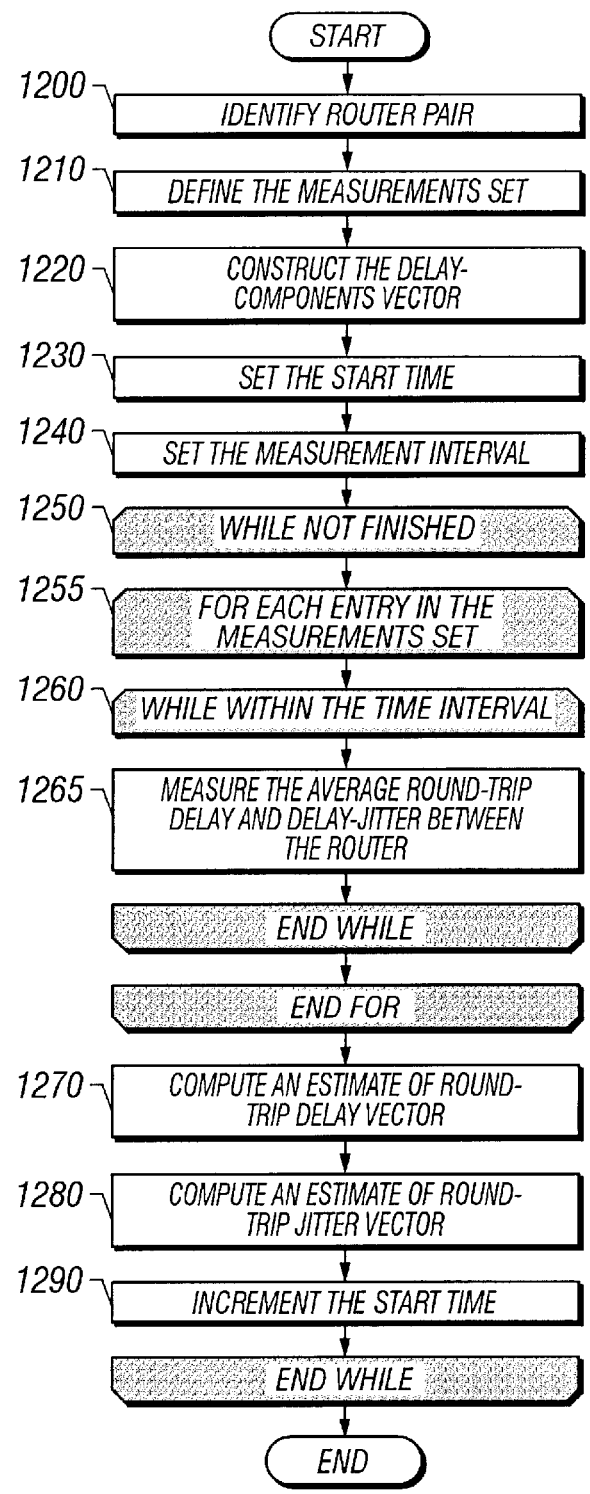
FIG. 12 is a flow diagram illustrating the operations performed in the process of apportioning delay components according to an embodiment of the present invention, when the size of both a first cluster and a second cluster are greater than or equal to two.

FIG. 12 is a flow diagram illustrating the operations performed in the process of apportioning delay components when the size of both a first cluster and a second cluster are greater than or equal to two. The process begins with the identification of the router pair (step 1200) and the definition of the measurements set (step 1210). Next, the delay-components vector is constructed (step 1220). The start time and measurement interval are then set (steps 1230 and 1240). While the measurement of delay and jitter has not been completed (step 1250), the following steps are carried out. For each entry in the measurements set (step 1255), and while within the time interval (step 1260), the average round-trip delay and delay-jitter between the given router pair is measured (step 1265). Once such measurements have been completed for each entry in the measurements set during the time interval, an estimate of round-trip delay, in the form of a round-trip delay vector, is computed (step 1270). In a similar fashion, an estimate of round-trip jitter, in the form of a round-trip jitter vector, is computed (step 1280). Once these computations are completed, the start time may be incremented (step 1290) and the process repeated for the desired number of iterations.

A method for apportioning delay components when the given pair of routers, $(R_{(k1,i)}, R_{(k2,j)})$, both have sizes larger than or equal to two (i.e., $n1=|C_{k1}|≧2$, $n2=|C_{k2}|≧2$), is now outlined using a formal representation. This process is referred to herein as Sub_2_2.

---

BEGIN "Sub_2_2"
Identify routers, $R_{(k1,i+1)}, R_{(k2,j+1)}$;   /* If i = n1, then let i+1 = 1.
                                                     If j = n2, then let j+1 = 1. */
/* Define the measurements set */
Ω = {
    $\pi_1 = (R_{(k1,i)}, R_{(k1,i+1)})$,
    $\pi_2 = (R_{(k1,i)}, R_{(k2,j)})$,
    $\pi_3 = (R_{(k2,j)}, R_{(k1,i+1)})$,
    $\pi_4 = (R_{(k2,j)}, R_{(k2,j+1)})$,
    $\pi_5 = (R_{(k1,i)}, R_{(k2,j+1)})$
};
/* Note that $D_{(k1,i)} = d_{(k1,i)} + s_{(k1,i)}$ */
/* Construct the delay-components vector */
$x^T = [D_{(k1,i)}, D_{(k1,i+1)}, c_{(k1,k2)}, D_{(k2,j)}, D_{(k2,j+1)}]$;
$t_0$ = start_time;
dt = measurement_interval;
While (!finished) {
    For each κ = 1 to 5, do {
        While within time interval ($t_0$, $t_0$ +dt) {
            Use a network monitoring tool to measure average round-trip
            delay, $y_κ$, and delay-jitter, $γ_κ$, between
            the pair of routers, $\pi_κ$, in set Ω.
        }
    };
    Compute an estimate of link-level round-trip delay vector, x, using
    δ =  [   0.5     0.5    -0.5    0       0    ]   $[y_1]$
         [   0.5    -0.5     0.5    0       0    ]   $[y_2]$
         [  -0.5     0       0.5   -0.5     0.5  ]   $[y_3]$
         [   0       0.5     0      0.5    -0.5  ]   $[y_4]$
         [   0      -0.5     0      0.5     0.5  ]   $[y_5]$;
    Compute an estimate of link-level round-trip jitter vector, x, using
    Σ =  [   0.25    0.25    0.25    0       0    ]   $[γ_1^2]$
         [   0.25    0.25    0.25    0       0    ]   $[γ_2^2]$
         [   0.25    0       0.25    0.25    0.25 ]   $[γ_3^2]$
         [   0       0.25    0       0.25    0.25 ]   $[γ_4^2]$
         [   0       0.25    0       0.25    0.25 ]   $[γ_5^2]$
    where $Σ^T = [σ^2_{(k1,i)}, σ^2_{(k1,i+1)}, σ^2_{(k1,k2)}, σ^2_{(k2,j)}, σ^2_{(k2,j+1)}]$;
    $t_0 = t_0 + dt$
}
END "Sub_2_2"

---

Figure 13:
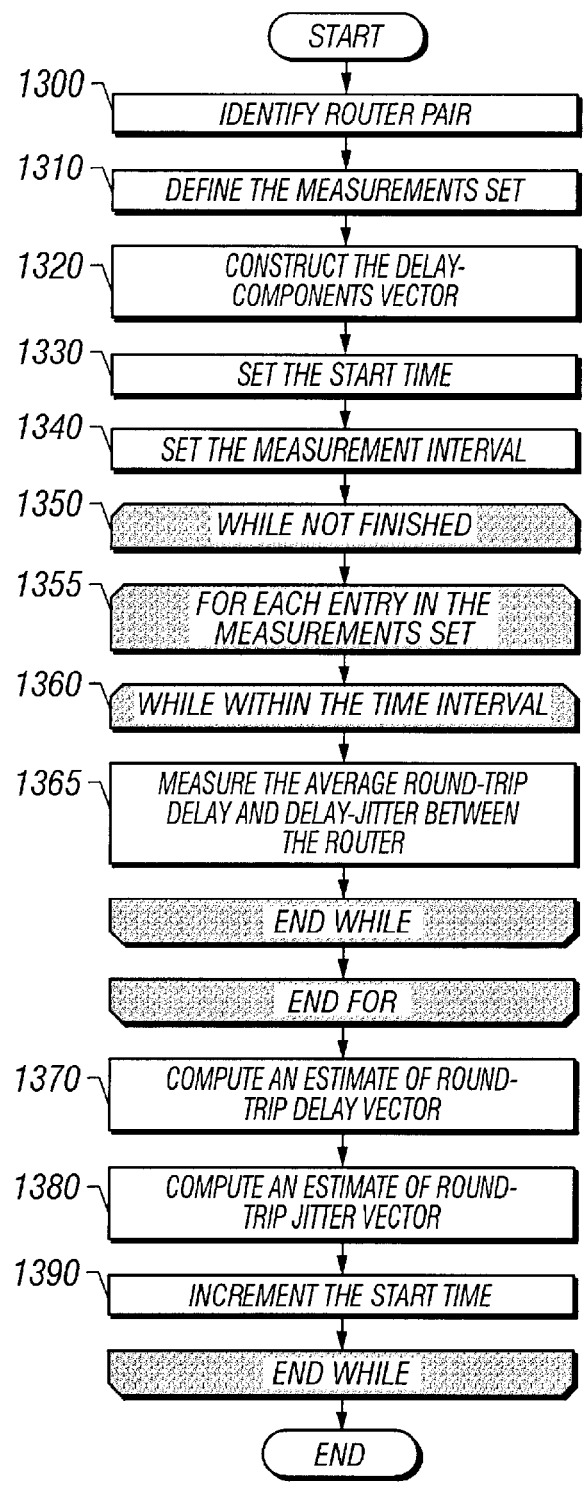
FIG. 13 is a flow diagram illustrating the operations performed in the process of apportioning delay components according to an embodiment of the present invention, when the size of a first cluster is greater than or equal to two and the size of a second cluster is equal to one.

FIG. 13 is a flow diagram illustrating the operations performed in the process of apportioning delay components when the size of a first cluster is greater than or equal to two and the size of a second cluster is equal to one. The process begins with the identification of a given router pair (step 1300) and the definition of the measurement set (step 1310). Next, a delay-components vector is constructed (step 1320).

The start time and measurement interval are then set (steps 1330 and 1340). While further measurements are desired (step 1350), the following actions are performed. For each entry in the measurements set (step 1355), and while within the time interval (step 1360), the average round-trip delay and delay-jitter between the given router pair are measured (step 1365). Once each entry in the measurement set is analyzed during the given time interval, an estimate of round-trip delay, represented by a round-trip delay vector, is computed (step 1370). In a similar fashion, an estimate of round-trip delay-jitter is computed (step 1380). The start time is incremented (step 1390) and further iterations are performed, as desired.

The method for apportioning delay components, when the size of a first cluster (n1) is greater than or equal to two and the size of a second cluster (n2) is equal to one, is now outlined using a formal representation. Thus, for the given pair of routers, $(R_{(k1,i)}, R_{(k2,j)})$, $n1=|C_{k1}|\geq 2$, $n2=|C_{k2}|=1$. This process is referred to herein as Sub__2__1.

---

BEGIN "Sub__2__1"
Identify routers, $R_{(k1,i+1)}$  /* If i = n1, then let i+1 = 1 */
/* Define the measurements set */
$\Omega = \{\pi_1 = (R_{(k1,i)}, R_{(k1,i+1)}), \pi_2 = (R_{(k1,i)}, R_{(k2,j)}), \pi_3 = (R_{(k2,j)}, R_{(k1,i+1)})\}$;
/* Construct the delay-components vector */
$x^T = [D_{(k1,i)}, D_{(k1,i+1)}, c_{(k1,k2)}+D_{(k2,j)}]$;
$t_0$ = start_time;
dt = measurement_interval;
While (!finished) {
    For each κ = 1 to 3, do {
        While within time interval ($t_0$, $t_0$ +dt) {
            Use a network monitoring tool to measure average round-trip delay, $y_κ$, and delay-jitter, $γ_κ$, between the pair of routers, $\pi_κ$, in set Ω.
        }
    };
    Compute an estimate of link-level round-trip delay vector, x, using
    δ = [  0.5    0.5   −0.5 ] [$y_1$]
        [  0.5  −0.5    0.5 ] [$y_2$]
        [ −0.5    0.5    0.5 ] [$y_3$];
    Compute an estimate of link-level round-trip jitter vector, x, using
    Σ = [  0.25  0.25  0.25 ] [$γ_1^2$]
        [  0.25  0.25  0.25 ] [$γ_2^2$]
        [  0.25  0.25  0.25 ] [$γ_3^2$]
    where $\Sigma^T = [\sigma^2_{(k1,i)}, \sigma^2_{(k1,i+1)}, \sigma^2_{(k1,k2)}+\sigma^2_{(k2,j)}]$;
    $t_0 = t_0+dt$
}
END "Sub__2__1"

---

Figure 14:
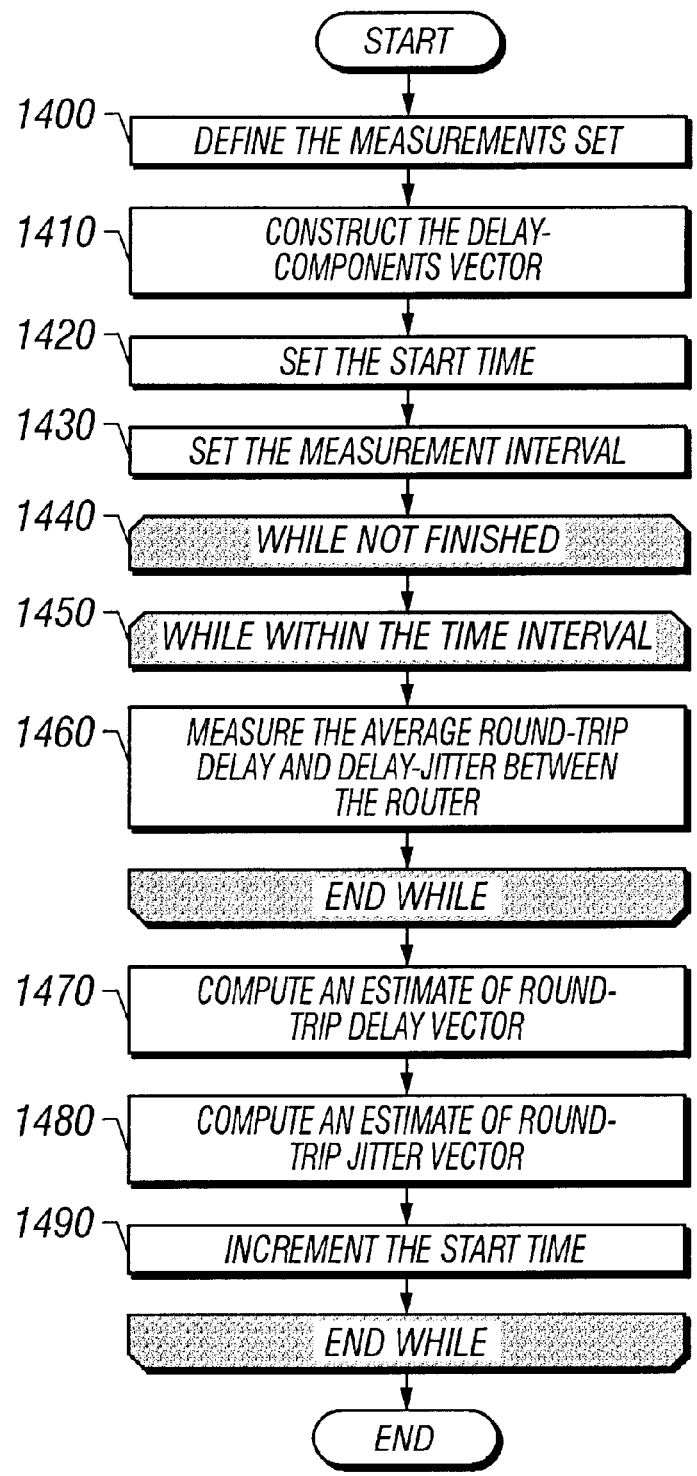
FIG. 14 is a flow diagram illustrating the operations performed in the process of apportioning delay components according to an embodiment of the present invention, when the size of both a first cluster and a second cluster are equal to one.

FIG. 14 is a flow diagram illustrating the operations performed in the process of apportioning delay components when the size of both the first cluster and the second cluster is equal to one. The process begins with the definition of the measurement set (step 1400) and the construction of the delay-components vector (step 1410). Next, the start time and measurement interval are set (steps 1420 and 1430). While more measurements are to be taken (step 1440), and while within the time interval (step 1450), the average round-trip delay and delay-jitter between the given router pair are measured (step 1460). Once the measurements within the time interval have been taken, an estimate of the round-trip delay, represented by the round-trip delay vector, is computed (step 1470). In similar fashion, an estimate of the round-trip delay-jitter is computed, resulting in a round-trip delay-jitter vector (step 1480). Once the afar mentioned computations have been made, the start time is incremented in order to take a crash set of measurements (step 1490).

The method for apportioning delay components, when the size of a first cluster (n1) and the size of a second cluster (n2) are equal to one, is now outlined using a formal representation. Thus, for the given pair of routers, $(R_{(k1,i)}, R_{(k2,j)})$, $n1=|C_{k1}|=1$, $n2=|C_{k2}|=1$. This process is referred to herein as Sub__1__1.

---

BEGIN "Sub__1__1"
$\Omega = \{\pi_1 = (R_{(k1,i)}, R_{(k2,j)})\}$;
Construct the delay-components vector, $x^T = [D_{(k1,i)}+c_{(k1,k2)}+D_{(k2,j)}]$;
$t_0$ = start_time;
dt = measurement_interval;
While (!finished) {
    While within time interval ($t_0$, $t_0$ +dt) {
        Use a network monitoring tool to measure average round-trip delay, $y_1$, and delay-jitter, $γ_1$, between the pair of routers, $\pi_1 = (R_{(k1,i)}, R_{(k2,j)})$;
    }
    Estimate link-level round-trip delay, $D_{(k1,i)}+c_{(k1,k2)}+D_{(k2,j)}$, as $y_1$;
    Estimate link-level round-trip jitter, $D_{(k1,i)}+c_{(k1,k2)}+D_{(k2,j)}$, as $γ_1$;
    $t_0 = t_0+dt$
}
END "Sub__1__1"

---

EXAMPLE SCENARIOS

Three examples are now considered to illustrate the processes described above.

Example 1

Consider the enterprise network depicted in FIGS. 10A and 10B. Let the pair of routers be $(R_{(1,1)}, R_{(4,1)})$. Because $n_1=3$ and $n_4=2$, sub__2__2 is applicable. As a result, $$\Omega=\{\pi_1, \pi_2, \pi_3, \pi_4, \pi_5\} \qquad (98a)$$

where $$\pi_1=(R_{(1,1)}, R_{(1,2)}) \qquad (98b)$$

$$\pi_2=(R_{(1,1)}, R_{(4,1)}) \qquad (98c)$$

$$\pi_3=(R_{(4,1)}, R_{(1,2)}) \qquad (98d)$$

$$\pi_4=(R_{(4,1)}, R_{(4,2)}) \qquad (98e)$$

$$\pi_5=(R_{(1,1)}, R_{(4,2)}) \qquad (98f)$$

Further, the delay-components vector, $x^T=[D_{(1,1)}, D_{(1,2)}, c_{(1,4)}, D_{(4,1)}, D_{(4,2)}]$. An estimate of link-level round-trip delay vector, x, may be computed using $$[\delta_{D(1,1)}] \quad [0.5 \quad 0.5 \quad -0.5 \quad 0 \quad 0] \; [y_1] \qquad (99a)$$

$$[\delta_{D(1,2)}] \quad [0.5 \quad -0.5 \quad 0.5 \quad 0 \quad 0] \; [y_2] \qquad (99b)$$

$$[\delta_{c(1,4)}] = [-0.5 \quad 0 \quad 0.5 \quad -0.5 \quad 0.5] \; [y_3] \qquad (99c)$$

$$[\delta_{D(4,1)}] \quad [0 \quad 0.5 \quad 0 \quad 0.5 \quad -0.5] \; [y_4] \qquad (99d)$$

$$[\delta_{D(4,2)}] \quad [0 \quad -0.5 \quad 0 \quad 0.5 \quad 0.5] \; [y_5] \qquad (99e)$$

An estimate of link-level round-trip jitter vector, x, may be computed using $$[\sigma^2_{D(1,1)}] \quad [0.25 \quad 0.25 \quad 0.25 \quad 0 \quad 0] \; [γ_1^2] \qquad (100a)$$

$$[\delta^2_{D(1,2)}] \quad [0.25 \quad 0.25 \quad 0.25 \quad 0 \quad 0] \; [γ_2^2] \qquad (100b)$$

$$[\delta^2_{c(1,4)}] = [0.25 \quad 0 \quad 0.25 \quad 0.25 \quad 0.25] \; [γ_3^2] \qquad (100c)$$

-continued $$[\delta^2_{D(4,1)}] \quad [0 \quad 0.25 \quad 0 \quad 0.25 \quad 0.25] \, [\gamma^2_4] \quad (100d)$$

$$[\delta^2_{D(4,2)}] \quad [0 \quad 0.25 \quad 0 \quad 0.25 \quad 0.25] \, [\gamma^2_5] \quad (100e)$$

Example 2

Letting the pair of routers be $(R_{(1,1)}, R_{(2,1)})$, and because $n_1=3$ and $n_2=1$, sub__2__1 is applicable. As a result, in a more compact form than that just given, $$\Omega=\{\pi_1=(R_{(1,1)}, R_{(2,1)}), \pi_2=(R_{(1,1)}, R_{(2,1)}), \pi_3=(R_{(2,1)}, R_{(1,2)})\} \quad (101)$$

The delay-components vector, $x^T=[D_{(1,1)}, D_{(1,2)}, c_{(1,4)}+D_{(2,1)}]$. An estimate of link-level round-trip delay vector, x, may be computed using $$[\delta_{D(1,1)}] \quad [0.5 \quad 0.5 \quad -0.5] \, [y_1] \quad (102a)$$

$$[\delta_{D(1,2)}] = [0.5 \quad -0.5 \quad 0.5] \, [y_2] \quad (102b)$$

$$[\delta_{c(1,4)+D(2,1)}] \quad [-0.5 \quad 0.5 \quad 0.5] \, [y_3] \quad (102c)$$

An estimate of link-level round-trip jitter vector, x, may be computed using $$[\delta^2_{D(1,1)}] \quad [0.25 \quad 0.25 \quad 0.25] \, [\gamma^2_1] \quad (103a)$$

$$[\delta^2_{D(1,2)}] = [0.25 \quad 0.25 \quad 0.25] \, [\gamma^2_2] \quad (103b)$$

$$[\delta^2_{c(1,2)+D(2,1)}] \quad [0.25 \quad 0.25 \quad 0.25] \, [\gamma^2_3] \quad (103c)$$

It will be noted that it is not possible to apportion the delay or jitter between $C_{(1,2)}$ and $D_{(2,1)}$ separately since the number of routers in the second cluster is only 1.

Example 3

Let the pair of routers be $(R_{(3,1)}, R_{(2,1)})$. Because $n_3=1$ and $n_2=1$, sub__1__1 is applicable. Because $\Omega=\{\pi_1=(R_{(3,1)}, R_{(2,1)})\}$, no estimate of individual delay components is available.

V. Estimating Delay and Jitter in an Enterprise Network Coupled to a Backbone Having an Unknown Topology Using a Large Number of Router Pairs A method according to one embodiment of the present invention for computing the measurements set, $\Omega$, for a given requirements set, $\Phi$, has been described. If the size of the set $\Phi$ is P, then the method involves finding a maximal set of independent vectors from a corresponding set of P row vectors. Such a computation may be unreasonably difficult if P is large (e.g., 10000 or more). Therefore, a method according to an embodiment of the present invention is now described that allows the measurements set to be directly obtained. Measurements of delay and jitter between pairs of routers in this set may then be used to estimate delay and jitter between any set of pairs of routers and specified by $\Phi$.

Figure 15:
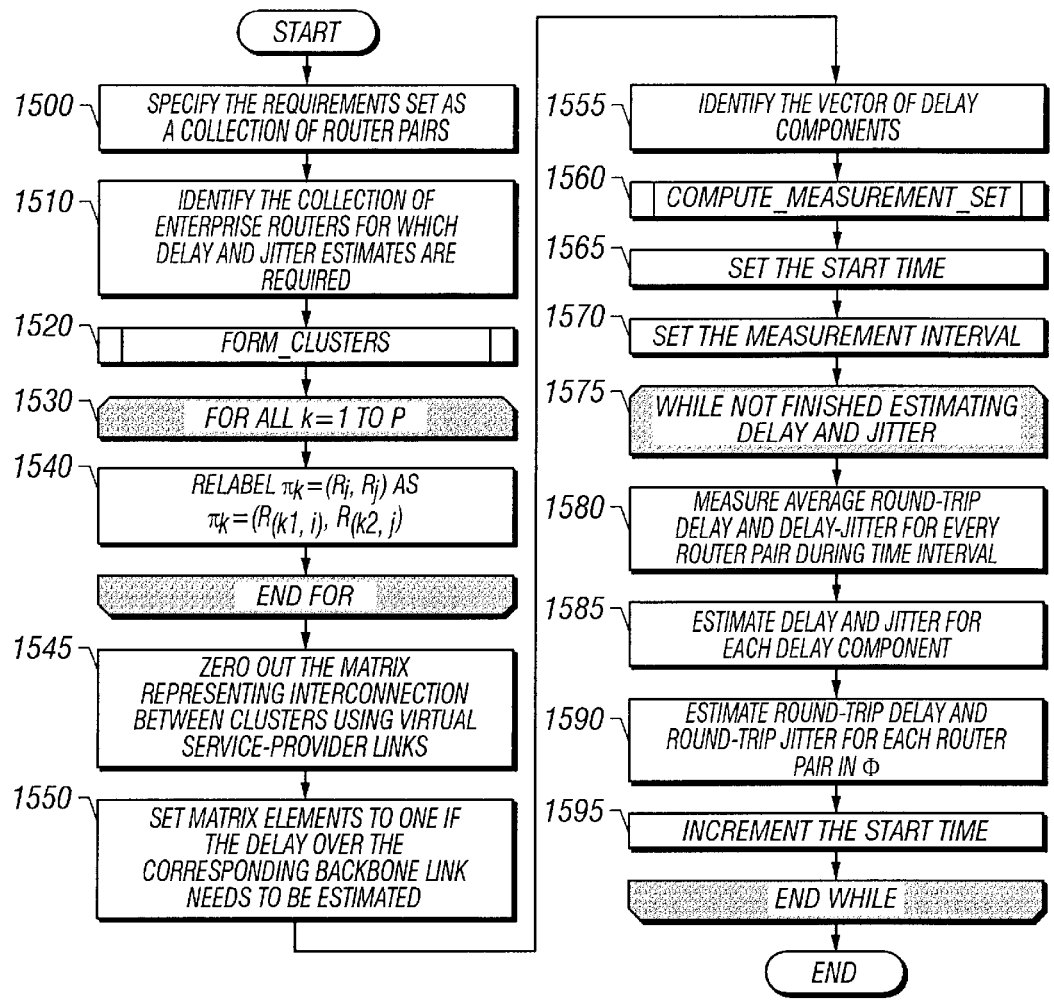
FIG. 15 is a flow diagram illustrating the operations performed in computing the measurements set for a given requirements set according to an embodiment of the present invention, when a maximal set of independent vectors from a corresponding set of row vectors is to be found.

FIG. 15 is a flow diagram illustrating the operations performed in estimating delay/jitter between router pairs in a specified requirements set based on delay/jitter measurements between pairs of routers in a measurements set. This measurement set is directly obtained once the collection of routers that are covered by the requirements set is determined, and a model of the backbone network is computed. The process begins with the specification of the requirement set as a collection of router pairs (step 1500). Next, the collection of enterprise routers for which delay and jitter estimates are required is identified (step 1510). The process of "form_clusters" (e.g., as previously described) is then used to:
1. determine a model for the enterprise network as one consisting of clusters of routers (step 1520), and to
2. re-label the enterprise routers, as well as the requirements set (steps 1530 and 1540).

Since a value w(k1, k2)=1 indicates that a delay over the corresponding virtual link of the backbone network is to be estimated, the matrix w is zeroed out because no such determinations have as yet been recorded in the matrix w (step 1545). Next, elements of the matrix signifying interconnection between clusters are set to one if the delay experienced over the corresponding backbone link needs to be estimated (step 1550). The vector containing delay components is then identified (step 1555).

At this juncture, the process that computes the measurements sets is called, in order to identify the measurements set and to create a record of equations that allows the estimation of delay and jitter (1560). Next, the start time and measurement interval are set (steps 1565 and 1570). While further estimations of delay and jitter remain to be made (step 1575), the following steps are carried out. First, the average round-trip delay/jitter for every router pair is measured during the time interval (step 1580). From these measurements, delay and jitter for each delay component is estimated (step 1585). Also estimated is the round-trip and round-jitter for each router pair in $\Phi$ (step 1590). If further measurements are desired, the start time is incremented and the process repeated (step 1595).

The preceding method for computing the measurements set for a given requirements set when a maximal set of independent vectors from a corresponding set of row vectors is to be found is now outlined using a formal representation.

```
BEGIN
/* Specify the requirements set as a collection of router pairs            */
/* Note that the following router pairs may not be, for example, (R(k1,i), ρk2) */
/* Further, without loss of generality, note that it can be assumed that i < j */
/* (This is valid because round-trip delay and jitter are examined,        */
/* and so πk = (Ri, Rj)} = (Rj, Ri) can be assumed)                        */
Φ = {πκ = (Ri, Rj), κ = 1, 2, . . . , P};
/* From the given requirements set, Φ, identify */
/* the collection of enterprise routers, ℜ, for which */
/* delay and jitter estimates are required */
ℜ = ∪ Rj;   /* such that for some Rj, (Ri, Rj) ∈ Φ or (Rj, Ri) ∈ Φ */
/* Given ℜ, use "form_clusters" to:                                        */
/* (1) Determine a model for the enterprise network as one having         */
/*     clusters of routers, Ck = {R(k,i), i = 1, 2, . . . , nk}, k = 1, 2, . . . , m, */
```

-continued

```
/*      where n_k = | C_k |                                                     */
/* (2) Re-label the requirements set, Φ = {π_κ = (R_(k1,i), R_(k2,j))}           */
form_clusters ( );
/* Re-order elements of Φ */
For all κ = 1 to P do {
    Relabel π_κ = (R_i, R_j) as π_κ = (R_(k1,i), R(k2,j))
}
/* Identify interconnection between clusters using virtual service-provider links. This
is specified as a m × m matrix, ω(k1, k2). Note that ω(k1,k2) = 1 indicates that delay
over link λ_(k1,k2) is required to be estimated, by definition. */
/* Zero out the matrix ω */
For all k1 = 1, 2, . . . , m do {
    For all k2 = 1, 2, . . . m do{
        ω(k1,k2) = 0
    }
}
/* Set matrix elements to one if the delay over the corresponding backbone link  */
/* needs to be estimated                                                         */
For all {π_κ = (R_(k1,i), R_(k2,j))} ∈ Φ do {
    ω(k1,k2) = 1
}
/* Identify the vector of delay components */
{D_(k,i), k = 1, 2, . . . , m, i = 1, 2, . . . n_k} ∪ {c_(k1,k2), k1, k2 = 1, 2, . . . , m, ω(k1,k2) = 1}
/* Call compute_measurement_set to:                                              */
/*   Identify the measurements set, Ω = {π_κ = (R_(k1,i), R_(k2,j), κ = 1, 2, . . . , Q} */
/*   Create record of eqns allowing est. of delay/jitter of D(k1,i) or c(k1,k2): */
/*      est_delay( ) = function(y_κ, . . . , est_delay(D_(k1,i)), . . .)         */
/*      est_jitter( ) = function(γ_κ, . . . , est_jitter(D_(k1,i)), . . .)       */
compute_measurement_set( );
t_0 = start_time;
dt = measurement_interval;
While (!finished) {
    Measure the average round-trip delay, y_κ, and delay-jitter, γ_κ, over time
    interval [t_0, t_0+dt] for every pair of routers, π_κ = (R_(k1,i), R_(k2,j)) ∈ Ω, using a
    network monitoring tool;
    /* Estimate delay and jitter for each delay component */
    For all k = 1, 2, . . . , m do {
        For all i = 1, 2, . . . , n_k do {
            evaluate est_delay(D_(k,i));
            evaluate est_jitter(D_(k,i))
        }
    }
    For all k1 = 1, 2, . . . , m do {
        For all k2 = k1+1, k2+2, . . . , m do {
            if ω(k1,k2) = 1 then {
                evaluate est_delay(c_(k1,k2));
                evaluate est_jitter(c_(k1,k2))
            }
        }
    }
/* For each router pair in Φ, estimate round-trip delay, Δ_κ, and round-trip jitter, σ_κ */
    For each π_κ = (R_(k1,i), R_(k2,j)) ∈ Φ do {
        If (((R_(k1,i), R_(k2,j)) = π'_k1) ∈ Ω) then {
            Δ_κ = y_κ1;
            σ_κ = γ_k1
        }
        else {
            if k1 = k2 then {
                Δ_κ = est_delay(D_(k1,i)) + est_delay(D_(k2,j));
                σ_κ = √(est_jitter(D_(k1,i))^2 + est_jitter(D_(k2,j))^2)
            }
            else {
                Δ_κ =   est_delay(D_(k1,i)) +
                        est_delay(c_(k1,k2)) +
                        est_Delay(D_(k2,j));
                σ_κ =   √(  est_jitter(D_(k1,i))^2 +
                            est_jitter(c_(k1,k2))^2 +
                            est_jitter(D_(k2,j))^2)
            }
        };
    }
    t_0 = t_0+dt
}
END
```

Figure 16:
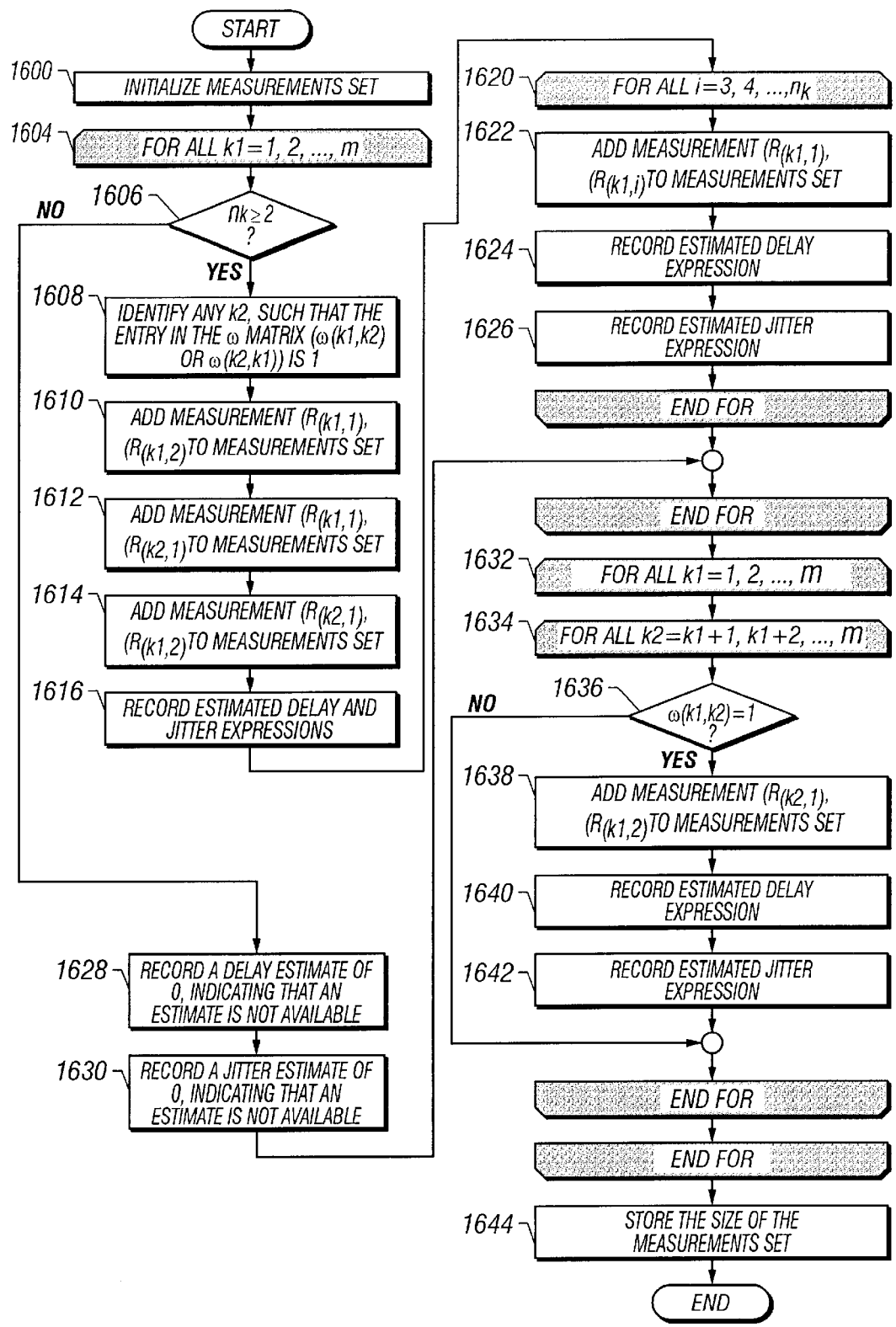
FIG. 16 is a flow diagram illustrating the operations performed in a process of computing a measurements set according to an embodiment of the present invention.

FIG. 16 is a flow diagram illustrating the operations performed in computing the measurements set needed in the preceding method. It is assumed that the given network has been described in terms of clusters and an interconnection matrix, using a method of clustering such as that discussed previously. The process begins with the initialization of the measurements set (step 1600). For all clusters (defined by k1=1, . . . , m) (step 1604), the following steps are performed.

First, the size of the given cluster is examined (step 1606). If the given cluster has two or more enterprise routers, a second cluster (identified by k2) is identified, such that delay/jitter over the backbone link (virtual link) between the two clusters (or, alternatively, backbone routers) must be obtained (i.e., such that $\omega(k1,k2)=1$ or $\omega(k2,k1)=1$) (step 1608). Having identified this second cluster, the procedure identifies three specific routers and adds the corresponding pairs of routers to the measurements set (steps 1610, 1612 and 1614). Expressions representing estimated delay over links connecting enterprise routers or over the virtual backbone links are then recorded (step 1616).

The rest of the enterprise routers in the given cluster are then analyzed (step 1620). First, a router pair corresponding every third, fourth, . . . , router in the cluster current is added to the measurements set (step 1622). Next, expressions representing estimated delay and jitter between associated backbone and enterprise routers is recorded (steps 1624 and 1626). This completes the scenario in which the given cluster's size is greater than or equal to two.

If the given cluster's size is equal to one (step 1606), the following actions are performed. A delay estimate of zero is recorded, indicating that such an estimate is not available (step 1628). In similar fashion, a jitter estimate of zero is recorded, likewise indicating that such an estimate is not available (step 1630). This completes this portion of the analysis.

Once the addition of router pairs to the measurements set and the recording of delay and jitter expressions are completed, the inter-cluster router pairs (and associated delay and jitter) are determined. For pairs of clusters consisting of a first cluster (one of all clusters) and a second cluster (one of all remaining clusters) the following actions are performed (steps 1632 and 1634). If delay between backbone routers corresponding to the two clusters must be estimated (step 1636), then a pair of enterprise routers representing the two clusters is added to the measurements set (step 1638). Expressions representing the estimated delay (step 1640) and estimated jitter (step 1642) associated with the given pair of backbone routers are recorded. Finally, the size of the measurements set is stored (step 1644). This completes computation of the measurements set.

The preceding method for computing the measurements set is now outlined using a formal representation. For a given network described in terms of clusters:

$$C_k = \{R_{(k,i)}, i=1, 2, \ldots, n_k\}, k=1, 2, \ldots, m, \text{ where } n_k=|C_k| \quad (104)$$

and an interconnection matrix:

$$\omega(k1,k2), k1, k2=1, 2, \ldots, m \quad (105)$$

the measurements set can be computed as follows:

```
BEGIN "compute_measurements_set"
    Ω = { }                                    /* Ω = measurements set */
    κ = 0                                      /* κ identifies the measurements, y_κ2 */
    For all k1 = 1, 2, . . . , m do {
        If n_k1 ≥ 2 then {
            /* It is assumed that such a k2 exists */
            identify any k2, such that ω(k1,k2) = 1 or ω(k2,k1) = 1;
            κ1 = κ +1;
            add_to_set(π_κ1 = (R_(k1,1), R_(k1,2)), Ω);
            κ2 = κ +2;
            add_to_set(π_κ2 = (R_(k1,1), R_(k2,1)), Ω);
            κ3 = κ +3;
            add_to_set(π_κ3 = (R_(k2,1), R_(k1,2)), Ω);
            κ = κ +3;
            /* One method to record an expression is to use a binary evaluation tree   */
            rec_eqn[est_delay(D_(k1,1)) = 0.5 y_κ1 + 0.5 y_κ2 − 0.5 y_κ3];
            rec_eqn[est_delay(D_(k1,2)) = 0.5 y_κ1 − 0.5 y_κ2 + 0.5 y_κ3];
            /* An estimate of jitter is similarly derived                              */
            rec_eqn[est_jitter(D_(k1,1)) = √(0.25 γ²_κ1 + 0.25 γ²_κ2 + 0.25 γ²_κ3)];
            rec_eqn[est_jitter(D_(k1,2)) = √(0.25 γ²_κ1 + 0.25 γ²_κ2 + 0.25 γ²_κ3)];
            For all i = 3, 4, . . . , n_k1 do {
                κ = κ +1;
                add_to_set(π_κ = (R_(k1,1), R_(k1,i)), Ω);
                rec_eqn[est_delay(D_(k1,i)) = y_κ − est_delay(D_(k1,1))];
                rec_eqn[est_jitter(D_(k1,i)) = √(y²_κ + est_jitter(D_(k1,1))²);
            }
        }
        else {
            /* A delay estimate of 0 signifies that estimate is not available */
            rec_eqn[est_delay(D_(k1,1)) = 0];
            rec_eqn[est_jitter(D_(k1,1)) = 0];
        }
    }
    For all k1 = 1, 2, . . . , m do {
        For all k2 = k1+1, k1+2, . . . , m do {
            if ω(k1,k2) = 1 then {
                κ = κ +1;
                add_to_set(π_κ = (R_(k1,1), R_(k2,1)), Ω);
```

```
        rec_eqn[est_delay(c(k1,k2)) = y_k - est_delay(D(k1,1)) - est_delay(D(k2,1))];
        rec_eqn[est_jitter(c(k1,k2)) = √(γ²_k + est_jitter(D(k1,1))² + est_jitter(D(k2,1))²)]
      }
    }
  }
Q = k            /* Store the size of the measurements set */
END "compute_measurements_set"
```

Using the foregoing method, an estimate of all (or nearly all) delay components is available, depending on the topologies involved. Thus, it is possible to apportion end-to-end delay among different links that constitute the given path. It will be noted that the measurements set, $\Omega$, may or may not be a sub-set of the requirements set, $\Phi$. The total number of measurements required is at most:

$$(n_1-1+n_2-1+ \ldots n_m-1)+2m+m(m-1)/2 \quad (105)$$

This bound is achieved when every cluster has at least 2 routers, and delay/jitter estimates are required between every pair of clusters. Moreover, the above method suggests that delay and jitter measurements between $\pi_\kappa=(R_{(k1,1)}, R_{(k2,1)})$ may be made more than once. In fact, this may be rectified during implementation by checking whether a delay/jitter measurement between $\pi_\kappa=(R_{(k1,1)}, R_{(k2,1)})$ is already available. In such a case, the pre-existing measurement is used.

Exemplary Enterprise Network

As an example, the enterprise network of FIG. 10B may again be considered, with the requirements set:

$$\Phi = \{(R_{(1,1)}, R_{(2,1)}), (R_{(1,2)}, R_{(2,1)}), (R_{(1,3)}, R_{(2,1)}),$$
$$(R_{(1,1)}, R_{(3,1)}), (R_{(1,2)}, R_{(3,1)}), (R_{(1,3)}, R_{(3,1)}),$$
$$(R_{(1,1)}, R_{(4,1)}), (R_{(1,2)}, R_{(4,1)}), (R_{(1,3)}, R_{(4,1)}),$$
$$(R_{(1,1)}, R_{(4,2)}), (R_{(1,2)}, R_{(4,2)}), (R_{(1,3)}, R_{(4,2)})\}$$

The collection of routers is $\mathfrak{R}=\{R_{(1,1)}, R_{(1,2)}, R_{(1,3)}, R_{(2,1)}, R_{(3,1)}, R_{(4,1)}, R_{(4,2)}\}$. Further, matrix, $\omega$ is

|       | K2=1 | K2=2 | K2=3 | K2=4 |
|-------|------|------|------|------|
| K1=1  |      | 1    | 1    | 1    |
| K1=2  | —    |      |      |      |
| K1=3  | —    |      |      |      |
| K1=4  | —    |      |      |      |

The delay-component vector is given as $$x^T = [D_{(1,1)}, D_{(1,2)}, D_{(1,3)}, D_{(2,1)}, D_{(3,1)}, D_{(4,1)}, D_{(4,2)}, c_{(1,2)}, c_{(1,3)}, c_{(1,4)}]$$

Using the subroutine "compute_measurements_set," the measurements set is obtained as follows:

(i) $\Omega=\{\}$
(ii) Let k1=1: because $n_1=3$, $\Omega \leftarrow \Omega \cup \{(R_{(1,1)}, R_{(1,2)}), (R_{(1,1)}, R_{(2,1)}), (R_{(2,1)}, R_{(1,2)}), (R_{(1,1)}, R_{(1,3)})\}$
(iii) Let k1=2: because $n_2=1$, there is no change in $\Omega$.
(iv) Let k1=3: because $n_3=1$, there is no change in $\Omega$.
(v) Let k1=4, because $n_4=2$, $\Omega=\Omega \cup \{(R_{(4,1)}, R_{(4,2)}), (R_{(4,1)}, R_{(1,1)}), (R_{(1,1)}, R_{(4,2)})\}$
(vi) Let k1=1, k2=2, because $\omega(k1,k2)=1$, $\Omega=\Omega \cup \{(R_{(1,1)}, R_{(2,1)})\}$
(vii) Let k1=1, k2=3, because $\omega(k1,k2)=1$, $\Omega=\Omega \cup \{(R_{(1,1)}, R_{(3,1)})\}$
(viii) Let k1=1, k2=4, because $\omega(k1,k2)=1$, $\Omega=\Omega \cup \{(R_{(1,1)}, R_{(4,1)})\}$.

As a result, $$\Omega = \{(R_{(1,1)}, R_{(1,2)}), (R_{(1,1)}, R_{(2,1)}), (R_{(2,1)}, R_{(1,2)}), (R_{(1,1)}, R_{(1,3)}),$$
$$(R_{(4,1)}, R_{(4,2)}), (R_{(4,1)}, R_{(1,1)}), (R_{(1,1)}, R_{(4,2)}), (R_{(1,1)}, R_{(3,1)})\}$$

and the estimates of various delay components may be obtained from the corresponding measurements, $y_i$, i=1, 2, ..., 8, as follows:

est_delay($D_{(1,1)}$)=0.5 $y_1$+0.5 $y_2$−0.5 $y_3$ est_delay($D_{(1,2)}$)=0.5 $y_1$−0.5 $y_2$+0.5 $y_3$ est_delay($D_{(1,3)}$)=$y_4$−est_delay($D_{(1,1)}$)

est_delay($D_{(2,1)}$)=0 /* (no estimate is available) */ est_delay($D_{(3,1)}$)=0 /* (no estimate is available) */ est_delay($D_{(4,1)}$)=0.5 $y_5$+0.5 $y_6$−0.5 $y_7$ est_delay($D_{(4,2)}$)=0.5 $y_1$−0.5 $y_6$+0.5 $y_7$ est_delay($c_{(1,2)}$)=$y_2$−est_delay($D_{(1,1)}$)−est_delay($D_{(2,1)}$)]

est_delay($c_{(1,3)}$)=$y_8$−est_delay($D_{(1,1)}$)−est_delay($D_{(3,1)}$)]

est_delay($c_{(1,4)}$)=$y_6$−est_delay($D_{(1,1)}$)−est_delay($D_{(4,1)}$)]

These estimates may now be combined to estimate the delay between any pair of enterprise routers. For instance, the delay between $R_{(1,3)}$ and $R_{(4,2)}$ may be estimated to be est_delay($D_{(1,3)}$)+est_delay($c_{(1,4)}$)+est_delay($D_{(4,2)}$)

The equations for estimating jitter are similar.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
    identifying enterprise network element pairs, wherein
        said enterprise network element pairs are pairs of ones of a plurality of enterprise network elements, and
        each one of said enterprise network elements is coupled to at least one other of said enterprise network elements;
    identifying ones of a plurality of backbone network elements as ingress/egress backbone network elements, wherein
        each one of said backbone network elements is coupled to at least one other of said backbone network elements, and
        each one of said ingress/egress backbone network elements is coupled to at least one of said ones of said enterprise network elements;
    for each of said enterprise network element pairs, identifying a path between a first and a second enterprise network element of said each of said enterprise network element pairs;
    for each one of said paths that includes a pair of said ingress/egress backbone network elements, identifying a virtual path between said pair of said ingress/egress backbone network elements; and
    identifying a plurality of independent paths of said paths and a plurality of non-independent paths of said paths, wherein
        each of said non-independent paths can be defined as a combination of ones of said independent paths, and
        at least one of said independent paths includes at least one of said virtual paths.

2. The method of claim 1, wherein said identifying said ones of said backbone network elements as said ingress/egress backbone network elements comprises:
    forming clusters, wherein each of said clusters includes at least one of said ingress/egress backbone network elements.

3. The method of claim 1, wherein said combination is a linear combination.

4. The method of claim 1, wherein said each of said enterprise network elements is coupled to at least one other of said enterprise network elements by one of a plurality of enterprise network links and said method further comprises:
    for said each of said enterprise network element pairs, defining a delay between a first enterprise network element and a second enterprise network element of said each of said enterprise network element pairs as comprising a delay associated with each enterprise network link and each virtual path in said path.

5. The method of claim 1, wherein said identifying said ones of said backbone network elements as said ingress/egress backbone network elements comprises:
    aggregating at least one of said enterprise network elements and at least one of said backbone network elements into a cluster.

6. The method of claim 5, further comprising
    identifying each of said ingress/egress backbone network elements using a domain name of said each of said ingress/egress backbone network elements.

7. The method of claim 6, wherein said identifying said ones of said backbone network elements as said ingress/egress backbone network elements further comprises:
    for each of said enterprise network elements coupled to at least one of said ingress/egress backbone network elements,
        for each of said at least one of said ingress/egress backbone network elements,
            determining a domain name of said each of said at least one of said ingress/egress backbone network elements,
            including said each of said at least one of said ingress/egress backbone network elements in an existing cluster in a set of clusters, wherein each cluster in said set of clusters is configured to be identified by a domain name, if said domain name of said each of said at least one of said ingress/egress backbone network elements is equivalent to a domain name corresponding to said existing cluster, and
            creating a new cluster in said set of clusters and including said each of said at least one of said ingress/egress backbone network elements in said new cluster, otherwise.

8. The method of claim 6, wherein said identifying said ones of said backbone network elements as ingress/egress backbone network elements further comprises:
    including said each of said enterprise network elements coupled to said at least one of said ingress/egress backbone network elements, if said domain name of said each of said at least one of said ingress/egress backbone network elements is equivalent to said domain name corresponding to said existing cluster, and
    including said each of said enterprise network elements coupled to at least one of said ingress/egress backbone network elements in said new cluster, otherwise.

9. The method of claim 1, further comprising:
    measuring a measured network performance metric between a first enterprise network element and a second enterprise network element of one of said at least one of said independent paths; and
    computing a computed network performance metric between a first network element and a second network element of at least one of said non-independent enterprise network element pairs using said measured network performance metric.

10. The method of claim 9, wherein each one of said independent paths has end-points defined by a first and a second enterprise network element that form an independent enterprise network element pair.

11. The method of claim 9, wherein each of said virtual paths is represented by a virtual link.

12. The method of claim 9, wherein
    said identifying said enterprise network element pairs comprises
        identifying pairs of said enterprise network elements as being in a first set of enterprise network element pairs, and
    said identifying said independent paths and said non-independent paths comprises
        generating a first matrix from said first set of enterprise network element pairs, wherein
            each row in said first matrix corresponds to a corresponding enterprise network element pair in said first set of enterprise network element pairs,
            said first matrix comprises independent rows and non-independent rows,
            each of said independent rows corresponds to one of said independent paths, and
            each of said non-independent rows corresponds to one of said non-independent paths, and forming a second set of enterprise network element pairs, wherein
said second set of enterprise network element pairs contains independent enterprise network element pairs in said first set of enterprise network element pairs, and
each one of said independent pairs of enterprise network element corresponds to a one of said independent rows of said first matrix.

13. The method of claim 12, wherein said measuring comprises:
measuring said measured network performance metric between a first enterprise network element and a second enterprise network element of each enterprise network element pair in said second set of enterprise network element pairs.

14. The method of claim 13, wherein said computing comprises:
computing said computed network performance metric between a first enterprise network element and a second enterprise network element of a remaining enterprise network element pair in said first set of enterprise network element pairs using at least one of said measured network performance metrics, wherein said remaining enterprise network element pair corresponds to a non-independent row of said first matrix.

15. The method of claim 14, wherein said computing said computed network performance metric between said first enterprise network element and said second enterprise network element of said remaining enterprise network element pair further comprises:
forming a second matrix, wherein
each row of said second matrix corresponds to a corresponding one of said non-independent rows of said first matrix, and
said each row of said second matrix is such that said corresponding one of said non-independent rows of said first matrix can be expressed in terms of said independent rows using said each row of said second matrix;
organizing said measured network performance metrics into a vector; and
computing said computed network performance metric between said first enterprise network element and said second enterprise network element of said remaining enterprise network element pair by multiplying said vector by a row of said second matrix corresponding to said remaining enterprise network element pair.

16. The method of claim 15, herein said second matrix is a matrix A.

17. The method of claim 14, wherein said computing said computed network performance metric between said first enterprise network element and said second enterprise network element of said remaining enterprise network element pair comprises:
creating a vector equivalent to said non-independent row of said first matrix by combining a plurality of said independent rows of said first matrix; and
computing said computed network performance metric by combining a measured network performance metric of each enterprise network element pair of said second set of enterprise network element pairs corresponding to one of said plurality of said independent rows of said first matrix.

18. The method of claim 17, wherein each one of said enterprise network elements is a router.

19. The method of claim 12, wherein said first set of enterprise network element pairs is a requirements set.

20. The method of claim 19, wherein said second set of enterprise network element pairs is a measurements set.

21. The method of claim 20, wherein each one of said enterprise network elements is a router.

22. The method of claim 12, wherein said first matrix is a matrix F.

23. The method of claim 12, further comprising:
computing a number, wherein said number is equal to a rank of said first matrix;
determining if a first said number of rows of said first matrix are independent; and
if said first said number of said rows of said first matrix are not independent, re-arranging said rows of said first matrix such that said first said number of said rows of said first matrix are independent.

24. The method of claim 23, further comprising:
identifying a maximal set of independent rows of said first matrix based on said number.

25. The method of claim 23, wherein said rearranging further comprises:
re-arranging said pairs of said enterprise network elements in said first set of enterprise network element pairs such that said correspondence between each row of said first matrix and said corresponding enterprise network element pair in said first set of enterprise network element pairs is maintained.

26. The method of claim 25, wherein said forming said second set of enterprise network element pairs comprises:
copying a first said number of pairs of said enterprise network elements in said first set of enterprise network element pairs into said second set of enterprise network element pairs.

27. The method of claim 1, wherein said backbone network elements have an architecture similar to said enterprise network elements.

28. A computer system comprising:
a processor;
a network interface, coupled to said processor and to an enterprise network, wherein said network comprises a plurality of enterprise network elements and each one of said enterprise network elements is coupled to at least one other of said enterprise network elements;
computer readable medium coupled to said processor; and
computer code, encoded in said computer readable medium, configured to cause said processor to:
identify enterprise network element pairs, wherein
said enterprise network element pairs are pairs of ones of said plurality of enterprise network elements;
identify ones of a plurality of backbone network elements as ingress/egress backbone network elements, wherein
each one of said backbone network elements is coupled to at least one other of said backbone network elements, and
each one of said ingress/egress backbone network elements is coupled to at least one of-said ones of said enterprise network elements;
for each of said enterprise network element pairs, identify a path between a first and a second enterprise network element of said each of said enterprise network element pairs;
for each one of said paths that includes a pair of said ingress/egress backbone network elements, identify a virtual path between said pair of said ingress/egress backbone network elements; and identify a plurality of independent paths of said paths and a plurality of non-independent paths of said paths, wherein each of said non-independent paths can be defined as a combination of ones of said independent paths, and at least one of said independent paths includes at least one of said virtual paths.

29. The computer system of claim 28, wherein said computer code configured to cause said processor to identify said ones of said backbone network elements as said ingress/egress backbone network elements is further configured to cause said processor to:

form clusters, wherein each of said clusters includes at least one of said ingress/egress backbone network elements.

30. The computer system of claim 28, wherein said combination is a linear combination.

31. The computer system of claim 28, wherein said each of said enterprise network elements is coupled to said at least one other of said enterprise network elements by one of a plurality of enterprise network links and said computer code is further configured to cause said processor to:

for said each of said enterprise network element pairs, define a delay between a first enterprise network element and a second enterprise network element of said each of said enterprise network element pairs as comprising a delay associated with each enterprise network link and each virtual path in said path.

32. The computer system of claim 28, wherein said computer code configured to cause said processor to identify said ones of said backbone network elements as said ingress/egress backbone network elements is further configured to cause said processor to:

aggregate at least one of said enterprise network elements and at least one of said backbone network elements into a cluster.

33. The computer system of claim 32, wherein said computer code configured to cause said processor to identify said ones of said backbone network elements as said ingress/egress backbone network elements is still further configured to cause said processor to:

identify each of said ingress/egress backbone network elements using a domain name of said each of said ingress/egress backbone network elements.

34. The computer system of claim 33, wherein said computer code configured to cause said processor to identify said ones of said backbone network elements as said ingress/egress backbone network elements is still further configured to cause said processor to:

for each of said enterprise network elements coupled to at least one of said ingress/egress backbone network elements, for each of said at least one of said ingress/egress backbone network elements, determine a domain name of said each of said at least one of said ingress/egress backbone network elements, include said each of said at least one of said ingress/egress backbone network elements in an existing cluster in a set of clusters, wherein each cluster in said set of clusters is configured to be identified by a domain name, if said domain name of said each of said at least one of said ingress/egress backbone network elements is equivalent to a domain name corresponding to said existing cluster, and create a new cluster in said set of clusters and including said each of said at least one of said ingress/egress backbone network elements in said new cluster, otherwise.

35. The computer system of claim 33, wherein said computer code configured to cause said processor to identify said ones of said backbone network elements as said ingress/egress backbone network elements is still further configured to cause said processor to:

include said each of said enterprise network elements coupled to said at least one of said ingress/egress backbone network elements, if said domain name of said each of said at least one of said ingress/egress backbone network elements is equivalent to said domain name corresponding to said existing cluster, and include said each of said enterprise network elements coupled to at least one of said ingress/egress backbone network elements in said new cluster, otherwise.

36. The computer system of claim 28, wherein said computer code is further configured to cause said processor to:

measure a measured network performance metric between a first enterprise network element and a second enterprise network element of one of said at least one of said independent paths; and compute a computed network performance metric between a first network element and a second network element of at least one of said non-independent enterprise network element pairs using said measured network performance metric.

37. The computer system of claim 36, wherein each one of said independent paths has end-points defined by a first and a second enterprise network element that form an independent enterprise network element pair.

38. The computer system of claim 36, wherein each of said virtual paths is represented by a virtual link.

39. The computer system of claim 36, wherein said computer code configured to cause said processor to identify said enterprise network element pairs is configured to cause said processor to identify pairs of said enterprise network elements as being in a first set of enterprise network element pairs, and said computer code configured to cause said processor to identify said independent paths and said non-independent paths is configured to cause said processor to generate a first matrix from said first set of enterprise network element pairs, wherein each row in said first matrix corresponds to a corresponding enterprise network element pair in said first set of enterprise network element pairs, said first matrix comprises independent rows and non-independent rows, each of said independent rows corresponds to one of said independent paths, and each of said non-independent rows corresponds to one of said non-independent paths, and form a second set of enterprise network element pairs, wherein said second set of enterprise network element pairs contains independent enterprise network element pairs in said first set of enterprise network element pairs, and each one of said independent pairs of enterprise network element corresponds to a one of said independent rows of said first matrix.

40. The computer system of claim 39, wherein said computer code configured to cause said processor to measure said measured network performance metric is configured to cause said processor to:
measures aid measured network performance metric between a first enterprise network element and a second enterprise network element of each enterprise network element pair in said second set of enterprise network element pairs.

41. The computer system of claim 40, wherein said computer code configured to cause said processor to compute said computed network performance metric is configured to cause said processor to:
compute said computed network performance metric between a first enterprise network element and a second enterprise network element of a remaining enterprise network element pair in said first set of enterprise network element pairs using at least one of said measured network performance metrics, wherein said remaining enterprise network element pair corresponds to a non-independent row of said first matrix.

42. The computer system of claim 41, wherein said computer code configured to cause said processor to compute said computed network performance metric between a first enterprise network element and a second enterprise network element of a remaining enterprise network element pair in said first set of enterprise network element pairs is further configured to cause said processor to:
form a second matrix, wherein
each row of said second matrix corresponds to a corresponding one of said non-independent rows of said first matrix, and
said each row of said second matrix is such that said corresponding one of said non-independent rows of said first matrix can be expressed in terms of said independent rows using said each row of said second matrix;
organize said measured network performance metrics into a vector; and
compute said computed network performance metric between said first enterprise network element and said second enterprise network element of said remaining enterprise network element pair by multiplying said vector by a row of said second matrix corresponding to said remaining enterprise network element pair.

43. The computer system of claim 42, wherein said second matrix is a matrix A.

44. The computer system of claim 41, wherein said computer code configured to cause said processor to compute said computed network performance metric between said first enterprise network element and said second enterprise network element of said remaining enterprise network element pair is configured to cause said processor to:
create a vector equivalent to said non-independent row of said first matrix by combining a plurality of said independent rows of said first matrix; and
compute said computed network performance metric by combining a measured network performance metric of each enterprise network element pair of said second set of enterprise network element pairs corresponding to one of said plurality of said independent rows of said first matrix.

45. The computer system of claim 44, wherein each one of said enterprise network elements is a router.

46. The computer system of claim 39, wherein said first set of enterprise network element pairs is a requirements set.

47. The computer system of claim 46, wherein said second set of enterprise network element pairs is a measurements set.

48. The computer system of claim 47, wherein each one of said enterprise network elements is a router.

49. The computer system of claim 39, wherein said first matrix is a matrix F.

50. The computer system of claim 39, wherein said computer code is further configured to cause said processor to:
compute a number, wherein said number is equal to a rank of said first matrix;
determine if a first said number of rows of said first matrix are independent; and
if said first said number of said rows of said first matrix are not independent, re-arrange said rows of said first matrix such that said first said number of said rows of said first matrix are independent.

51. The computer system of claim 50, wherein said computer code is further configured to cause said processor to:
identify a maximal set of independent rows of said first matrix based on said number.

52. The computer system of claim 50, wherein said computer code configured to cause said processor to re-arrange said rows of said first matrix is configured to cause said processor to:
re-arrange said pairs of said enterprise network elements in said first set of enterprise network element pairs such that said correspondence between each row of said first matrix and said corresponding enterprise network element pair in said first set of enterprise network element pairs is maintained.

53. The computer system of claim 52, wherein said computer code configured to cause said processor to form said second set of enterprise network element pairs is configured to cause said processor to:
copy a first said number of pairs of said enterprise network elements in said first set of enterprise network element pairs into said second set of enterprise network element pairs.

54. The computer system of claim 28, wherein said backbone network elements have an architecture similar to said enterprise network elements.

55. A computer program product encoded in computer readable media, said computer program product comprising:
a first set of instructions, executable on a computer system, configured to identify enterprise network element pairs, wherein
said enterprise network element pairs are pairs of ones of a plurality of enterprise network elements, and
each one of said enterprise network elements is coupled to at least one other of said enterprise network elements;
a second set of instructions, executable on said computer system, configured to identify ones of a plurality of backbone network elements as ingress/egress backbone network elements, wherein
each one of said backbone network elements is coupled to at least one other of said backbone network elements, and
each one of said ingress/egress backbone network elements is coupled to at least one of said ones of said enterprise network elements;

a third set of instructions, executable on said computer system, configured to, for each of said enterprise network element pairs, identify a path between a first and a second enterprise network element of said each of said enterprise network element pairs;

a fourth set of instructions, executable on said computer system, configured to, for each one of said paths that includes a pair of said ingress/egress backbone network elements, identify a virtual path between said pair of said ingress/egress backbone network elements; and a fifth set of instructions, executable on said computer system, configured to identify a plurality of independent paths of said paths and a plurality of non-independent paths of said paths, wherein each of said non-independent paths can be defined as a combination of ones of said independent paths, and at least one of said independent paths includes at least one of said virtual paths.

56. The computer program product of claim 55, wherein said second set of instructions comprises:

a first sub-set of instructions, executable on said computer system, configured to form clusters, wherein each of said clusters includes at least one of said ingress/egress backbone network elements.

57. The computer program product of claim 55, wherein said combination is a linear combination.

58. The computer program product of claim 55, wherein said each of said enterprise network elements is coupled to said at least one other of said enterprise network elements by one of a plurality of enterprise network links and said computer program product further comprises:

a sixth set of instructions, executable on said computer system, configured to, for said each of said enterprise network element pairs, define a delay between a first enterprise network element and a second enterprise network element of said each of said enterprise network element pairs as comprising a delay associated with each enterprise network link and each virtual path in said path.

59. The computer program product of claim 55, wherein said second set of instructions comprises:

a first sub-set of instructions, executable on said computer system, configured to aggregate at least one of said enterprise network elements and at least one of said backbone network elements into a cluster.

60. The computer program product of claim 59, wherein said second set of instructions further comprises:

a second sub-set of instructions, executable on said computer system, configured to identify each of said ingress/egress backbone network elements using a domain name of said each of said ingress/egress backbone network elements.

61. The computer program product of claim 60, wherein said second set of instructions still further comprises:

for each of said enterprise network elements coupled to at least one of said ingress/egress backbone network elements, a third sub-set of instructions, executable on said computer system, configured to, for each of said at least one of said ingress/egress backbone network elements, determine a domain name of said each of said at least one of said ingress/egress backbone network elements, include said each of said at least one of said ingress/egress backbone network elements in an existing cluster in a set of clusters, wherein each cluster in said set of clusters is configured to be identified by a domain name, if said domain name of said each of said at least one of said ingress/egress backbone network elements is equivalent to a domain name corresponding to said existing cluster, and create a new cluster in said set of clusters and including said each of said at least one of said ingress/egress backbone network elements in said new cluster, otherwise.

62. The computer program product of claim 60, wherein said second set of instructions still further comprises:

a third sub-set of instructions, executable on said computer system, configured to include said each of said enterprise network elements coupled to said at least one of said ingress/egress backbone network elements, if said domain name of said each of said at least one of said ingress/egress backbone network elements is equivalent to said domain name corresponding to said existing cluster, and a fourth sub-set of instructions, executable on said computer system, configured to include said each of said enterprise network elements coupled to at least one of said ingress/egress backbone network elements in said new cluster, otherwise.

63. The computer program product of claim 55, further comprising:

a sixth set of instructions, executable on said computer system, configured to measure a measured network performance metric between a first enterprise network element and a second enterprise network element of one of said at least one of said independent paths; and a seventh set of instructions, executable on said computer system, configured to compute a computed network performance metric between a first network element and a second network element of at least one of said non-independent enterprise network element pairs using said measured network performance metric.

64. The computer program product of claim 63, wherein each one of said independent paths has end-points defined by a first and a second enterprise network element that form an independent enterprise network element pair.

65. The computer program product of claim 63, wherein each of said virtual paths is represented by a virtual link.

66. The computer program product of claim 63, wherein said first set of instructions comprises a first sub-set of said first set of instructions, executable on said computer system, configured to identify pairs of said enterprise network elements as being in a first set of enterprise network element pairs, and said fifth set of instructions comprises a first sub-set of said fifth set of instructions, executable on said computer system, configured to generate a first matrix from said first set of enterprise network element pairs, wherein each row in said first matrix corresponds to a corresponding enterprise network element pair in said first set of enterprise network element pairs, said first matrix comprises independent rows and non-independent rows, each of said independent rows corresponds to one of said independent paths, and each of said non-independent rows corresponds to one of said non-independent paths, and a second sub-set of said fifth set of instructions, executable on said computer system, configured to form a second set of enterprise network element pairs, wherein said second set of enterprise network element pairs contains independent enterprise network element pairs in said first set of enterprise network element pairs, and each one of said independent pairs of enterprise network element corresponds to a one of said independent rows of said first matrix.

67. The computer program product of claim 66, wherein said sixth set of instructions comprises:

a first sub-set of said sixth set of instructions, executable on said computer system, configured to measure said measured network performance metric between a first enterprise network element and a second enterprise network element of each enterprise network element pair in said second set of enterprise network element pairs.

68. The computer program product of claim 67, wherein said seventh set of instructions comprises:

a first sub-set of said seventh set of instructions, executable on said computer system, configured to compute said computed network performance metric between a first enterprise network element and a second enterprise network element of a remaining enterprise network element pair in said first set of enterprise network element pairs using at least one of said measured network performance metrics, wherein said remaining enterprise network element pair corresponds to a non-independent row of said first matrix.

69. The computer program product of claim 68, wherein said first sub-set of seventh set of instructions further comprises:

a first sub-sub-set of instructions, executable on said computer system, configured to form a second matrix, wherein
each row of said second matrix corresponds to a corresponding one of said non-independent rows of said first matrix, and
said each row of said second matrix is such that said corresponding one of said non-independent rows of said first matrix can be expressed in terms of said independent rows using said each row of said second matrix;

a second sub-sub-set of instructions, executable on said computer system, configured to organize said measured network performance metrics into a vector; and a third sub-sub-set of instructions, executable on said computer system, configured to compute said computed network performance metric between said first enterprise network element and said second enterprise network element of said remaining enterprise network element pair by multiplying said vector by a row of said second matrix corresponding to said remaining enterprise network element pair.

70. The computer program product of claim 69, wherein said second matrix is a matrix A.

71. The computer program product of claim 68, wherein said first sub-set of seventh set of instructions further comprises:

a first sub-sub-set of instructions, executable on said computer system, configured to create a vector equivalent to said non-independent row of said first matrix by combining a plurality of said independent rows of said first matrix; and a second sub-sub-set of instructions, executable on said computer system, configured to compute said computed network performance metric by combining a measured network performance metric of each enterprise network element pair of said second set of enterprise network element pairs corresponding to one of said plurality of said independent rows of said first matrix.

72. The computer program product of claim 71, wherein each one of said enterprise network elements is a router.

73. The computer program product of claim 66, wherein said first set of enterprise network element pairs is a requirements set.

74. The computer program product of claim 73, wherein said second set of enterprise network element pairs is a measurements set.

75. The computer program product of claim 74, wherein each one of said enterprise network elements is a router.

76. The computer program product of claim 66, wherein said first matrix is a matrix F.

77. The computer program product of claim 66, further comprising:

an eighth set of instructions, executable on said computer system, configured to compute a number, wherein said number is equal to a rank of said first matrix;

a ninth set of instructions, executable on said computer system, configured to determine if a first said number of rows of said first matrix are independent; and a tenth set of instructions, executable on said computer system, configured to, if said first said number of said rows of said first matrix are not independent, re-arrange said rows of said first matrix such that said first said number of said rows of said first matrix are independent.

78. The computer program product of claim 77, further comprising:

an eleventh set of instructions, executable on said computer system, configured to identify a maximal set of independent rows of said first matrix based on said number.

79. The computer program product of claim 77, wherein said tenth set of instructions comprise:

a first sub-set of said tenth set of instructions, executable on said computer system, configured to re-arrange said pairs of said enterprise network elements in said first set of enterprise network element pairs such that said correspondence between each row of said first matrix and said corresponding enterprise network element pair in said first set of enterprise network element pairs is maintained.

80. The computer program product of claim 79, wherein said second sub-set of said fifth set of instructions comprise:

a first sub-sub-set of said second sub-set of said fifth set of instructions, executable on said computer system, configured to copy a first said number of pairs of said enterprise network elements in said first set of enterprise network element pairs into said second set of enterprise network element pairs.

81. The computer program product of claim 55, wherein said backbone network elements have an architecture similar to said enterprise network elements.

82. An apparatus comprising:

means for identifying enterprise network element pairs, wherein
said enterprise network element pairs are pairs of ones of a plurality of enterprise network elements, and
each one of said enterprise network elements is coupled to at least one other of said enterprise network elements;

means for identifying ones of a plurality of backbone network elements as ingress/egress backbone network elements, wherein
   each one of said backbone network elements is coupled to at least one other of said backbone network elements, and
   each one of said ingress/egress backbone network elements is coupled to at least one of said ones of said enterprise network elements;
means, for each of said enterprise network element pairs, for identifying a path between a first and a second enterprise network element of said each of said enterprise network element pairs;
means, for each one of said paths that includes a pair of said ingress/egress backbone network elements, for identifying a virtual path between said pair of said ingress/egress backbone network elements; and
means for identifying a plurality of independent paths of said paths and a plurality of non-independent paths of said paths, wherein
   each of said non-independent paths can be defined as a combination of ones of said independent paths, and
   at least one of said independent paths includes at least one of said virtual paths.

83. The apparatus of claim 82, wherein said means for identifying said ones of said backbone network elements as said ingress/egress backbone network elements comprises:
   means for forming clusters, wherein each of said clusters includes at least one of said ingress/egress backbone network elements.

84. The apparatus of claim 82, wherein said combination is a linear combination.

85. The apparatus of claim 82, wherein said each of said enterprise network elements is coupled to at least one other of said enterprise network elements by one of a plurality of enterprise network links and said apparatus further comprises:
   means, for said each of said enterprise network element pairs, for defining a delay between a first enterprise network element and a second enterprise network element of said each of said enterprise network element pairs as comprising a delay associated with each enterprise network link and each virtual path in said path.

86. The apparatus of claim 82, wherein said means for identifying said ones of said backbone network elements as said ingress/egress backbone network elements comprises:
   means for aggregating at least one of said enterprise network elements and at least one of said backbone network elements into a cluster.

87. The apparatus of claim 86, further comprising
means for identifying each of said ingress/egress backbone network elements using a domain name of said each of said ingress/egress backbone network elements.

88. The apparatus of claim 87, wherein said identifying said ones of said backbone network elements as said ingress/egress backbone network elements further comprises:
   means, for each of said enterprise network elements coupled to at least one of said ingress/egress backbone network elements,
      for each of said at least one of said ingress/egress backbone network elements,
         for determining a domain name of said each of said at least one of said ingress/egress backbone network elements,
         for including said each of said at least one of said ingress/egress backbone network elements in an existing cluster in a set of clusters, wherein each cluster in said set of clusters is configured to be identified by a domain name, if said domain name of said each of said at least one of said ingress/egress backbone network elements is equivalent to a domain name corresponding to said existing cluster, and
         for creating a new cluster in said set of clusters and including said each of said at least one of said ingress/egress backbone network elements in said new cluster, otherwise.

89. The apparatus of claim 87, wherein said means for identifying said ones of said backbone network elements as ingress/egress backbone network elements further comprises:
   means for including said each of said enterprise network elements coupled to said at least one of said ingress/egress backbone network elements, if said domain name of said each of said at least one of said ingress/egress backbone network elements is equivalent to said domain name corresponding to said existing cluster, and
   means for including said each of said enterprise network elements coupled to said at least one of said ingress/egress backbone network elements in said new cluster, otherwise.

90. The apparatus of claim 82, further comprising:
   means for measuring a measured network performance metric between a first enterprise network element and a second enterprise network element of one of said at least one of said independent paths; and
   means for computing a computed network performance metric between a first network element and a second network element of at least one of said non-independent enterprise network element pairs using said measured network performance metric.

91. The apparatus of claim 90, wherein each one of said independent paths has end-points defined by a first and a second enterprise network element that form an independent enterprise network element pair.

92. The apparatus of claim 90, wherein each of said virtual paths is represented by a virtual link.

93. The apparatus of claim 90, wherein
   said means for identifying, said enterprise network element pairs comprises
      means for identifying pairs of said enterprise network elements as being in a first set of enterprise network element pairs, and
   said means for identifying said independent paths and said non-independent paths comprises
      means for generating a first matrix from said first set of enterprise network element pairs, wherein
         each row in said first matrix corresponds to a corresponding enterprise network element pair in said first set of enterprise network element pairs,
         said first matrix comprises independent rows and non-independent rows,
         each of said independent rows corresponds to one of said independent paths, and
         each of said non-independent rows corresponds to one of said non-independent paths, and
      means for forming a second set of enterprise network element pairs, wherein
         said second set of enterprise network element pairs contains independent enterprise network element pairs in said first set of enterprise network element pairs, and
         each one of said independent pairs of enterprise network element corresponds to a one of said independent rows of said first matrix.

94. The apparatus of claim 93, wherein said means for measuring comprises:

means for measuring said measured network performance metric between a first enterprise network element and a second enterprise network element of each enterprise network element pair in said second set of enterprise network element pairs.

95. The apparatus of claim 94, wherein said means for computing comprises:

means for computing said computed network performance metric between a first enterprise network element and a second enterprise network element of a remaining enterprise network element pair in said first set of enterprise network element pairs using at least one of said measured network performance metrics, wherein said remaining enterprise network element pair corresponds to a non-independent row of said first matrix.

96. The apparatus of claim 95, wherein said means for computing said computed network performance metric between said first enterprise network element and said second enterprise network element of said remaining enterprise network element pair further comprises:

means for forming a second matrix, wherein
each row of said second matrix corresponds to a corresponding one of said non-independent rows of said first matrix, and
said each row of said second matrix is such that said corresponding one of said non-independent rows of said first matrix can be expressed in terms of said independent rows using said each row of said second matrix;

means for organizing said measured network performance metrics into a vector; and means for computing said computed network performance metric between said first enterprise network element and said second enterprise network element of said remaining enterprise network element pair by multiplying said vector by a row of said second matrix corresponding to said remaining enterprise network element pair.

97. The apparatus of claim 96, wherein said second matrix is a matrix A.

98. The apparatus of claim 95, wherein said means for computing said computed network performance metric between said first enterprise network element and said second enterprise network element of said remaining enterprise network element pair comprises:

means for creating a vector equivalent to said non-independent row of said first matrix by combining a plurality of said independent rows of said first matrix; and means for computing said computed network performance metric by combining a measured network performance metric of each enterprise network element pair of said second set of enterprise network element pairs corresponding to one of said plurality of said independent rows of said first matrix.

99. The apparatus of claim 98, wherein each one of said enterprise network elements is a router.

100. The apparatus of claim 93, wherein said first set of enterprise network element pairs is a requirements set.

101. The apparatus of claim 100, wherein said second set of enterprise network element pairs is a measurements set.

102. The apparatus of claim 101, wherein each one of said enterprise network elements is a router.

103. The apparatus of claim 93, wherein said first matrix is a matrix F.

104. The apparatus of claim 93, further comprising:

means for computing a number, wherein said number is equal to a rank of said first matrix;

means for determining if a first said number of rows of said first matrix are independent; and means, if said first-said number of said rows of said first matrix are not independent, for re-arranging said rows of said first matrix such that said first said number of said rows of said first matrix are independent.

105. The apparatus of claim 104, further comprising:

means for identifying a maximal set of independent rows of said first matrix based on said number.

106. The apparatus of claim 104, wherein said means for rearranging further comprises:

means for re-arranging said pairs of said enterprise network elements in said first set of enterprise network element pairs such that said correspondence between each row of said first matrix and said corresponding enterprise network element pair in said first set of enterprise network element pairs is maintained.

107. The apparatus of claim 106, wherein said means for forming said second set of enterprise network element pairs comprises:

means for copying a first said number of pairs of said enterprise network elements in said first set of enterprise network element pairs into said second set of enterprise network element pairs.

108. The apparatus of claim 82, wherein said backbone network elements have an architecture similar to said enterprise network elements.

* * * * *

UNITED STATES PATENT AND TRADEMARK OFFICE
CERTIFICATE OF CORRECTION

| | | |
|---|---|---|
| PATENT NO. | : 6,868,068 B1 | Page 1 of 1 |
| APPLICATION NO. | : 09/746233 | |
| DATED | : March 15, 2005 | |
| INVENTOR(S) | : Bijendra N. Jain and Keith McCloghrie | |

It is certified that error appears in the above-identified patent and that said Letters Patent is hereby corrected as shown below:

At Column 67, line 8, in Claim 40, please delete "measures aid" and replace with --measure said--

Signed and Sealed this

Twenty-seventh Day of October, 2009

David J. Kappos
*Director of the United States Patent and Trademark Office*